United States Patent
Kawamura

(10) Patent No.: US 8,582,411 B2
(45) Date of Patent: Nov. 12, 2013

(54) APPARATUS AND METHOD FOR INFORMATION PROCESSING

(75) Inventor: Takayoshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/397,003

(22) Filed: Feb. 15, 2012

(65) Prior Publication Data

US 2012/0213043 A1 Aug. 23, 2012

(30) Foreign Application Priority Data

Feb. 22, 2011 (JP) ................................ 2011-036420

(51) Int. Cl.
*G11B 20/00* (2006.01)

(52) U.S. Cl.
USPC .................... 369/53.44; 369/275.3

(58) Field of Classification Search
None
See application file for complete search history.

(56) References Cited

U.S. PATENT DOCUMENTS 7,881,587 B2 * 2/2011 Shinkai et al. ................ 386/248
2007/0009231 A1 * 1/2007 Shinkai et al. .................. 386/95

FOREIGN PATENT DOCUMENTS

JP 2001-292410 10/2001

* cited by examiner

*Primary Examiner* — Paul Huber
(74) *Attorney, Agent, or Firm* — Sony Corporation

(57) ABSTRACT

An acquisition section acquires image data having a plurality of frames. Table information is written into a store when the image data is acquired. The table information includes first position information representing absolute position information of each of the plurality of frames and second position information representing relative position information when a head frame of the image data is set as a reference. A specification section specifics the second position information of a frame corresponding to a frame reproduction instruction using the first position information. A reproduction section reproduces the reproduction frame corresponding to the specified second position information. Writing of the table information into the table store is restricted when there is an instruction to reproduce the frame.

20 Claims, 32 Drawing Sheets

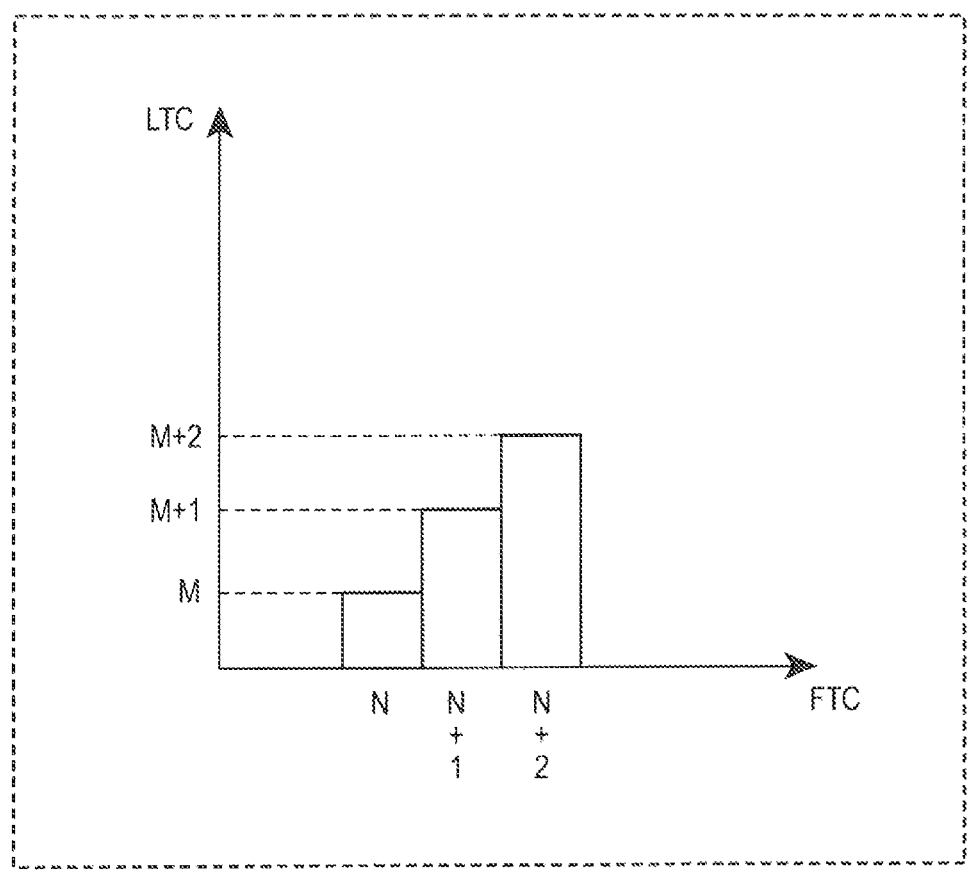

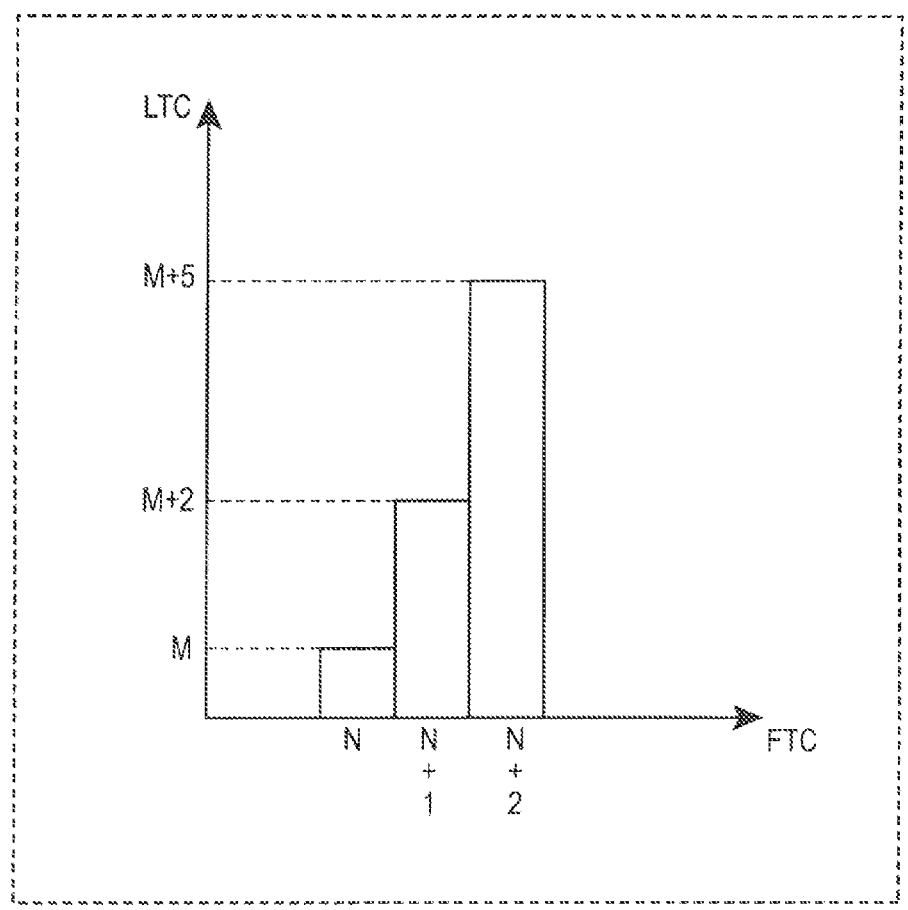

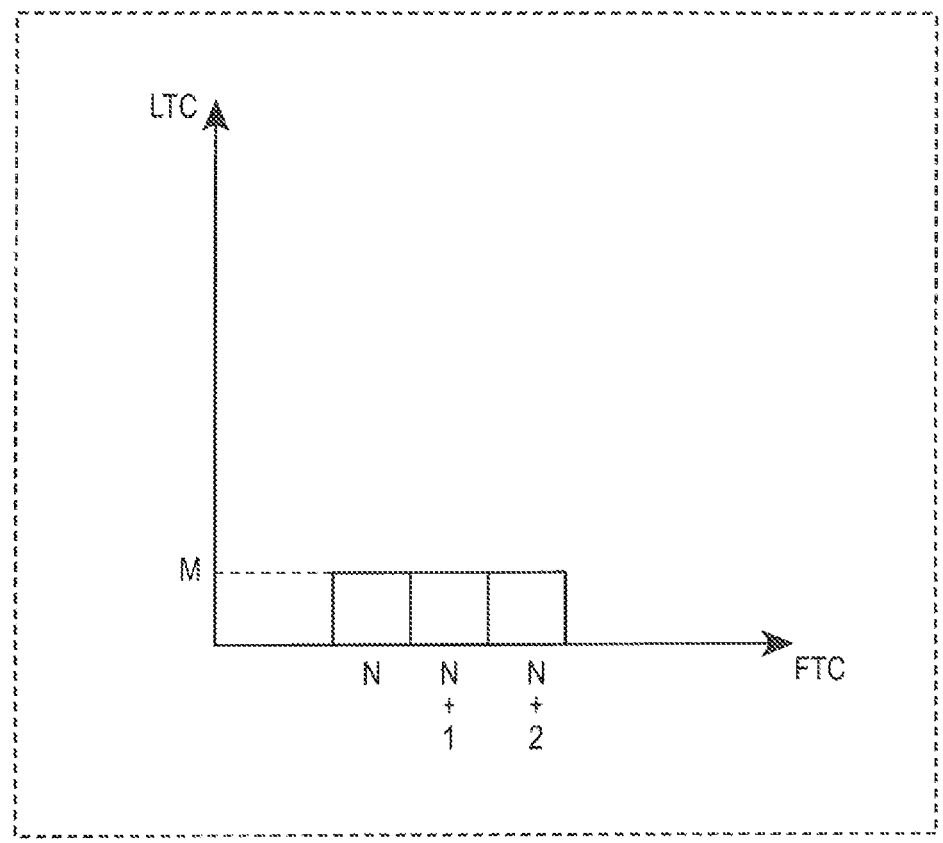

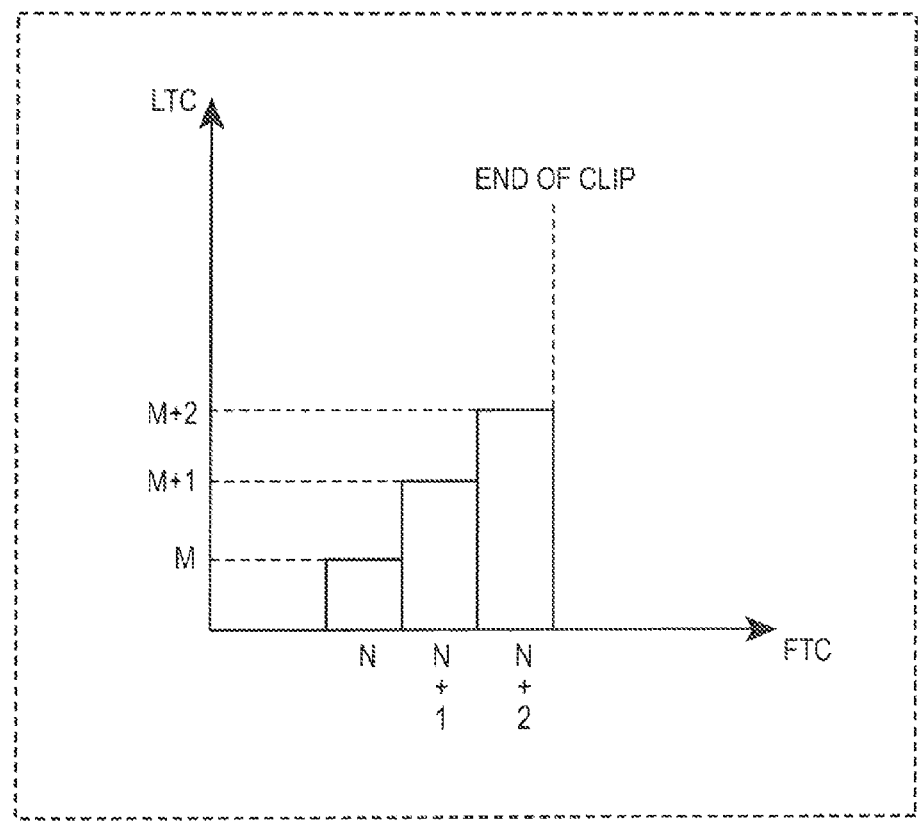

```
1  <LtcChangeTable tcFps="30">
2    <LtcChange frameCount="0"  value="55300201" status="increment"/>
3    <LtcChange frameCount="3"  value="48252001" status="still"/>
4    <LtcChange frameCount="5"  value="48252001" status="increase"/>
5    <LtcChange frameCount="6"  value="53001500" status="still"/>
6    <LtcChange frameCount="8"  value="42254315" status="decrease"/>
7    <LtcChange frameCount="11" value="43254315" status="increment"/>
8    <LtcChange frameCount="14" value="42254515" status="increase"/>
9    <LtcChange frameCount="15" value="42254515" status="increment"/>
10   <LtcChange frameCount="17" value="42254515" status="decrease"/>
11   <LtcChange frameCount="18" value="42254515" status="increment"/>
12   <LtcChange frameCount="20" value="42254515" status="end"/>
13 </LtcChangeTable>
```

APPARATUS AND METHOD FOR INFORMATION PROCESSING

FIELD

The present disclosure relates to an information processing apparatus, an information processing method, and a program capable of reproducing the content data, such as image data.

BACKGROUND

In the related art, there is a technique of recording image data or audio data acquired by photographing or the like on a recording medium in a state where metadata for editing of the data is added to the image data or the audio data (for example, refer to 14 and 15 pages, FIG. 8, and the like in JP-A-2001-292410).

SUMMARY

A further improvement in the efficiency in editing the image data and the like recorded on the recording medium has been demanded. In order to realize this, the image data and the like to be edited should be reproduced with good operability.

In view of the above, it is desirable to provide an information processing apparatus, an information processing method, and a program capable of reproducing the content data with good operability.

An embodiment of the present disclosure is directed to an information processing apparatus including an acquisition section, a table storage section, a writing section, a specification section, a reproduction section, and an exclusive processing section.

The acquisition section acquires image data with a plurality of frames.

Table information having as its element the correspondence relationship between first position information and second position information at a change point, which is a frame at which a change pattern type of a value of the first position information changes, can be written in the table storage section, and the first position information is absolute position information that each of the plurality of frames has and the second position information is relative position information when a head frame of the image data is set as a reference.

The writing section writes the table information when the image data is acquired by the acquisition section.

The specification section specifies the second position information of a reproduction frame, which is a frame corresponding to a frame reproduction instruction using the first position information, with reference to the table information in response to the frame reproduction instruction.

The reproduction section reproduces the reproduction frame corresponding to the second position information specified by the specification section.

The exclusive processing section enables the specification section to refer to the table information while restricting writing of the table information into the table storage section by the writing section when there is an instruction to reproduce the frame.

In this information processing apparatus, when there is an instruction to reproduce a frame, writing of the table information into the table storage section by the writing section is restricted and the specification section can refer to the table information. Accordingly, for example, even if the image data is being acquired, the second position information of a reproduction frame is specified by referring to the table information. As a result, processing of reproducing the content data, such as image data, can be performed with good operability.

The writing section may write the table information for each frame group having a predetermined number of frames of the plurality of frames. In this case, the exclusive processing section may invalidate the frame reproduction instruction while the table information is being written for one frame group.

The exclusive processing section may write information, which indicates that writing of the table information has been completed, in the table storage section in order to enable the specification section to refer to the table information.

The exclusive processing section may delete the writing completion information and also release restrictions on the writing of the table information into the table storage section by the writing section after the second position information of the reproduction frame is specified.

The first position information may be a time code indicating the absolute position of the frame using an actual time or time information with a predetermined time as a reference.

The second position information may be a time code indicating the relative position of the frame using a frame number indicating the number of frames from the head frame of the image data.

Each element of the table information may include status information indicating the change pattern type of the value of the first position information in frames after the change point.

The specification section may determine whether or not the first position information of the reproduction instruction is present in the table information for each status section, which includes a group of a plurality of consecutive frames with the same status information and is classified by the change point, and specify the second position information of the reproduction frame on the basis of a result of the determination.

The specification section may perform the determination for the consecutive status sections in order in an increase direction of the second position information when the value of the first position information of the reproduction instruction is larger than the value of the first position information of a frame reproduced currently. In this case, the specification section may perform the determination for the consecutive status sections in order in a decrease direction of the second position information when the value of the first position information of the reproduction instruction is smaller than the value of the first position information of the frame reproduced currently.

The change pattern may include "increment" in which the value of the first position information increases by 1 whenever a value of the second position information increases by 1, "increase" in which the value of the first position information increases by 2 or more whenever the value of the second position information increases by 1, "still" in which the value of the first position information does not change even if the value of the second position information increases by 1, and "decrease" in which the value of the first position information decreases by 1 or more whenever the value of the second position information increases by 1.

Only when the change pattern of the status section, which includes a group of a plurality of consecutive frames with the same status information and in which the value of the first position information of the reproduction instruction is present, is the "increment", the specification section may set the reproduction frame as a frame indicated by the first position information of the reproduction instruction to specify the second position information of the reproduction frame.

Another embodiment of the present disclosure is directed to an information processing method including acquiring image data with a plurality of frames by an acquisition section.

By means of a writing section, table information having as its element the correspondence relationship between first position information and second position information at a change point, which is a frame at which a change pattern type of a value of the first position information changes, is written in a table storage section when the image data is acquired by the acquisition section, and the first position information is absolute position information that each of the plurality of frames has and the second position information is relative position information when a head frame of the image data is set as a reference.

By means of a specification section, the second position information of a reproduction frame, which is a frame corresponding to a frame reproduction instruction using the first position information, is specified with reference to the table information in response to the frame reproduction instruction.

By means of a reproduction section, the reproduction frame corresponding to the second position information specified by the specification section is reproduced.

By means of an exclusive processing section, when there is an instruction to reproduce the frame, writing of the table information into the table storage section by the writing section is restricted, and the specification section can refer to the table information.

Still another embodiment of the present disclosure is directed to a program causing a computer to function as an acquisition section, a table storage section, a writing section, a specification section, a reproduction section, and an exclusive processing section.

The acquisition section acquires image data with a plurality of frames.

Table information having as its element the correspondence relationship between first position information and second position information at a change point, which is a frame at which a change pattern type of a value of the first position information changes, can be written in the table storage section, and the first position information is absolute position information that each of the plurality of frames has and the second position information is relative position information when a head frame of the image data is set as a reference.

The writing section writes the table information when the image data is acquired by the acquisition section.

The specification section specifies the second position information of a reproduction frame, which is a frame corresponding to a frame reproduction instruction using the first position information, with reference to the table information in response to the frame reproduction instruction.

The reproduction section reproduces the reproduction frame corresponding to the second position information specified by the specification section.

The exclusive processing section enables the specification section to refer to the table information while restricting writing of the table information into the table storage section by the writing section when there is an instruction to reproduce the frame.

As described above, according to the embodiments of the present disclosure, it becomes possible to perform processing of reproducing the content data with good operability.

BRIEF DESCRIPTION OF THE DRAWINGS

FIGS. 12A and 12B are views for explaining an example of creating elements of the LTC change point table;

FIGS. 13A and 13B are views for explaining another example of creating elements of the LTC change point table;

FIGS. 14A and 14B are views for explaining still another example of creating elements of the LTC change point table;

FIGS. 16A and 16B are views for explaining still another example of creating elements of the LTC change point table;

FIG. 18 is a view showing an example of XML description of a non-real-time metadata file;

DETAILED DESCRIPTION

Hereinafter, embodiments of the present disclosure will be described with reference to the accompanying drawings.

Figure 1:
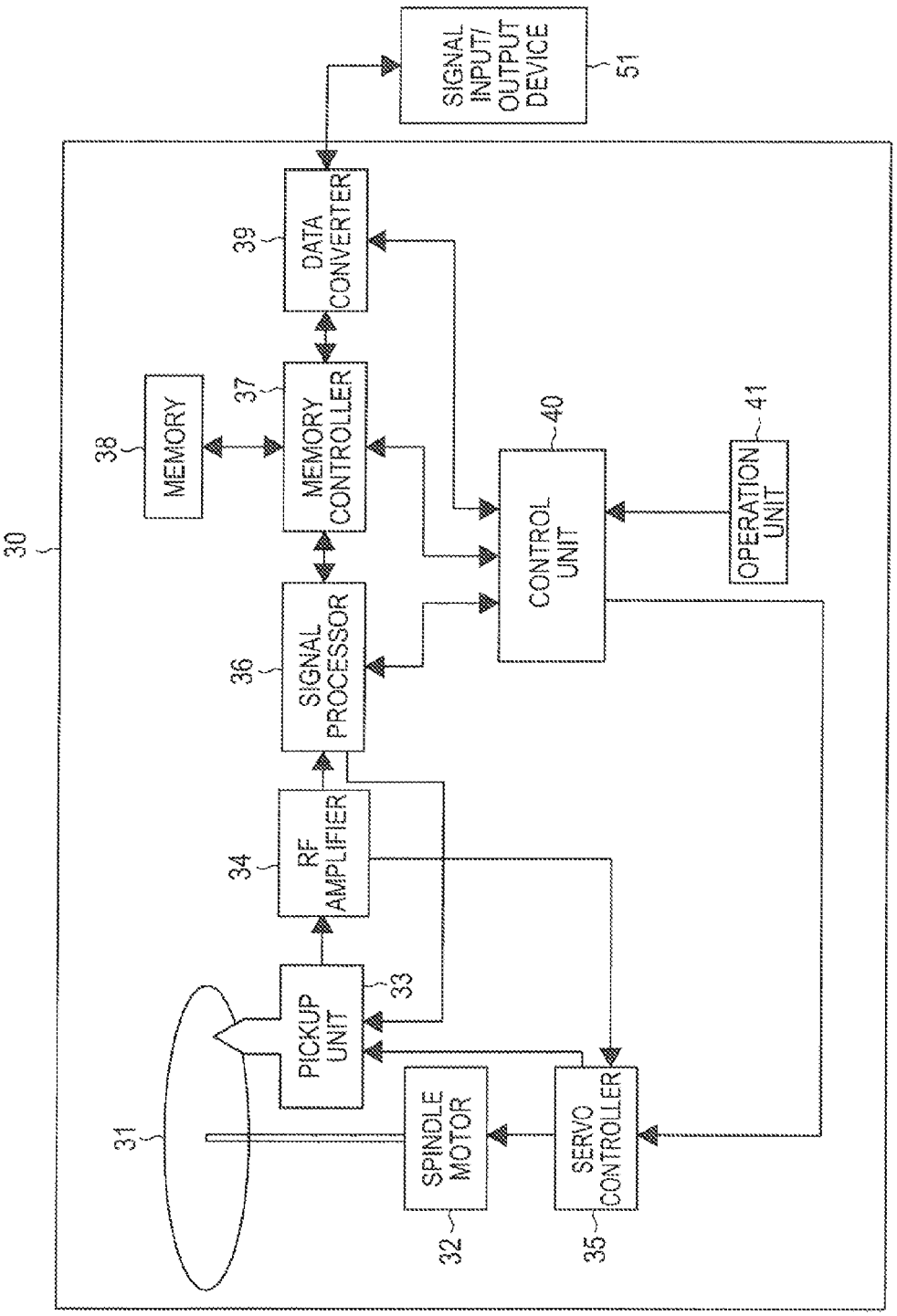
FIG. 1 is a schematic view showing an example of the configuration of a disk recording and reproducing apparatus (disk drive) according to an embodiment of the present disclosure.

FIG. 1 is a schematic view showing an example of the configuration of a disk recording and reproducing apparatus (disk drive) 30 according to an embodiment of the present disclosure.

A spindle motor 32 rotates and drives an optical disc 31 at CLV (Constant Linear Velocity) or CAV (Constant Angular Velocity) on the basis of a spindle motor driving signal from a servo controller 35.

A pickup unit 33 records a recording signal on the optical disc 31 by controlling an output of a laser beam on the basis of a recording signal supplied from a signal processor 36. In addition, the pickup unit 33 condenses and emits a laser beam on the optical disc 31, generates a current signal by photoelectric conversion of reflected light from the optical disc 31, and supplies the current signal to an RF (Radio Frequency) amplifier 34. In addition, the emission position of a laser beam is controlled to be a predetermined position by a servo signal supplied from the servo controller 35 to the pickup unit 33.

The RF amplifier 34 generates a focus error signal, a tracking error signal, and a reproduction signal on the basis of a current signal from the pickup unit 33, supplies the tracking error signal and the focus error signal to the servo controller 35 and supplies the reproduction signal to the signal processor 36.

The servo controller 35 controls a focus servo operation or a tracking servo operation. Specifically, the servo controller 35 generates a focus servo signal and a tracking servo signal on the basis of the focus error signal and the tracking error signal from the RF amplifier 34, respectively, and supplies the focus servo signal and the tracking servo signal to an actuator (not shown) of the pickup unit 33. In addition, the servo controller 35 generates a spindle motor driving signal, which drives the spindle motor 32, to control a spindle servo operation of rotating the optical disc 31 at predetermined rotation speed.

In addition, the servo controller 35 performs thread control which is for changing the emission position of a laser beam by moving the pickup unit 33 in the radial direction of the optical disc 31. In addition, the signal read position of the optical disc 31 is set by a control unit 40, and the position of the pickup unit 33 is controlled such that a signal from the set read position can be read.

The signal processor 36 generates a recording signal by modulating the recording data input from a memory controller 37 and supplies the recording signal to the pickup unit 33. In addition, the signal processor 36 generates reproduction data by demodulating the reproduction signal from the RF amplifier 34 and supplies the reproduction data to the memory controller 37.

The memory controller 37 stores approximately the recording data from a data converter 39 in a memory 38, as will be described later, and also reads the recording data and supplies it to the signal processor 36. In addition, the memory controller 37 stores approximately the reproduction data from the signal processor 36 in the memory 38 and also reads the reproduction data and supplies it to the data converter 39.

For example, the data converter 39 generates recording data by compressing signals of a sound and a photograph image captured by a video camera (not shown) or a signal reproduced from the recording medium (not shown), which is supplied from a signal input/output device 51, on the basis of a method using an MPEG (Moving Picture Experts Group) or a JPEG (Joint Photographic Experts Group) when necessary and supplies the signals to the memory controller 37.

In addition, the data converter 39 expands the reproduction data supplied from the memory controller 37 when necessary, converts the reproduction data to an output signal based on a predetermined format, and supplies the output signal to the signal input/output device 51.

The control unit 40 controls the servo controller 35, the signal processor 36, the memory controller 37, and the data converter 39 on the basis of an operation signal from an operation unit 41 to execute recording and reproduction processing.

The operation unit 41 is operated by the user and supplies an operation signal corresponding to the operation to the control unit 40, for example.

In a disc recording and reproducing apparatus 30 configured as described above, when a user operates the operation unit 41 to instruct recording of data, the data supplied from the signal input/output device 51 is recorded on the optical disc 31 after being supplied to the optical disc 31 through the data converter 39, the memory controller 37, the signal processor 36, and the pickup unit 33.

In addition, when a user operates the operation unit 41 to instruct reproduction of data, the data is reproduced after being read from the optical disc 31 through the pickup unit 33, the RF amplifier 34, the signal processor 36, the memory controller 37, and the data converter 39 and is then supplied to the signal input/output device 51.

Figure 2:
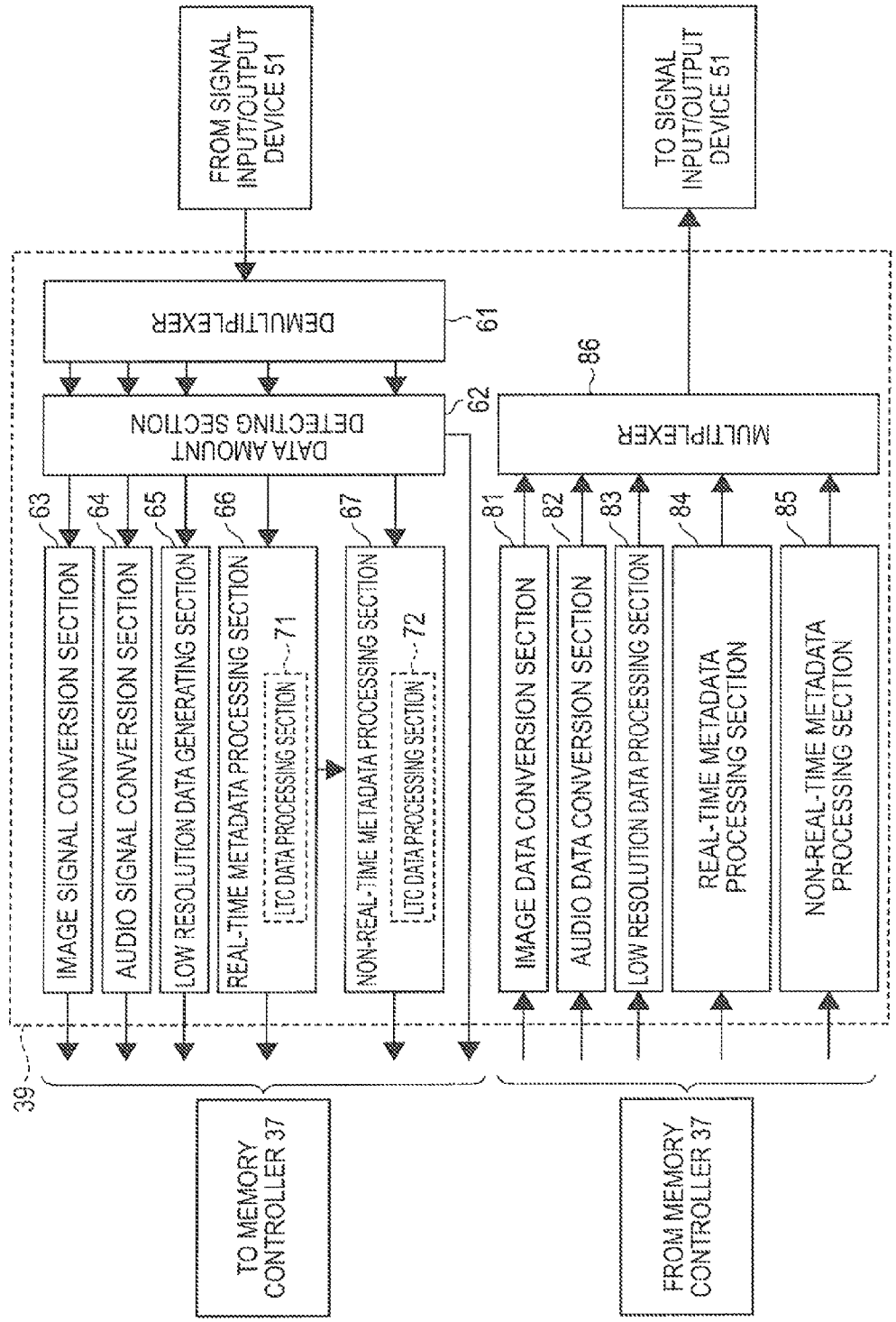
FIG. 2 is a schematic view showing an example of the configuration of a data converter shown in FIG. 1.

FIG. 2 is a schematic view showing an example of the configuration of the data converter 39 in FIG. 1. In the present embodiment, the data converter 39 functions as an acquisition unit that acquires the image data having a plurality of frames.

When recording the data on the optical disc 31, a signal to be recorded from the signal input/output device 51 is supplied to a demultiplexer 61. The demultiplexer 61 separates an image signal (for example, a baseband signal) of a moving image and an audio signal (for example, a baseband signal) and metadata associated with the image signal, for example, as a plurality of related data series from the signal, which is supplied from the signal input/output device 51, and supplies them to a data amount detecting section 62.

That is, when recording the data on the optical disc 31, the signal input/output device 51 outputs signals acquired by a video camera (not shown) as described above, for example. However, not only an image signal obtained by imaging the subject and an audio signal associated with the image signal but also metadata of the image signal is included in the signals acquired by the video camera. Accordingly, the demultiplexer 61 separates not only the image signal and the audio signal but also the metadata from such signals.

Here, as the metadata, there are real-time metadata (RT), which is formed by data for which real time is requested in the reading processing, and non-real-time metadata (NRT), which is formed by data for which real time is not requested in the reading processing.

Examples of the real-time metadata (RT) include an LTC (Linear Time Code) which is the absolute position information (time code) of each frame and an FTC (File Time Code)

which is a frame number of each frame and the relative position information from the head frame of a file, which are used to specify the position of the frame of an image signal using predetermined time information, such as date and time (year, month, day, hour, minute, second). In the present embodiment, the LTC and the FTC are used as first position information and second position information, respectively.

In addition, other examples of the real-time metadata include a user bit (UB) indicating the signal characteristic of an image signal of a frame as metadata, a UMID (Unique Material Identifier) which is an ID for identifying a frame, information on a GPS (Global Positioning System) indicating the position at which imaging using a video camera is performed, an essence mark which is information regarding the content of essence data including an image signal or an audio signal, ARIB (Association of Radio Industries and Businesses) metadata, and setting/control information regarding a video camera with which imaging is performed. In addition, the ARIB metadata is metadata for communication interfaces, such as an SDI (Serial Digital Interface) standardized by the ARIB which is a standardization group. In addition, examples of the video camera setting/control information include an IRIS control value, a mode of white balance/black balance, and lens information regarding the zoom or focusing of a lens.

Examples of the non-real-time metadata (NRT) include a conversion table used when matching the LTC corresponding to each frame to the frame number (FTC), a UMID, GPS information, and other information. In the present embodiment, an LTC change table to be described later is also stored as non-real-time metadata, and is used to execute reproduction of a designated reproduction frame with good operability. The LTC change table is equivalent to table information in the present embodiment.

In addition, a frame is a unit of an image signal, and is image data corresponding to an image of one screen (or various kinds of data corresponding to the image data). In addition, a clip is a unit indicating one imaging processing until a photographer ends imaging from the start of the imaging. That is, image signals of one clip are usually image signals of a plurality of frames. In addition, the clip is used not only to indicate one imaging processing but also to indicate a time from the start of imaging of the imaging processing to the end of imaging. In addition, the clip is also used to indicate the length or amount of image data obtained by one imaging processing or to indicate the image data itself. In addition, the clip is also used to indicate the length or amount of various kinds of data obtained by one imaging processing and to indicate a group of the various kinds of data itself.

In addition, the real-time metadata and the non-real-time metadata may be added to image data in any unit. A case where the real-time metadata is added to image data for each frame and the non-real-time metadata is added to image data for each clip will be described below. That is, in the following explanation, it is assumed that the real-time metadata is frame metadata added to an image signal for each frame and includes data corresponding to the added frame. In addition, it is assumed that the non-real-time metadata is clip metadata added to an image signal for each clip and includes data corresponding to all added clips.

Generally, image data is created as a file for each clip, and is managed by the file system. In such a case, the non-real-time metadata may also be metadata of each file including image data.

In addition, the real-time metadata and the non-real-time metadata may include data other than those described above. Alternatively, the real-time metadata and the non-real-time metadata may be configured to include the same content data, or each data item as the real-time metadata described above may be set as the non-real-time metadata or each data item described as the non-real-time metadata may be set as the real-time metadata on the contrary. For example, the essence mark, the ARIB metadata, or the video camera setting/control information may be set as the non-real-time metadata or may be included in both the real-time metadata and the non-real-time metadata. In addition, the UMID or the GPS information may be included in the real-time metadata or may be included in both the real-time metadata and the non-real-time metadata.

The data amount detecting section 62 supplies the image signal, the audio signal, the real-time metadata, and the non-real-time metadata which are supplied from the demultiplexer 61, as they are, to an image signal conversion section 63, an audio signal conversion section 64, a real-time metadata processing section 66, and a non-real-time metadata processing section 67, respectively. Also, the data amount detecting section 62 detects the amount of data of each of the image signal, the audio signal, the real-time metadata, and the non-real-time metadata and supplies the amount of data to the memory controller 37. That is, the data amount detecting section 62 detects the amount of data corresponding to a predetermined reproduction period for each of the image signal, the audio signal, the real-time metadata, and the non-real-time metadata supplied from the demultiplexer 61 and supplies the amount of data to the memory controller 37, for example.

In addition, the data amount detecting section 62 supplies to a low resolution data generating section 65 the image signal supplied from demultiplexer 61, or supplies to the low resolution data generating section 65 both the image signal and the audio signal when necessary.

The image signal conversion section 63 performs MPEG encoding of the image signal supplied from the data amount detecting section 62 with all frames as I (Intra) picture, for example, and supplies data series of the image data obtained as a result to the memory controller 37. In addition, the audio signal conversion section 64 performs MPEG encoding of the audio signal supplied from the data amount detecting section 62, for example, and supplies data series of the audio data obtained as a result to the memory controller 37.

The real-time metadata processing section 66 rearranges each component of the real-time metadata, which is supplied through the data amount detecting section 62, when necessary and supplies data series of the real-time metadata obtained as a result to the memory controller 37. In addition, the real-time metadata processing section 66 has an LTC data processing section 71 which generates LTC data corresponding to each frame when the LTC data is not added to the signal supplied from the signal input/output device 51, for example. In addition, the real-time metadata processing section 66 supplies the data series of the LTC data after processing to the non-real-time metadata processing section 67 when necessary.

The non-real-time metadata processing section 67 rearranges each component of the non-real-time metadata, which is supplied through the data amount detecting section 62, when necessary and supplies data series of the non-real-time metadata obtained as a result to the memory controller 37. In addition, the non-real-time metadata processing section 67 has an LTC data processing section 72. The LTC data processing section 72 generates a conversion table, which associates the LTC data with a frame number (FTC data), using the data series of the LTC data supplied from the real-time metadata processing section 66. In the present embodiment, an LTC change table is created by the LTC data processing section 72 and is written into the memory 38 through the memory controller 37. That is, in the present embodiment, the LTC data processing section 72 functions as a writing section, and the memory 38 functions as a table storage section.

The low resolution data generating section 65 generates data series of low resolution data, which is data obtained by reducing the amount of data supplied to the low resolution data generating section 65, and supplies it to the memory controller 37.

That is, the low resolution data generating section 65 generates a small image signal, which is an image signal of a frame with a small number of pixels, by thinning out the number of pixels of each frame of the image signal supplied through the data amount detecting section 62, for example. In addition, the low resolution data generating section 65 encodes the small image signal using the MPEG4 method, for example, and outputs the encoding result as low resolution data.

In addition, the low resolution data generating section 65 may output an audio signal supplied through the data amount detecting section 62 or an audio signal after reducing the amount of data by thinning out samples of the audio signal, for example, in a state included in the low resolution data (for example, in the form multiplexed on the small image signal in a frame unit). In the present embodiment, an audio signal is included in the low resolution data.

Although the data series of the image data output from the image signal conversion section 63, the audio data output from the audio signal conversion section 64, and the data series of the low resolution data output from the low resolution data generating section 65 are data series of the same image and sound herein, the image data output from the image signal conversion section 63 and the audio data output from the audio signal conversion section 64 are originally to be supplied to the user. Accordingly, the image data output from the image signal conversion section 63 and the audio data output from the audio signal conversion section 64 are called appropriately main line data hereinafter.

As described above, the low resolution data is image and audio data which is the same as the main line data, but the amount of the low resolution data is smaller than the amount of the main line data. Therefore, when performing reproduction for a certain reproduction time, the low resolution data can be read from the optical disc 31 in a short time compared with the main line data.

In addition, about 25 Mbps (Megabit per second) may be adopted as a data rate of the main line data, for example. In this case, about 3 Mbps may be adopted as a data rate as a data rate of the low resolution data, for example. Moreover, in this case, if about 2 Mbps is adopted as a data rate of metadata (real-time metadata and non-real-time metadata), the data rate of the entire data recorded on the optical disc 31 becomes about 30 (=25+3+2) Mbps. Therefore, as the optical disc 31 (disk recording and reproducing apparatus 30 which drives the optical disc 31), it is possible to adopt an optical disc which has a recording rate of 35 Mbps or the like and which is in the sufficiently practical range, for example.

As described above, the data converter 39 shown in FIG. 2 supplies to the memory controller 37 not only the data series of the main line data (image data and audio data) but also the data series of the real-time metadata, the non-real-time metadata, and the low resolution data. Then, the main line data, the real-time metadata, the non-real-time metadata, and the low resolution data supplied to the memory controller 37 are supplied and recorded on the optical disc 31.

On the other hand, when reproducing the data from the optical disc 31, the main line data, the real-time metadata, the non-real-time metadata, or the low resolution data is read from the optical disc 31 when necessary. In addition, image data and audio data included in the main line data are supplied to an image data conversion section 81 and an audio data conversion section 82 and are decoded as an image signal and an audio signal, respectively, and are supplied to a multiplexer 86.

In addition, the real-time metadata, the non-real-time metadata, and the low resolution data are supplied to a real-time metadata processing section 84, a non-real-time metadata processing section 85, and a low resolution data processing section 83, respectively. The real-time metadata processing section 84 supplies the real-time metadata to the multiplexer 86 after changing the arrangement position of each component of the real-time metadata supplied thereto when necessary. The non-real-time metadata processing section 85 supplies the non-real-time metadata to the multiplexer 86 after changing the arrangement position of each component of the non-real-time metadata supplied thereto when necessary. The low resolution data processing section 83 decodes the low resolution data supplied thereto as an image signal and an audio signal whose amount of data is small and supplies the image signal and the audio signal to the multiplexer 86.

The image data conversion section 81 performs MPEG decoding of the data series of the image data supplied from the memory controller 37, for example, and supplies an image signal obtained as a result to the multiplexer 86. In addition, the audio data conversion section 82 performs MPEG decoding of the data series of the audio data supplied from the memory controller 37, for example, and supplies an audio signal obtained as a result to the multiplexer 86.

The multiplexer 86 supplies to the signal input/output device 51 the image signal supplied from the image data conversion section 81, the audio signal supplied from the audio data conversion section 82, the real-time metadata supplied from the real-time metadata processing section 84, and the non-real-time metadata supplied from the non-real-time metadata processing section 85. In addition, the multiplexer 86 may output the image signal supplied from the image data conversion section 81, the audio signal supplied from the audio data conversion section 82, the real-time metadata supplied from the real-time metadata processing section 84, the non-real-time metadata supplied from the non-real-time metadata processing section 85, and the image signal and the audio signal whose data amount is small and which are supplied from the low resolution data processing section 83 after multiplexing or may output these signals (data) separately and in parallel.

Figure 3:
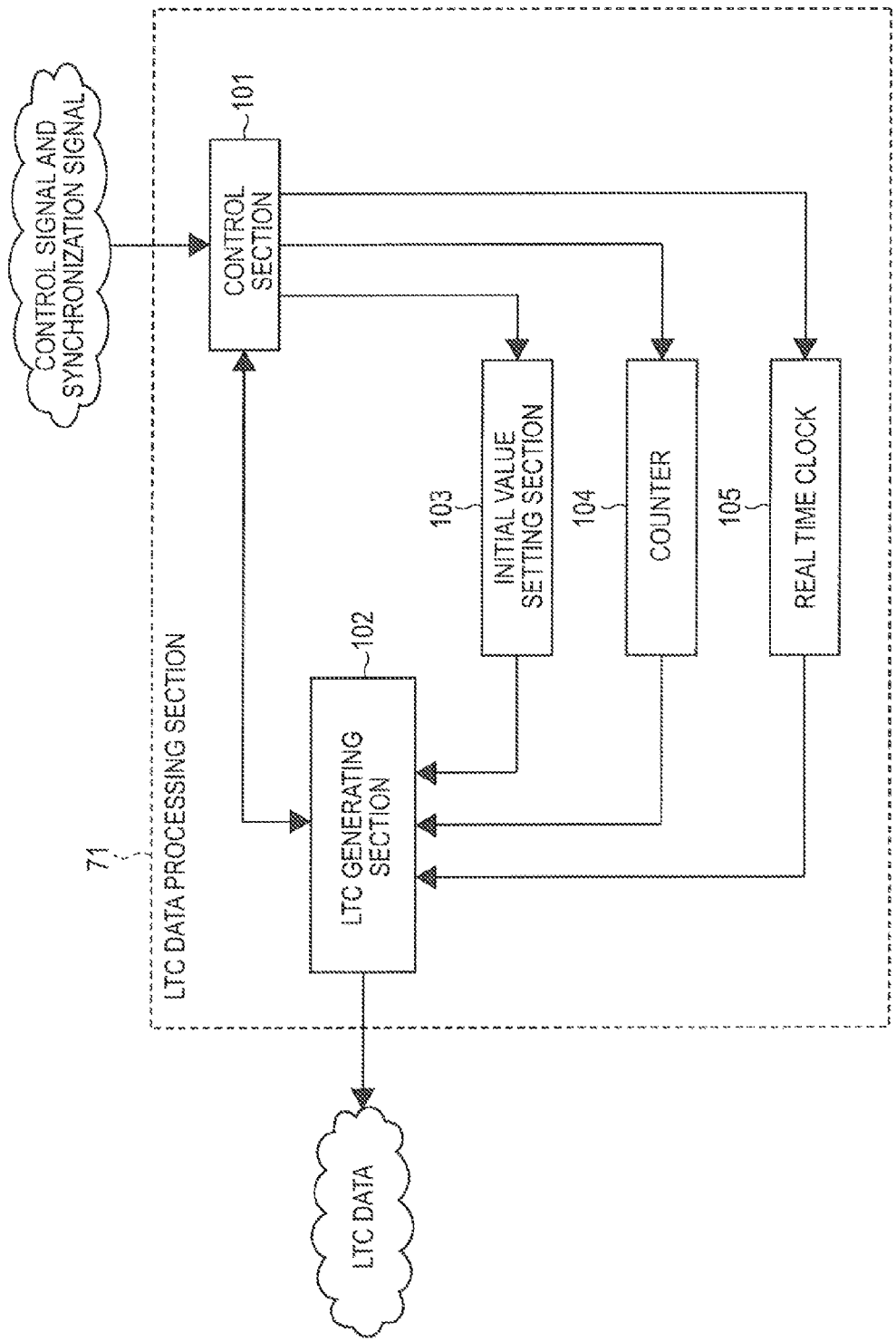
FIG. 3 is a schematic view showing an example of the configuration of an LTC data processing section provided in a real-time metadata processing section shown in FIG. 2.

FIG. 3 is a schematic view showing an example of the configuration of the LTC data processing section 71 provided in the real-time metadata processing section 66 in FIG. 2.

The real-time metadata processing section 66 in FIG. 2, in which the LTC data processing section 71 shown in FIG. 3 is provided, supplies a control signal or a synchronization signal to the LTC data processing section 71 and sends a request for generation of an LTC when the LTC is not present in the supplied real-time metadata, for example. Examples of the case where an LTC is not present in the real-time metadata include a case where an image signal and an audio signal acquired by an imaging apparatus connected to the signal input/output device 51 are supplied.

When the control signal or the synchronization signal are acquired, a control section 101 of the LTC data processing section 71 controls each section of the LTC data processing section 71 on the basis of these signals to perform processing for generating the LTC.

When generating an LTC which is separate from the actual time with a predetermined time as a reference, the control section 101 controls an LTC generating section 102 which performs processing for generating an LTC, an initial value setting section 103 which performs processing for setting the initial value, and a counter 104 which counts a frame, so that various kinds of processing are executed.

The initial value setting section 103 executes processing regarding the setting of the initial value under control of the control section 101. Then, the initial value setting section 103 supplies the set initial value to the LTC generating section 102. The counter 104 counts the number of frames to be processed on the basis of the synchronization signal supplied to the control section 101 and supplies the count value to the LTC generating section 102. In addition, a real time clock 105 holds the time information, which is information regarding the actual time, and supplies the time information to the LTC generating section 102 under control of the control section 101.

The LTC generating section 102 generates LTC data synchronized with a frame using the initial value supplied to the initial value setting section 103 and the counter value supplied from the counter 104, for example, and supplies the LTC data to the real-time metadata processing section 66 under control of the control section 101.

In addition, when generating an LTC using the actual time, the control section 101 controls the LTC generating section 102, which performs processing for generating the LTC, and the real time clock 105, which supplies the actual time information, to execute various kinds of processing. In this case, the LTC generating section 102 generates LTC data synchronized with a frame using the time information supplied to the real time clock 105 and supplies the LTC data to the real-time metadata processing section 66 under control of the control section 101.

Figure 4:
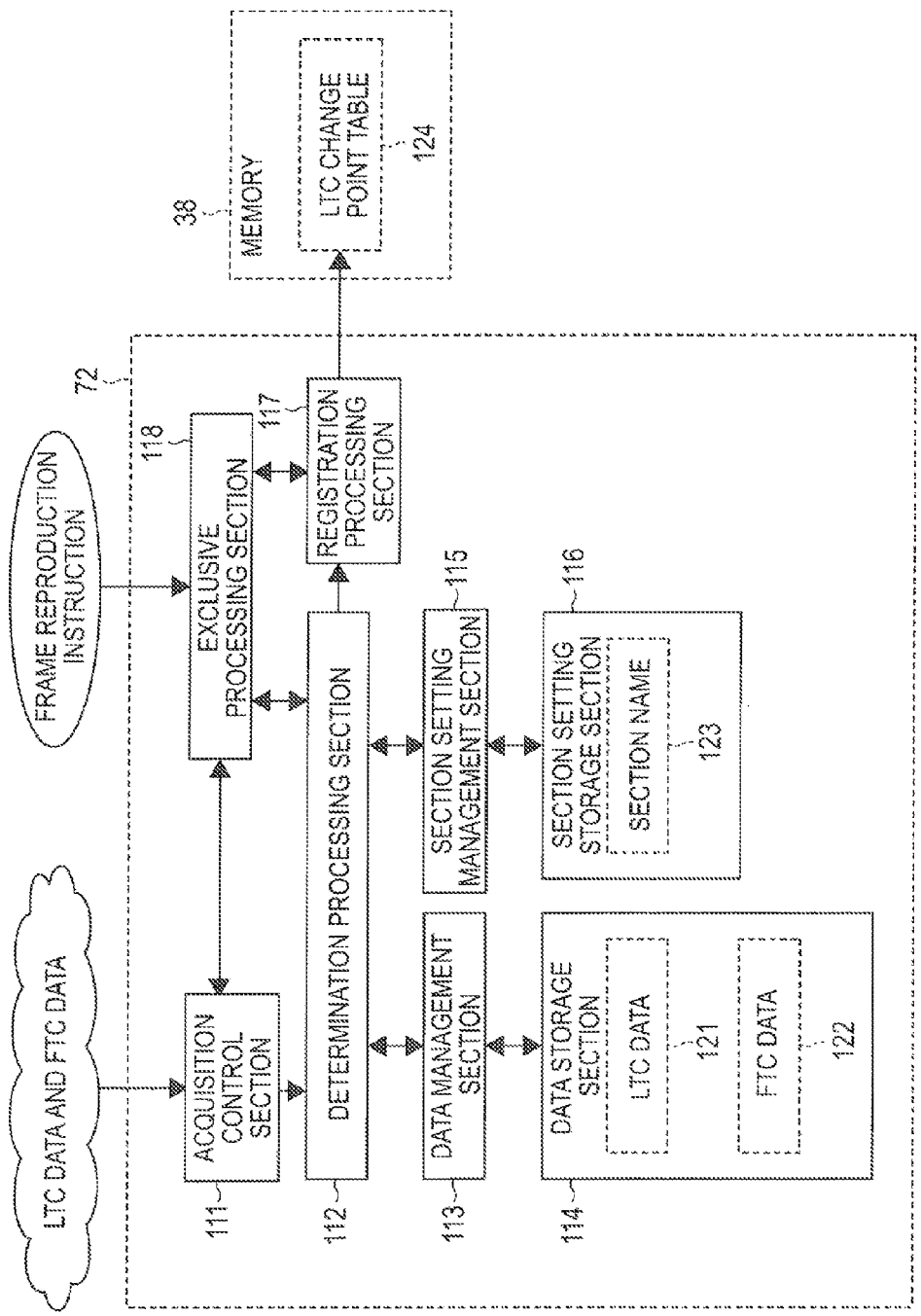
FIG. 4 is a schematic view showing an example of the configuration of an LTC data processing section provided in a non-real-time metadata processing section shown in FIG. 2.

FIG. 4 is a schematic view showing an example of the configuration of the LTC data processing section 72 provided in the non-real-time metadata processing section 67 in FIG. 2.

For example, when the LTC data is supplied from the real-time metadata processing section 66, the non-real-time metadata processing section 67 in FIG. 2 in which the LTC data processing section 71 shown in FIG. 4 is provided supplies the LTC data to the LTC data processing section 72, detects a frame (change point) where the change pattern, such as an increase or decrease in the value of the LTC, changes, and generates an LTC change point table having the correspondence relationship between the LTC and the FTC at the change point as an element.

The LTC data processing section 72 is configured to include an acquisition control section 111 which acquires LTC data or FTC data supplied from the outside, a determination processing section 112 which performs various kinds of determination processing, a data management section 113 which manages the LTC data or the FTC data supplied from the outside, a data storage section 114 which is controlled by the data management section 113 and stores LTC data 121 or FTC data 122, a section setting management section 115 which manages a setting regarding a predetermined section in a clip that is supplied from the determination processing section 112 as will be described later, a section setting storage section 116 which is controlled by the section setting management section 115 and stores a set section name 123, a registration processing section 117 which supplies to the memory 38 the LTC change point table supplied from the determination processing section 112 in order to store the LTC change point table, and an exclusive processing section 118 which controls queue-up processing exclusively.

The acquisition control section 111 includes a cache (not shown) with a predetermined capacity; and stores the LTC data or the FTC data supplied from the real-time metadata processing section 66 temporarily in the cache and supplies the LTC data or the FTC data to the determination processing section 112 for every predetermined amount of data.

The determination processing section 112 performs various kinds of determination processing on the basis of various kinds of data supplied from each section and stores various kinds of data, or supplies an element of the generated LTC change point table to the registration processing section 117 on the basis of the determination result.

The data management section 113 manages input/output of the LTC data 121 and the FTC data 122 stored in the data storage section 114. For example, the data management section 113 supplies the LTC data or the FTC data, which has been supplied from the determination processing section 112, to the data storage section 114 in order to store it, or acquires the LTC data 121 or the FTC data 122 stored in the data storage section 114 in response to the request of the determination processing section 112 and supplies it to the determination processing section 112.

The data storage section 114 is a storage medium, such as a hard disk, for example. The data storage section 114 supplies to the data management section 113 the LTC data 121 or the FTC data 122 stored in the storage region in response to the request of the determination processing section 113 or stores the LTC data or the FTC data supplied from the data management section 113.

The section setting management section 115 acquires the section name 123 stored in the section setting storage section 116 in response to the request of the determination processing section 112 and supplies it to the determination processing section 112, or supplies to the section setting storage section 116 the section name supplied from the determination processing section 112 in order to store the section name. The section setting storage section 116 is a storage medium, such as a hard disk, for example. The section setting storage section 116 supplies to the section setting management section 115 the section name 123 stored in the storage region in response to the request of the section setting management section 115, or stores the section name supplied from the section setting management section 115.

In addition, this section is a section inserted at the change point of adjacent LTCs when dividing a clip by the LTC change point. As described above, the LTC change point is a frame where the change pattern (LTC change pattern), such as an increase or decrease in the value of the LTC, changes. As will be described later, the LTC change point is a frame whose LTC change pattern is different from the LTC change pattern of the next frame, among frames classified according to a plurality of LTC change patterns set in advance. That is, all the LTC change patterns of frames included in one section are the same. That is, this section is set by dividing all frames included in a clip according to the LTC change pattern and collecting consecutive frames whose LTC change patterns are the same.

Generally, the image data of a clip is formed by a plurality of frames and has a plurality of LTC change points. Since the section is inserted at the change point of adjacent LTCs, a clip can be divided into one or more sections.

In addition, the LTC change pattern is matched with the LTC or the FTC of the corresponding change point as a status of the section and is registered in the LTC change table, as will be described later. Examples of the LTC change pattern include "increment" indicating that the value of the LTC in the next frame is larger by 1 than the value of the LTC in the current frame, "increase" indicating that the value of the LTC in the next frame is larger by 2 or more than the value of the LTC in the current frame, "still" indicating that the value of the LTC in the next frame is the same as the value of the LTC in the current frame, "decrease" indicating that the value of the LTC in the next frame is smaller by 1 or more than the value of the LTC in the current frame, "end" indicating that there is no following frame (current frame is a final frame of a clip), and "over" indicating that the free space of the memory 38 used to create the LTC change point table is insufficient since elements of the generated LTC change point table have been accumulated.

The section setting storage section 116 stores such an LTC change point table, that is, the name of the status of the section as the section name 123.

The registration processing section 117 supplies the element of the LTC change point table supplied from the determination processing section 112 to the memory 38 through the memory controller 37.

The exclusive processing section 118 controls exclusively queue-up processing based on a frame reproduction instruction transmitted from a queue-up processing section, which will be described later. That is, the exclusive processing section 118 restricts processing of creating the LTC change point table and processing of writing the LTC change point table into the memory 38 when there is a frame reproduction instruction and also makes it possible to refer to the LTC change point table written until then.

In the present embodiment, the information acquisition processing of the acquisition control section 111 is restricted by the exclusive processing section 118 which receives a frame reproduction instruction. In addition, writing completion information of the LTC change point table is generated by the exclusive processing section 118, and this information is output through the registration processing section 117 and is written into the memory 38. However, the method of restricting the processing of writing the LTC change point table is not limited. For example, determination processing of the determination processing section 112 may be restricted by the exclusive processing section 118.

Figure 5:
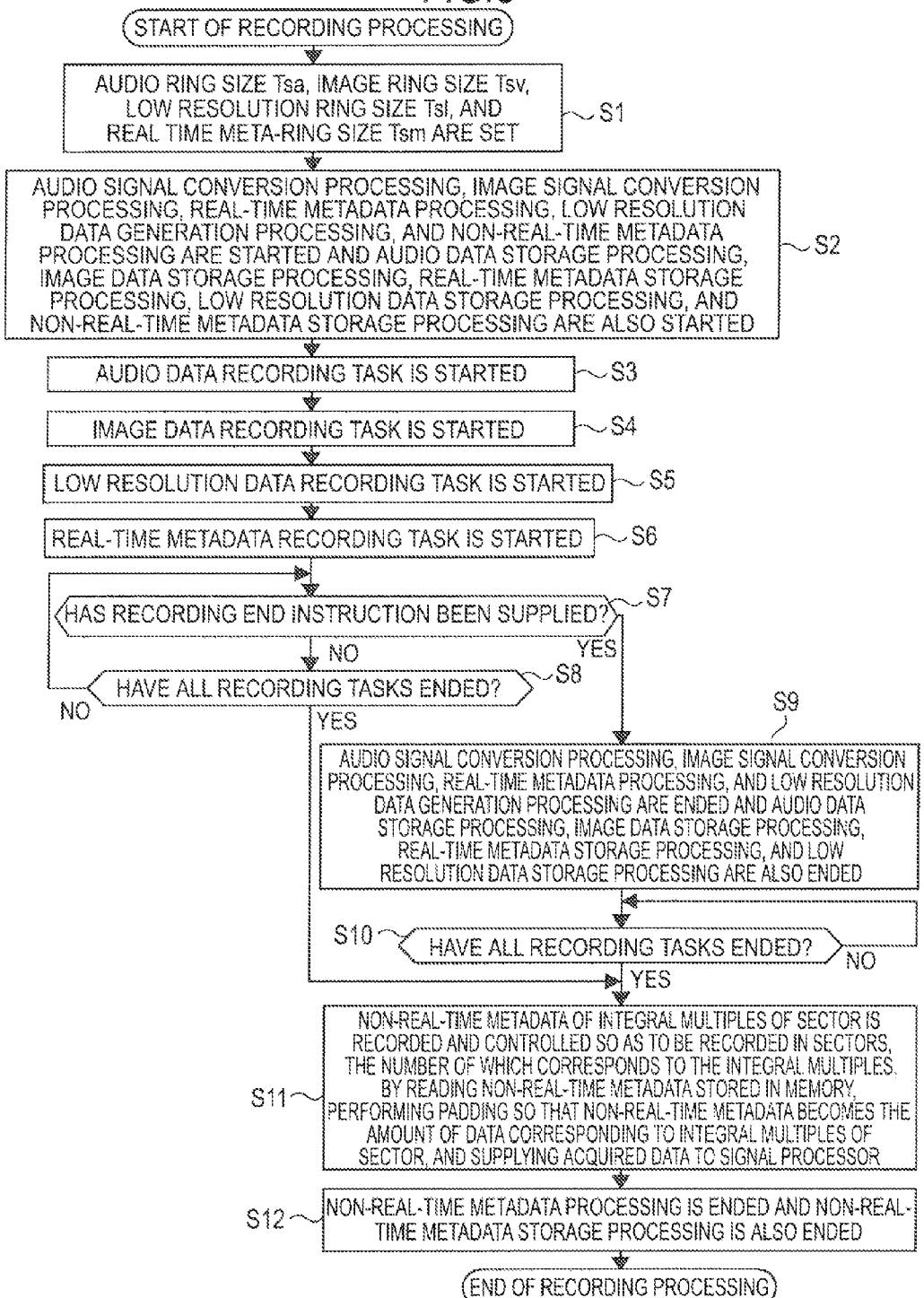
FIG. 5 is a flowchart illustrating recording processing of a control unit shown in FIG. 2.

FIG. 5 is a flow chart showing an example of content data recording processing performed by the control unit 40 according to the present embodiment.

When an operation signal instructing the start of recording processing by operation of the operation unit 41 is supplied from the operation unit 41 to the control unit 40, the control unit 40 starts recording processing.

That is, the control unit 40 sets first the audio ring size Tsa, the image ring size Tsv, the low resolution ring size Tsl, and the real time meta-ring size Tsm in step Sl.

Here, the audio ring size Tsa is a variable which determines the amount of audio data collectively disposed and recorded on the optical disc 31 and is expressed by the audio signal reproduction time, for example. Similarly, the image ring size Tsv is a variable which determines the amount of image data collectively disposed and recorded on the optical disc 31 and is expressed by the image signal reproduction time, for example.

In addition, the low resolution ring size Tsl is a variable which determines the amount of low resolution data collectively disposed and recorded on the optical disc 31. For example, the low resolution ring size Tsl is expressed by the reproduction time of an image signal (or an audio signal), which is the origin of the low resolution data, similar to the audio ring size Tsa and the image ring size Tsv. Similarly, the real time meta-ring size Tsm is a variable which determines the amount of real-time metadata collectively disposed and recorded on the optical disc 31. For example, the real time meta-ring size Tsm is expressed by the reproduction time of an image signal (or an audio signal), various kinds of information (for example, date and time when an image is captured) of which are explained by the real-time metadata, similar to the audio ring size Tsa and the image ring size Tsv.

In addition, the reason why the audio ring size Tsa, the image ring size Tsv, the low resolution ring size Tsl, and the real time meta-ring size Tsm are not expressed by the amount of data itself, such as the number of bits or the number of bytes, but expressed by the reproduction time, that is, expressed indirectly is as follows.

That is, according to the recording processing in FIG. 5, audio ring data, which is a collection of audio data for every amount of data based on the audio ring size Tsa extracted from a series of audio data, image ring data, which is a collection of image data for every amount of data based on the image ring size Tsv extracted from a series of image data, are periodically disposed and recorded on the optical disc 31. In addition, low resolution ring data, which is a collection of low resolution data for every amount of data based on the low resolution ring size Tsl extracted from the data series of the low resolution data, and real time meta-ring data, which is a collection of real-time metadata for every amount of data based on the real time meta-ring size Tsm extracted from the data series of the real-time metadata, are also recorded on the optical disc 31.

Thus, in the case of periodically disposing and recording the audio ring data, the image ring data, the low resolution ring data, and the real time meta-ring data on the optical disc 31, if reproduction of an image and an audio is taken into consideration, it is not possible to perform the reproduction unless an image signal and an audio signal associated with the image signal are prepared. From the point of view of such reproduction, the audio ring data in a certain reproduction time zone and an image ring data in the certain reproduction time zone should be recorded at the positions close to each other on the optical disc 31, that is, at the adjacent positions, for example.

In addition, since the low resolution ring data is obtained by reducing the amount of audio ring data or image ring data, the audio ring data and the image ring data in a certain reproduction time zone and the low resolution ring data obtained by reducing the amount of audio ring data or image ring data in the reproduction time zone should be recorded at the positions close to each other on the optical disc 31. In addition, since the real time meta-ring data expresses the information regarding the audio ring data or the image ring data, the audio ring data and the image ring data in a certain reproduction time zone and the real time meta-ring data expressing the information regarding the audio ring data or the image ring data in the reproduction time zone should also be recorded at the positions close to each other on the optical disc 31.

However, if the amount of audio data and the amount of image data in the same reproduction time are compared with each other, these amounts of data are greatly different in general. That is, the amount of audio data in a certain reproduction time is quite small compared with the amount of image data in the reproduction time. In addition, the data rate of audio data or image data may not be fixed but change. Similarly, if the data rate of audio data or image data is compared with the data rate of low resolution data or real-time metadata in the same reproduction time, the data rate of the low resolution data or the real-time metadata is low compared with the data rate of the audio data or the image data.

Therefore, if the audio ring size Tsa and the image ring size Tsv are expressed as the amount of data and audio ring data and image ring data for each amount of data are extracted from a series of audio data and image data in a sequential manner, respectively, audio ring data in the (earlier) reproduction time zone in which the reproduction time has elapsed gradually is acquired for the image ring data in each reproduction time zone. As a result, it becomes difficult to dispose the audio data and the image data, which should be reproduced in the same reproduction time zone, at the positions close to each other on the optical disc 31.

Similarly, if the low resolution ring size Tsl and the real time meta-ring size Tsm are expressed as the amount of data, it becomes difficult to dispose the audio data, the image data, the low resolution data, and the real-time metadata, which should be reproduced in the same reproduction time zone, at the positions close to each other on the optical disc 31 in the same manner as in the case where the audio ring size Tsa and the image ring size Tsv described above are expressed as the amount of data.

Therefore, the audio ring size Tsa, the image ring size Tsv, the low resolution ring size Tsl, and the meta-ring size Tsm are expressed as the reproduction time, so that the audio data, the image data, the low resolution data, and the real-time metadata which should be reproduced in the same reproduction time zone can be disposed at the positions close to each other on the optical disc 31.

In addition, the values of the audio ring size Tsa, the image ring size Tsv, the low resolution ring size Tsl, and the real time meta-ring size Tsm set in step S1 may be fixed values set in advance or may be variable values. When the values of the audio ring size Tsa, the image ring size Tsv, the low resolution ring size Tsl, and the real time meta-ring size Tsm are set as variable values, the variable values may be input by operating the operation unit 41, for example.

After the processing of step Si, the process proceeds to step S2. In step S2, the control unit 40 controls the data converter 39 to perform compression encoding of the audio signal and the image signal, which are supplied from the signal input/output device 51 to the disk recording and reproducing apparatus 30, and start audio signal conversion processing and image signal conversion processing for a series of audio data and a series of image data, respectively, and also controls the memory controller 37 to start audio data storage processing and image data storage processing in which the audio data and the image data acquired by the data converter 39 are supplied to the memory 18 and stored in the memory 18.

Moreover, in step S2, the control unit 40 controls the data converter 39 to start real-time metadata processing, in which a series of real-time metadata supplied from the signal input/output device 51 to the disk recording and reproducing apparatus 30 is processed, and low resolution data generation processing, in which a series of low resolution data is generated from the audio signal and the image signal supplied from the signal input/output device 51 to the disk recording and reproducing apparatus 30, and also controls the memory controller 37 to start real-time metadata storage processing and low resolution data storage processing in which the real-time metadata and the low resolution data acquired by the data converter 39 are supplied to the memory 38 and stored in the memory 38, respectively.

Moreover, in step S2, the control unit 40 controls the data converter 39 to start non-real-time metadata processing, in which processing on a series of non-real-time metadata supplied from the signal input/output device 51 to the disk recording and reproducing apparatus 30 is executed or processing regarding the LTC is executed using the LTC included in the acquired real-time metadata, and also controls the memory controller 37 to start non-real-time metadata storage processing in which the non-real-time metadata acquired by the data converter 39 is supplied to the memory 38 and stored in the memory 38.

Then, the control unit 40 starts the audio data recording task, which is a control task of recording the audio data on the optical disc 31, in step S3 and starts the image data recording task, which is a control task of recording the image data on the optical disc 31, in step S4. Then, the process proceeds to step S5. The control unit 40 starts the low resolution data recording task, which is a control task of recording the low resolution data on the optical disc 31, in step S5 and starts the real-time metadata recording task, which is a control task of recording the real-time metadata on the optical disc 31, in step S6. Then, the process proceeds to step S7.

In addition, any kind of algorithm for recording the data may be used for the audio data recording task in step S3, the image data recording task in step S4, the low resolution data recording task in step S5, and the real-time metadata recording task in step S6, and is not particularly limited.

In step S7, the control unit 40 determines whether or not an operation signal instructing the end of data recording has been supplied from the operation unit 41. When it is determined that the operation signal has been supplied from the operation unit 41, the process proceeds to step S8 in which the control unit 40 determines whether or not all the recording tasks have ended. When it is determined that all the recording tasks have not ended in step S8, the control unit 40 returns the processing to step S7 to repeat the processing from step S7.

On the other hand, when it is determined that the operation signal instructing the end of data recording has been supplied in step S7, that is, when the user operates the operation unit 41 to end the data recording, for example, the control unit 40 proceeds to step S9. In step S9, the control unit 40 ends the audio signal conversion processing, the image signal conversion processing, the real-time metadata processing, the low resolution data generation processing, the audio data storage processing, the image data storage processing, the real-time metadata storage processing, and the low resolution data storage processing started in step S2. Then, the process proceeds to step S10.

In step S10, the control unit 40 determines whether or not all the recording tasks have ended as in step S8 and waits until it is determined that all the recording tasks have ended.

In addition, when it is determined that all the recording tasks have ended in step S10, that is, when all of the audio data recording task started in step S3, the image data recording task started in step S4, the low resolution data recording tasks started in step S5, and the real-time metadata recording task started in step S6 have ended, the control unit 40 proceeds to step S11.

In addition, when it is determined that all the recording tasks have ended in step S8, that is, when all of the audio data recording task started in step S3, the image data recording task started in step S4, the low resolution data recording tasks started in step S5, and the real-time metadata recording task started in step S6 have ended, the control unit 40 proceeds to step S11.

In step S11, the control unit 40 controls the memory controller 37 to read the non-real-time metadata stored in the memory 38, performs padding so that the non-real-time metadata becomes the amount of data corresponding to the integral multiples of a sector, and supplies the acquired data to the signal processor 36. As a result, the non-real-time metadata of the integral multiples of a sector is recorded and controlled so as to be recorded in sectors the number of which corresponds to the integral multiples.

The sector referred to herein serves as a physical recording and reproducing unit (physical unit region) formed on the optical disc 31. Moreover, for example, an ECC block, in which data of a unit on which ECC (Error Correction Code) processing is performed is recorded, may be used as a physical unit region of the optical disc 31. In addition, it is also possible to use a fixed number of sectors or a fixed number of ECC blocks.

In step S12, the control unit 40 ends the non-real-time metadata processing and also ends the non-real-time metadata storage processing, thereby ending the recording processing.

In the present embodiment, the audio ring data, the image ring data, the low resolution ring data, and the real time meta-ring data are recorded repeatedly in this order from the inner periphery toward the outer periphery of the optical disc 31. In addition, non-real-time metadata for which real time is not requested is recorded in a different region from the above-described ring data.

In the present embodiment, the audio ring data, the image ring data, the low resolution ring data, and the real time meta-ring data are recorded repeatedly in this order from the inner periphery toward the outer periphery of the optical disc 31. That is, non-real-time metadata may be recorded after a plurality of ring data items are recorded, and then other ring data may be recorded consecutively. Alternatively, the non-real-time metadata may be collectively recorded in a region other than the region where the ring data is stored.

In addition, since the non-real-time metadata is metadata for which real time is not requested, it is not necessary to consider the seek time generally. For this reason, the non-real-time metadata may be disposed at any physical position of the storage region of the optical disc 31. For example, one non-real-time metadata item may be recorded so as to be distributed at a plurality of positions.

As described above, the real-time metadata includes the data of an LTC, a user bit, a UMID, an essence mark, ARIB metadata, or setting/control information regarding a video camera with which imaging is performed, for example.

Figure 6:
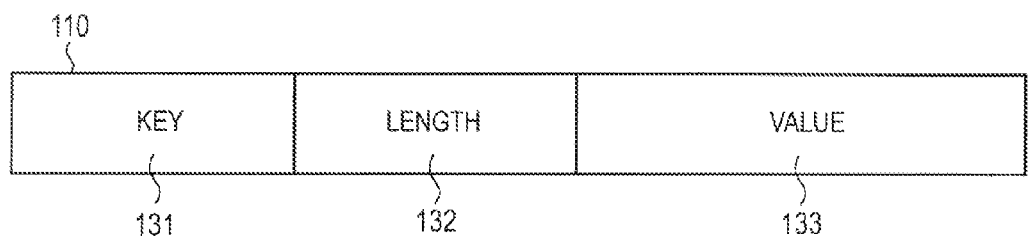
FIG. 6 is a schematic view illustrating an example of the data structure of KLV-encoded data.

In the present embodiment, these data items are KLV-encoded data (hereinafter, referred to as KLV data) including key data (Key) 131, length data (Length) 132, and value data (Value) 133, as shown in FIG. 6. This format is based on SMPTE 335M/RP214.

The key data 131 of the KLV data 110 is an identifier indicating the KLV-encoded data item. As this identifier, identifiers corresponding to various kinds of data items defined in the metadata dictionary of SMPTE are used. The length data 132 of the KLV data 110 is data indicating the length of the value data 133 in a byte unit. The value data 133 of the KLV data 110 is data of the data body, such as text data including an XML (eXtensible Markup Language) document. That is, the KLV data 110 is data of the data item shown in the key data 131, is data of the data length shown in the length data 132, and is encoded data of the data shown in the value data 133.

The real-time metadata includes the above-described various kinds of data which are KLV data with such a data structure. The real-time metadata including these data items is largely divided into two parts of an integral part and a (selected part, from the content of each data item. The integral part is data included in the real-time metadata corresponding to all frames and is configured to include various kinds of data including other KLV data, such as an LTC, a user bit, a UMID, and an essence mark. The selected part is configured to include data included in the real-time metadata when necessary. Examples of the data included in the selected part include ARIB metadata and video camera setting/control information.

In addition, the data lengths of both the integral part and the selected part are fixed lengths set in advance. In addition, it is necessary for the real-time metadata to be data for which real time is requested in order to support data transfer using a synchronous communication interface, such as the SDI. Accordingly, the integral part (and the selected part) is formed as one file based on the BIM (BInary Format for MPEG-7) format so that the real-time metadata can be written/read into/from the optical disc 31 or the like at high speed.

Here, data based on the BIM format is obtained by converting data based on the XLM format into binary data. Various kinds of data included in the real-time metadata described above may also be expressed by the XML. In the case of the XML, however, the amount of data is increased. Accordingly, the XML is not suitable for the real-time metadata for which reducing the reading and writing time is desirable (for which real time is requested). Therefore, it is possible to realize the real-time property of real-time metadata by using the BIM which is a binary expression with the information equivalent to the XLM expression. In addition, due to using the data based on the BIM format for real-time metadata, not only can a data region on the optical disc 31 necessary for the recording of the real-time metadata be reduced, but also the writing time and the reading time can be shortened. Furthermore, it is also possible to reduce a storage region in a memory which stores data during writing and reading processing. Accordingly, it is possible to improve the overall processing speed of writing and reading.

As described above, the control unit 40 controls the real-time metadata processing section 66 so that the real-time metadata, which is supplied to the real-time metadata processing section 66 through the data amount detecting section 62 and includes the above-described KLV data, is recorded on the optical disc 31 through the memory controller 37.

However, for example, when an image signal or an audio signal is input from a video camera (not shown) used for imaging to the disk recording and reproducing apparatus (disk drive) 30 through the signal input/output device 51, that is, when an image signal or an audio signal acquired by the imaging is supplied to the disk recording and reproducing apparatus 30 without metadata added, metadata, such as an LTC, is not added to the image signal or the audio signal. For example, when the disk recording and reproducing apparatus 30 is integral with a video camera, an image signal or an audio signal acquired by imaging is supplied to the data converter 39 without performing processing for adding the real-time metadata or the like.

In such a case, the control unit 40 controls the real-time metadata processing section 66 of the data converter 39 so that the LTC data processing section 71 provided in the real-time metadata processing section 66 executes LTC data generation processing of generating the LTC data.

The control section 101 of the LTC data processing section 71 executes the LTC data generation processing. When the generation of LTC data is instructed by the real-time metadata processing section 66 controlled by the control unit 40, the control section 101 of the LTC data processing section 71 generates the LTC data in synchronization with a frame of the image signal supplied from the signal input/output device 51 to the data converter 39 and supplies the LTC data to the real-time metadata processing section 66.

Figure 7:
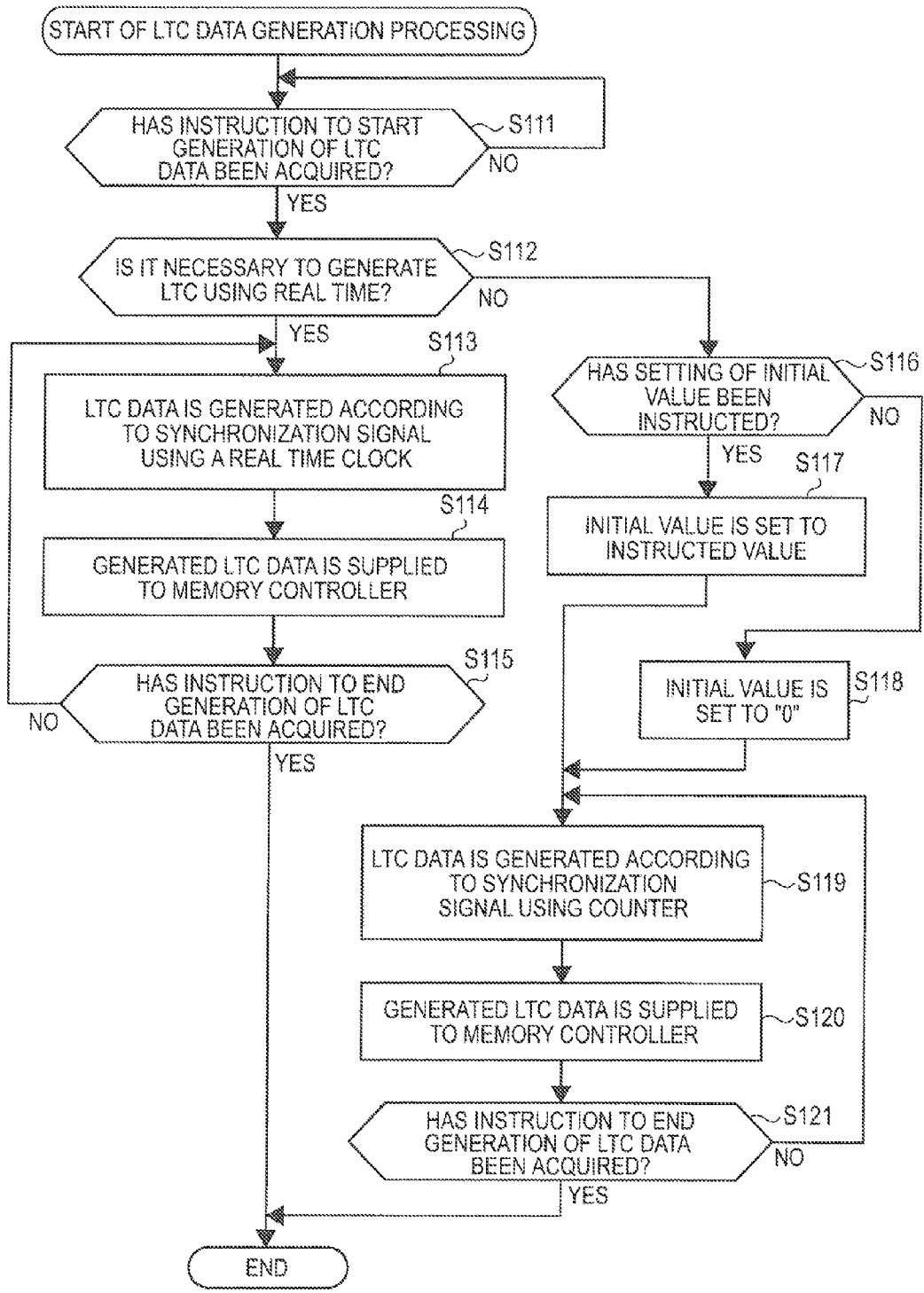
FIG. 7 is a flow chart illustrating an example of LTC data generation processing.

The LTC data generation processing performed by the control section 101 of the LTC data processing section 71 will be described with reference to the flow chart in FIG. 7.

First, in step S111, the control section 101 determines whether or not an instruction to start the generation of LTC data has been acquired from the real-time metadata processing section 66, and waits until it is determined that the instruction has been acquired.

When it is determined that the instruction to start the generation of LTC data has been acquired, the control section 101 proceeds to step S112 to determine whether or not to generate an LTC using real time.

The generation of LTC data may be performed using the actual time or may be performed using the initial value set in advance. The control unit 40 supplies to the real-time metadata processing section 66 of the data converter 39 such information received through the operation unit 41, that is, information instructing whether or not to generate the LTC data using the actual time and information indicating whether or not the initial value has been set when generating the LTC data without using the actual time, for example.

The real-time metadata processing section 66 instructs the start of generation of LTC data and supplies such information to the control section 101 of the LTC data processing section 71. In step S112, the control section 101 determines whether or not to generate an LTC using actual time (real time) on the basis of such supplied information.

When it is determined that the LTC using real time is generated in step S112, the control section 101 proceeds to step S113. In step S113, the control section 101 generates the LTC data according to a synchronization signal using a real time clock by controlling the LTC generating section 102 and the real time clock 105 as described above.

That is, the control section 101 supplies the synchronization signal to the real time clock 105 and supplies the information regarding the real time to the LTC generating section 102 according to the synchronization signal. In addition, the control section 101 supplies the synchronization signal to the LTC generating section 102, so that the LTC generating section 102 generates the LTC data according to the synchronization signal on the basis of the information regarding the real time supplied from the real time clock 105.

After the processing of step S113 ends, the control section 101 proceeds to step S114. In step S114, the control section 101 controls the LTC generating section 102 to supply the generated LTC data to the real-time metadata processing section 66 and accordingly to the memory controller 37. That is, the real-time metadata processing section 66 supplies the LTC data supplied from the LTC data processing section 71, as real-time metadata, to the memory controller 37.

In step S115, the control section 101 which has supplied the LTC data determines whether or not an instruction to end the generation of LTC data supplied from the real-time metadata processing section 66 has been acquired similar to the control signal or the synchronization signal described above. The control unit 40 supplies an instruction to end the generation of LTC data to the real-time metadata processing section 66 of the data converter 39 on the basis of a user's instruction input through the operation unit 41. When an instruction to end the generation of LTC data is acquired, the real-time metadata processing section 66 supplies the instruction to the control section 101 of the LTC data processing section 71. In step S115, the control section 101 determines whether or not the instruction has been acquired.

When it is determined that the instruction to end the generation of LTC data has not been acquired in step S115, the control section 101 returns the processing to step S113 to repeat the processing from step S113. In addition, when it is determined that the instruction to end the generation of LTC data has been acquired, the control section 101 ends the LTC data generation processing.

Meanwhile, when it is determined that the LTC is generated without using real time in step S112, the control section 101 proceeds to step S116. In step S116, the control section 101 determines whether or not the setting of the initial value has been instructed on the basis of the information acquired from the real-time metadata processing section 66 as described above.

When it is determined that the setting of the initial value has been instructed, the control section 101 proceed to step S117. In step S117, the control section 101 controls the initial value setting section 103 to set the initial value of the LTC to the instructed value. That is, in this case, the control section 101 supplies the information (instructed initial value) regarding the instruction of the initial value to the initial value setting section 103 so that the initial value setting section 103 sets the initial value of the LTC to that value. The initial value setting section 103 supplies the set initial value to the LTC generating section 102. After the setting of the initial value ends, the control section 101 proceeds to step S119.

In addition, when it is determined that the setting of the initial value has not been instructed in step S116, the control section 101 proceed to step S118. In step S118, the control section 101 controls the initial value setting section 103 to set the initial value of the LTC to "0". That is, in this case, the control section 101 supplies the information regarding the value "0" to the initial value setting section 103 so that the initial value setting section 0 sets the initial value of the LTC to "0". The initial value setting section 103 supplies the set initial value to the LTC generating section 102. After the setting of the initial value ends, the control section 101 proceeds to step S119.

In step S119, the control section 101 controls the LTC generating section 102 and the counter 104 so that the LTC data is generated according to a synchronization signal using the counter 104. That is, the counter 104 performs counting processing according to the synchronization signal supplied from the control section 101 and supplies the calculated count value to the LTC generating section 102 in a sequential manner. The LTC generating section 102 operates in synchronization with the synchronization signal supplied from the control section 101, and generates the LTC data using the initial value supplied from the initial value setting section 103 and the counter value supplied from the counter 104.

After the processing of step S119 ends, the control section 101 controls the LTC generating section 102 to supply the generated LTC data to the real-time metadata processing section 66 and accordingly to the memory controller 37 in step S120. That is, the real-time metadata processing section 66 supplies the LTC data supplied from the LTC data processing section 71, as real-time metadata, to the memory controller 37.

In step S121, the control section 101 which has supplied the LTC data determines whether or not an instruction to end the generation of LTC data supplied from the real-time metadata processing section 66 has been acquired, in the same manner as in the case of the processing of step S115. The control unit 40 supplies an instruction to end the generation of LTC data to the real-time metadata processing section 66 of the data converter 39 on the basis of a user's instruction input through the operation unit 41. When an instruction to end the generation of LTC data is acquired, the real-time metadata processing section 66 supplies the instruction to the control section 101 of the LTC data processing section 71. In step S121, the control section 101 determines whether or not the instruction has been acquired.

When it is determined that the instruction to end the generation of LTC data has not been acquired in step S121, the control section 101 returns the processing to step S119 to repeat the processing from step S119. In addition, when it is determined that the instruction to end the generation of LTC data has been acquired, the control section 101 ends the LTC data generation processing.

The LTC data generated as described above and supplied to the memory controller 37 is processed as the real-time metadata and is recorded on the optical disc 31 together with audio data or image data as described above.

By recording the LTC data generated as described above as the real-time metadata together with the essence data, the disk recording and reproducing apparatus 30 in FIG. 1 can be configured such that the user can perform reproduction control processing more easily when reproducing the essence data as will be described later. The essence data is content data to be edited which includes image data or audio data, for example.

In addition, the real-time metadata processing section 66 supplies the LTC data acquired from the LTC data processing section 71 or the data amount detecting section 62 not only to the memory controller 37 but also to the non-real-time metadata processing section 67. The non-real-time metadata processing section 67 supplies the acquired LTC data to the LTC data processing section 72 provided in the non-real-time metadata processing section 67. In addition, the non-real-time metadata processing section 67 supplies to the LTC data processing section 72 the necessary information, such as a control signal, a synchronization signal, or FTC data supplied from the control unit 40. In addition, such information is supplied to each frame of the image data. Accordingly, the LTC data processing section 72 executes LTC change point table creation processing and generates an LTC change point table as the non-real-time metadata on the basis of such information supplied to each frame.

Figure 8:
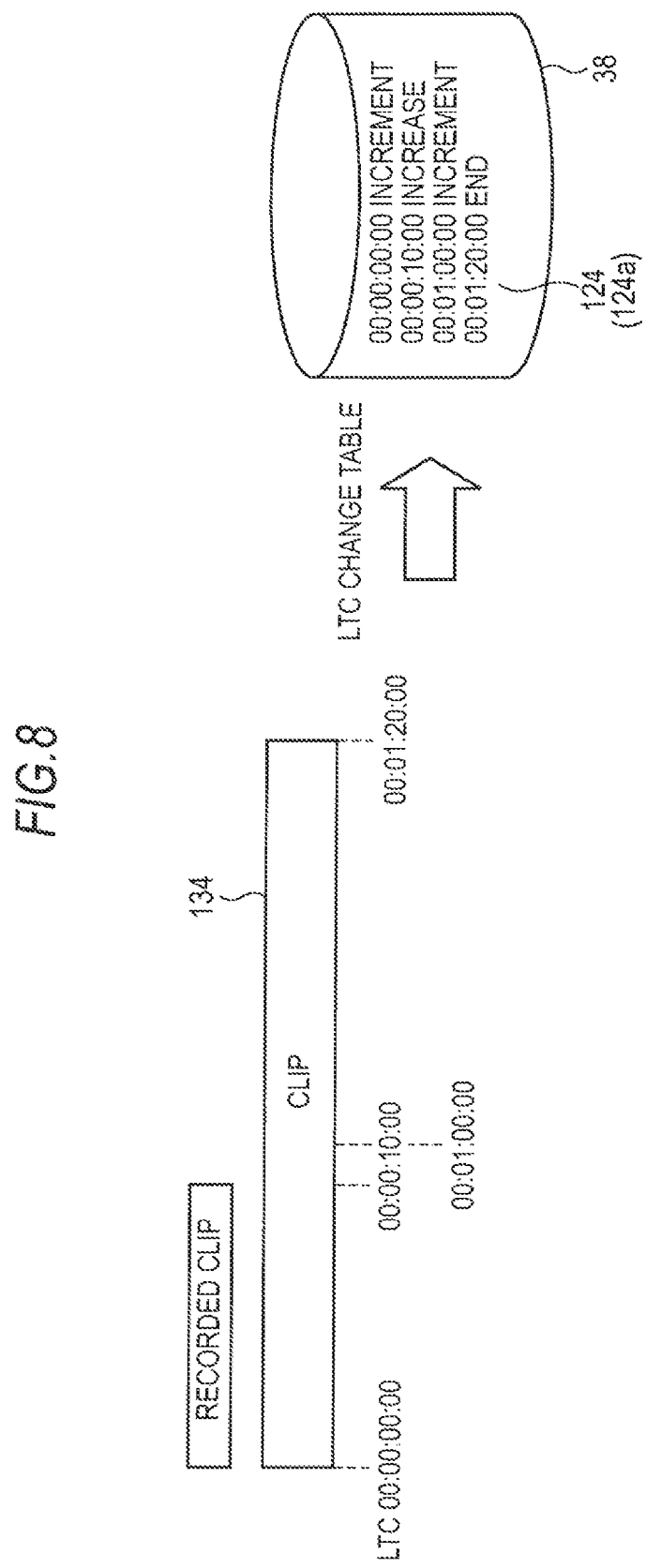
FIG. 8 is a view for explaining LTC change point table creation processing performed by the LTC data processing section shown in FIG. 4.

The LTC change point table creation processing performed by the LTC data processing section 72 of the non-real-time metadata processing section 67 will be described. First, processing of creating an LTC change point table 124 when there is no request for queue-up processing while a clip 134 is being recorded, that is, there is no frame reproduction instruction as shown in FIG. 8 will be described. In this case, an LTC change point table 124*a* is created on the basis of the LTC data of all frames in the recorded clip.

Figure 9:
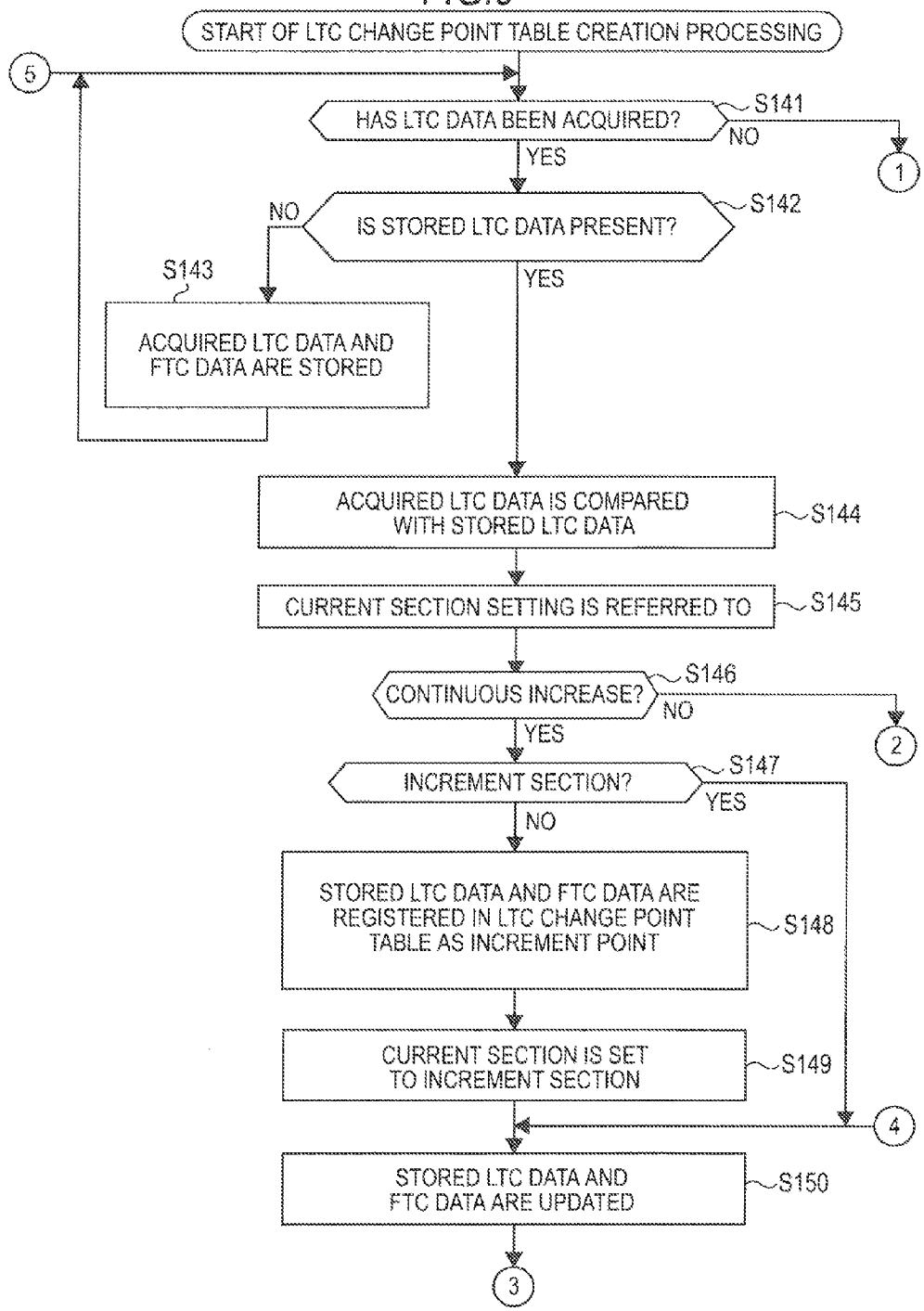
FIG. 9 is a flowchart illustrating the LTC change point table creation processing.
Figure 10:
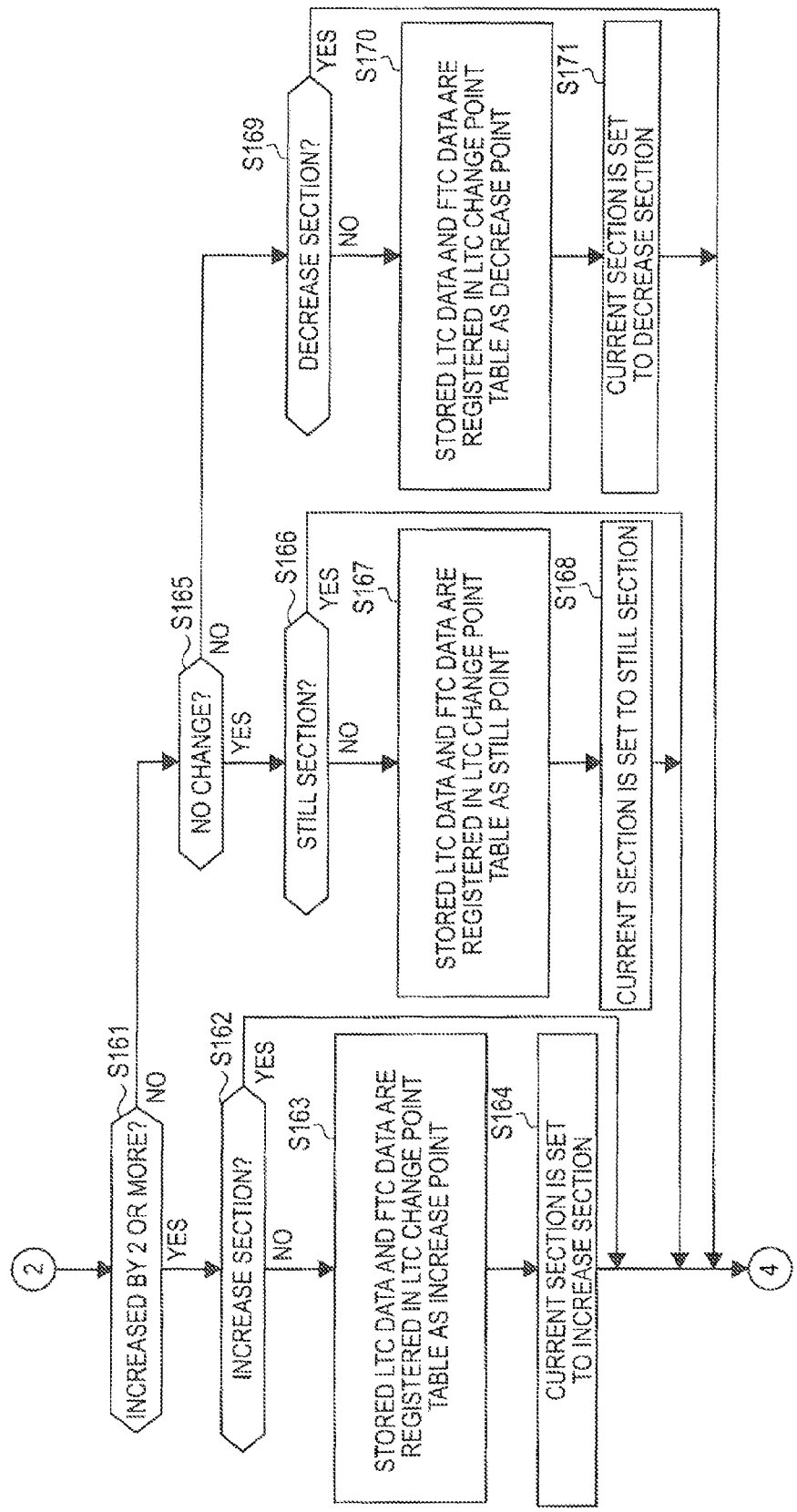
FIG. 10 is a flow chart following FIG. 9 which illustrates the LTC change point table creation processing.
Figure 11:
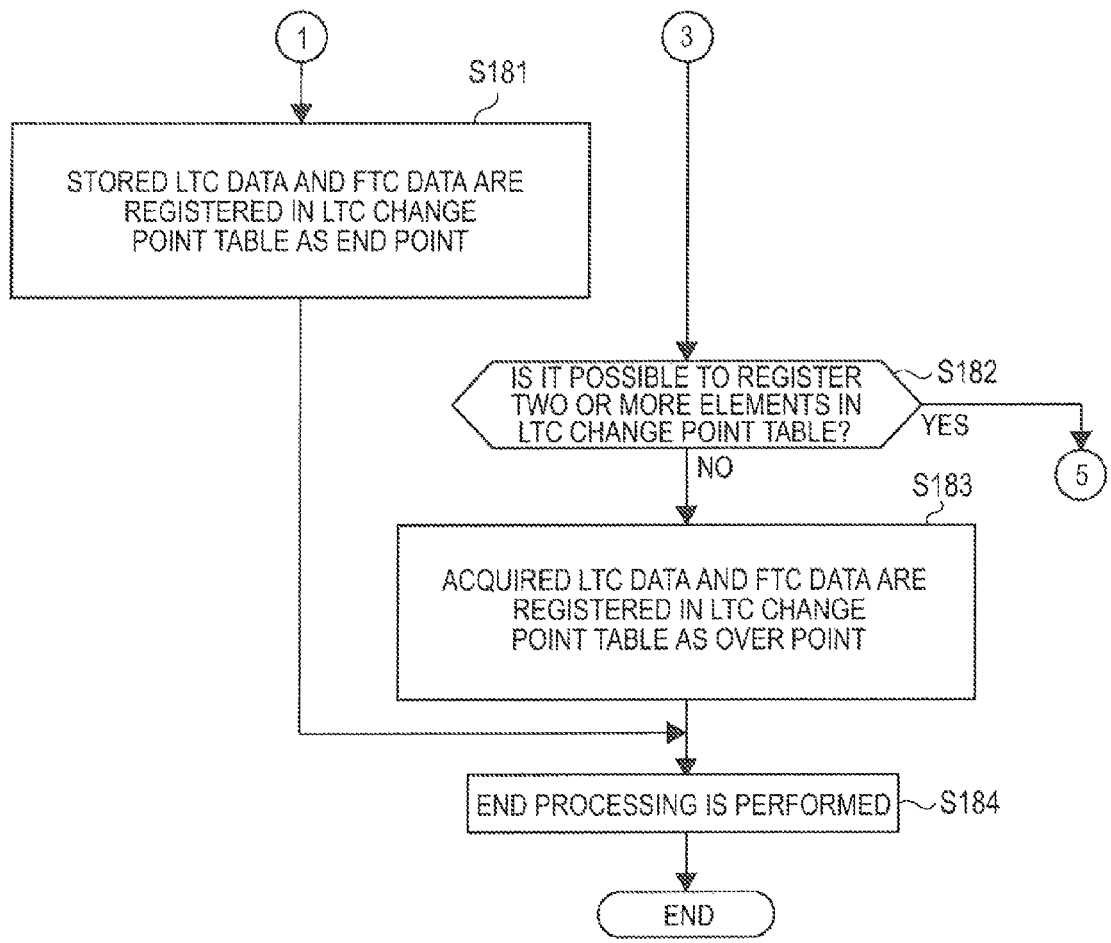
FIG. 11 is a flow chart following FIG. 10 which illustrates the LTC change point table creation processing.

FIGS. 9 to 11 are flow charts showing an example of processing of creating the LTC change point table 124*a* in the above case. In addition, FIGS. 12A to 17B are views for explaining the steps shown in FIGS. 9 to 11.

First, in step S141, the acquisition control section 111 determines whether or not the LTC data has been acquired. When it is determined that the LTC data has been acquired, the acquisition control section 111 supplies to the determination processing section 112 the LTC data and FTC data, which corresponds to the LTC data and is supplied simultaneously with the LTC data, and the process proceeds to step S142.

The determination processing section 112 which has acquired the LTC data from the acquisition control section 111 controls the data management section 113 to check whether or not the LTC data stored in the data storage section 114 is present. The data management section 113 accesses the data storage section 114 on the basis of this control, checks whether or not the LTC data 121 is stored, and supplies the identification result to the determination processing section 112. In step S142, the determination processing section 112 determines whether or not the LTC data stored in the data storage section 114 is present on the basis of the supplied identification result.

For example, when the acquisition control section 111 acquires the LTC data corresponding to the head frame of a clip in step S141 and determines that the LTC data 121 is not present in the data storage section 114, the determination processing section 112 proceeds to step S143. In step S143, the determination processing section 112 supplies the acquired LTC data and FTC data to the data storage section 114 through the data management section 113 so that the LTC data and the FTC data are stored. The data storage section 114 stores the LTC data and the FTC data acquired through the data management section 113 in the storage region. After the LTC data and the FTC data are stored in the data storage section 114, the determination processing section 112 proceeds to step S141 to repeat the processing from step S141 for the LTC data and the FTC data of the next frame.

In addition, when it is determined that the LTC data 121 stored in the data storage section 114 is present in step S142, the determination processing section 112 proceeds to step S144. In step S144, the determination processing section 112 controls the data management section 113 to acquire the LTC data 121 from the data storage section 114 and compares the value of the LTC data (acquired LTC data) supplied from the acquisition control section 111 with the value of the LTC data (stored LTC data) acquired from the data storage section 114. Then, in step S145, the determination processing section 112 controls the section setting management section 115 to refer to the section name 123 stored in the section setting storage section 116, that is, a current section setting (status).

After the processing of step S145 ends, the determination processing section 112 proceeds to step S146. In step S146, the determination processing section 112 determines whether or not the value of the acquired LTC data is larger than the value of the stored LTC data by 1 (continuous increase) on the basis of the comparison result obtained in step S144. When it is determined that the value of the acquired LTC data increases continuously, the process proceeds to step S147. In step S147, the determination processing section 112 determines whether or not the current section is an increment section (section whose status is "increment") on the basis of the reference result referred to in step S145.

When it is determined that the current section is not an increment section, the determination processing section 112 determines that the status (that is, a section) has changed and proceeds to step S148 in order to set the frame (frame corresponding to the stored LTC data) as the LTC change point. In step S148, the determination processing section 112 controls the data management section 113 to acquire the LTC data 121 and the FTC data 122, which are stored in the data storage section 114, and to add the status information (in this case, increment) to the LTC data and the FTC data. Then, the determination processing section 112 supplies the LTC data, the FTC data, and the status information to the registration processing section 117 as elements of the LTC change point table. The registration processing section 117 supplies the elements of the LTC change point table to the memory 38 as the increment point (change point whose status is "increment") and registers them in the LTC change point table.

After the processing of step S148 ends, the determination processing section 112 supplies the status determined at this time to the section setting storage section 116 through the section setting management section 115 and stores the status as the section name 123 to set the current section to an increment section in step S149. Then, the process proceeds to step S150. In addition, when it is determined that the current section is an increment section in step S147, the determination processing section 112 omits the processing of steps S148 and S149 and proceeds to step S150.

FIG. 12A is a view showing an example of the relationship between the FTC and the LTC in the increment section. In FIG. 12A, the horizontal axis indicates the FTC of a frame and the vertical axis indicates the LTC of a frame. In FIG. 12A, for example, the value of the LTC of a frame with an FTC value "N" (frame with a frame number N) is "M", the value of the LTC of the next frame (frame with an FTC value "N+1") is "M+1", and the value of the LTC of the next frame (frame with an FTC value "N+2") is "M+2". Thus, in the increment section, the value of the LTC in consecutive frames increases by 1 as the FTC increases by 1.

For example, if a frame group (frame group in which the LTC increases continuously) shown in FIG. 12A is input to the data converter 39 when the status is not set (when the section setting storage section 116 does not store the section name 123) or when the set status is not "increment" (when the content of the section name 123 stored in the section setting storage section 116 is not "increment"), the determination processing section 112 determines that the status has changed to "increment" (section has changed) and creates an element 141 of the LTC change point table 124 shown in FIG. 12B using the frame with the frame number N, which is the first frame, as an increment point.

As described above, each element of the LTC change point table includes three items of a "frame number" indicating the FTC of the LTC change point, "LTC" indicating the LTC of the LTC change point, and "status" indicating the kind of change pattern of the LTC in a frame after the LTC change point. In the case of the element 141 shown in FIG. 12B, the value of the item "frame number" is "N", the value of the item "LTC" is "M", and the item "status" is "increment". The determination processing section 112 which has created such an element 141 supplies this to the registration processing section 117 and registers the element 141 in the LTC change point table 124 stored in the memory 38.

In addition, if a frame group (frame group in which the LTC increases continuously) shown in FIG. 12A is input to the data converter 39 when the content of the section name 123 stored in the section setting storage section 116 is "increment", the determination processing section 112 determines that the status has not changed (the same section continues) and does not create the element 141 (does not update the status).

In step S150, the determination processing section 112 controls the data management section 113 to supply to the data storage section 114 the LTC data and the FTC data acquired through the acquisition control section 111 and updates the LTC data 121 and the FTC data 122, which are stored in the data storage section 114, using the acquired LTC data and FTC data.

After the updating ends, the determination processing section 112 proceeds to step S184 in FIG. 11.

In addition, when it is determined that the value of the acquired LTC data is not larger by 1 than the value of the stored LTC data (the value of the acquired LTC data does not increase continuously) in step S146, the determination processing section 112 proceeds to step S161 in FIG. 10.

In step S161 in FIG. 10, the determination processing section 112 determines whether or not the value of the acquired LTC data is larger than the value of the stored LTC data by 2 or more on the basis of the comparison result obtained in step S144 in FIG. 9. When it is determined that the value of the acquired LTC data increases by 2 or more, the process proceeds to step S162. In step S162, the determination processing section 112 determines whether or not the current section is an increase section (section whose status is "increase") on the basis of the reference result referred to in step S145 in FIG. 9.

When it is determined that the current section is not an increase section, the determination processing section 112 determines that the status (that is, a section) has changed and proceeds to step S163 in order to set the frame (frame corresponding to the stored LTC data) as the LTC change point. In step S163, the determination processing section 112 controls the data management section 113 to acquire the LTC data 121 and the FTC data 122, which are stored in the data storage section 114, and to add the status information (in this case, increase) to the LTC data and the FTC data. Then, the determination processing section 112 supplies the LTC data, the FTC data, and the status information to the registration processing section 117 as elements of the LTC change point table. The registration processing section 117 supplies the elements of the LTC change point table to the memory 38 as the increase point (change point whose status is "increase") and registers them in the LTC change point table.

After the processing of step S163 ends, the determination processing section 112 supplies the status determined at this time to the section setting storage section 116 through the section setting management section 115 and stores the status as the section name 123 to set the current section to an increase section in step S164. Then, the determination processing section 112 returns the processing to step S150 in FIG. 9 to repeat the processing from step S150. In addition, when it is determined that the current section is an increase section in step S162 in FIG. 10, the determination processing section 112 omits the processing of steps S163 and S164 and returns the processing to step S150 in FIG. 9.

FIG. 13A is a view showing an example of the relationship between the FTC and the LTC in the increase section. In FIG. 13A, the horizontal axis indicates the FTC of a frame and the vertical axis indicates the LTC of a frame. In FIG. 13A, for example, the value of the LTC of a frame with an FTC value "N" (frame with a frame number N) is "M", the value of the LTC of the next frame (frame with an FTC value "N+1") is "M+2", and the value of the LTC of the next frame (frame with an FTC value "N+2") is "M+5". Thus, in the increase section, the value of the LTC in consecutive frames increases by 2 or more as the FTC increases by 1.

For example, if a frame group (frame group in which the LTC increases by 2 or more) shown in FIG. 13A is input to the data converter 39 when the status is not set (when the section setting storage section 116 does not store the section name 123) or when the set status is not "increase" (when the content of the section name 123 stored in the section setting storage section 116 is not "increase"), the determination processing section 112 determines that the status has changed to "increase" (section has changed) and creates an element 142 of the LTC change point table 124 shown in FIG. 13B using the frame with the frame number N, which is the first frame, as an increase point.

In the case of the element 142 shown in FIG. 13B, the value of the item "frame number" is "N", the value of the item "LTC" is "M", and the item "status" is "increase". The determination processing section 112 which has created such an element 142 supplies this to the registration processing section 117 and registers the element 142 in the LTC change point table 124 stored in the memory 38.

In addition, if a frame group (frame group in which the LTC increases by 2 or more) shown in FIG. 13A is input to the data converter 39 when the content of the section name 123 stored in the section setting storage section 116 is "increase", the determination processing section 112 determines that the status has not changed (the same section continues) and does not create the element 142 (does not update the status).

In addition, when it is determined that the value of the acquired LTC data does not increase by 2 or more from the value of the stored LTC data in step S161, the determination processing section 112 proceeds to step S165.

In step S165, the determination processing section 112 determines whether or not the value of the acquired LTC data is the same as the value of the stored LTC data on the basis of the comparison result obtained in step S144 in FIG. 9. When it is determined that the value of the acquired LTC data has not changed and accordingly the value of the acquired LTC data is the same as the value of the stored LTC data, the process proceeds to step S166. In step S166, the determination processing section 112 determines whether or not the current section is a still section (section whose status is "still") on the basis of the reference result referred to in step S145 in FIG. 9.

When it is determined that the current section is not a still section, the determination processing section 112 determines that the status (that is, a section) has changed and proceeds to step S167 in order to set the frame (frame corresponding to the stored LTC data) as the LTC change point. In step S167, the determination processing section 112 controls the data management section 113 to acquire the LTC data 121 and the FTC data 122, which are stored in the data storage section 114, and to add the status information (in this case, still) to the LTC data and the FTC data. Then, the determination processing section 112 supplies the LTC data, the FTC data, and the status information to the registration processing section 117 as elements of the LTC change point table. The registration processing section 117 supplies the elements of the LTC change point table to the memory 38 as the still point (change point whose status is "still") and registers them in the LTC change point table.

After the processing of step S167 ends, the determination processing section 112 supplies the status determined at this time to the section setting storage section 116 through the section setting management section 115 and stores the status as the section name 123 to set the current section to a still section in step S168. Then, the determination processing section 112 returns the processing to step S150 in FIG. 9 to repeat the processing from step S150. In addition, when it is determined that the current section is a still section in step S166 in FIG. 10, the determination processing section 112 omits the processing of steps S167 and S168 and returns the processing to step S150 in FIG. 9.

FIG. 14A is a view showing an example of the relationship between the FTC and the LTC in the still section. In FIG. 14A, the horizontal axis indicates the FTC of a frame and the vertical axis indicates the LTC of a frame. In FIG. 14A, for example, the value of the LTC is "M" in all of the frame with an FTC value "N" (frame with a frame number N), the next frame (frame with an FTC value "N+1"), and the next frame (frame with an FTC value "N+2"). Thus, in the still section, the value of the LTC in consecutive frames does not change even if the FTC increases by 1.

For example, if a frame group (frame group in which the LTC does not change) shown in FIG. 14A is input to the data converter 39 when the status is not set (when the section setting storage section 116 does not store the section name 123) or when the set status is not "still" (when the content of the section name 123 stored in the section setting storage section 116 is not "still"), the determination processing section 112 determines that the status has changed to "still" (section has changed) and creates an element 144 of the LTC change point table 124 shown in FIG. 14B using the frame with the frame number N, which is the first frame, as a still point. In the case of the element 144 shown in FIG. 14B, the value of the item "frame number" is "N", the value of the item "LTC" is "M", and the item "status" is "still". The determination processing section 112 which has created such an element 144 supplies this to the registration processing section 117 and registers the element 144 in the LTC change point table 124 stored in the memory 38.

In addition, if a frame group (frame group in which the LTC does not change) shown in FIG. 14A is input to the data converter 39 when the content of the section name 123 stored in the section setting storage section 116 is "still", the determination processing section 112 determines that the status has not changed (the same section continues) and does not create the element 144 (does not update the status).

In addition, when it is determined that the value of the acquired LTC data is not the same as the value of the stored LTC data in step S165, the determination processing section 112 proceeds to step S169.

In step S169, the determination processing section 112 determines whether or not the current section is a decrease section (section whose status is "decrease") on the basis of the reference result referred to in step S145 in FIG. 9.

When it is determined that the current section is not a decrease section, the determination processing section 112 determines that the status (that is, a section) has changed and proceeds to step S170 in order to set the frame (frame corresponding to the stored LTC data) as the LTC change point. In step S170, the determination processing section 112 controls the data management section 113 to acquire the LTC data 121 and the FTC data 122, which are stored in the data storage section 114, and to add the status information (in this case, decrease) to the LTC data and the FTC data. Then, the determination processing section 112 supplies the LTC data, the FTC data, and the status information to the registration processing section 117 as elements of the LTC change point table. The registration processing section 117 supplies the elements of the LTC change point table to the memory 38 as the decrease point (change point whose status is "decrease") and registers them in the LTC change point table.

After the processing of step S170 ends, the determination processing section 112 supplies the status determined at this time to the section setting storage section 116 through the section setting management section 115 and stores the status as the section name 123 to set the current section to a decrease section in step S171. Then, the determination processing section 112 returns the processing to step S150 in FIG. 9 to repeat the processing from step S150. In addition, when it is determined that the current section is a decrease section in step S169 in FIG. 10, the determination processing section 112 omits the processing of steps S170 and S171 and returns the processing to step S150 in FIG. 9.

Figures 15A, 15B:
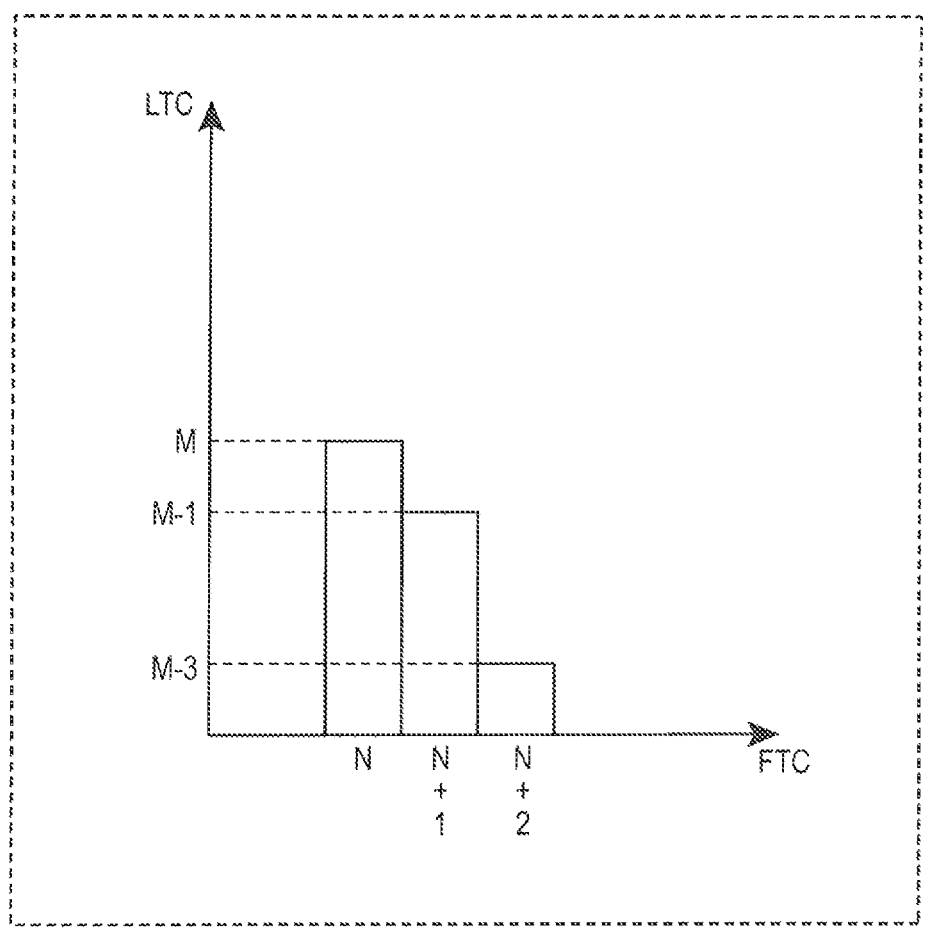
FIGS. 15A and 15B are views for explaining still another example of creating elements of the LTC change point table.

FIG. 15A is a view showing an example of the relationship between the FTC and the LTC in the decrease section. In FIG. 15A, the horizontal axis indicates the FTC of a frame and the vertical axis indicates the LTC of a frame. In FIG. 15A, for example, the value of the LTC of a frame with an FTC value "N" (frame with a frame number N) is "M", the value of the LTC of the next frame (frame with an FTC value "N+1") is "M−1", and the value of the LTC of the next frame (frame with an FTC value "N+2") is "M−3". Thus, in the decrease section, the value of the LTC in consecutive frames decreases by 1 or more as the FTC increases by 1.

For example, if a frame group (frame group in which the LTC decreases by 1 or more) shown in FIG. 15A is input to the data converter 39 when the status is not set (when the section setting storage section 116 does not store the section name 123) or when the set status is not "decrease" (when the content of the section name 123 stored in the section setting storage section 116 is not "decrease"), the determination processing section 112 determines that the status has changed to "decrease" (section has changed) and creates an element 146 of the LTC change point table 124 shown in FIG. 15B using the frame with the frame number N, which is the first frame, as a decrease point. In the case of the element 146 shown in FIG. 15B, the value of the item "frame number" is "N", the value of the item "LTC" is "M", and the item "status" is "decrease". The determination processing section 112 which has created such an element 146 supplies this to the registration processing section 117 and registers the element 146 in the LTC change point table 124 stored in the memory 38.

In addition, if a frame group (frame group in which the LTC decreases) shown in FIG. 15A is input to the data converter 39 when the content of the section name 123 stored in the section setting storage section 116 is "decrease", the determination processing section 112 determines that the status has not changed (the same section continues) and does not create the element 146 (does not update the status).

In addition, for example, when it is determined that the input of essence data stops and the LTC data is not acquired at the timing at which the LTC data is to be originally acquired in step S141 in FIG. 9, the acquisition control section 111 proceeds to step S181 in FIG. 11. In step S181 in FIG. 11, the determination processing section 112 determines that the clip has ended and controls the data management section 113 to acquire the LTC data 121 and the FTC data 122, which are stored in the data storage section 114, and add the status information (in this case, "end") to the LTC data and the FTC data. Then, the determination processing section 112 supplies the LTC data, the FTC data, and the status information to the registration processing section 117 as elements of the LTC change point table. The registration processing section 117 supplies the elements of the LTC change point table to the memory 38 as the end point (change point whose status is "end") and registers them in the LTC change point table.

FIG. 16A is a view showing an example of the relationship between the FTC and the LTC at the end point. In FIG. 16A, the horizontal axis indicates the FTC of a frame and the vertical axis indicates the LTC of a frame. In FIG. 16A, for example, the value of the LTC of a frame with an FTC value "N" (frame with a frame number N) is "M", the value of the LTC of the next frame (frame with an FTC value "N+1") is "M+1", and the value of the LTC of the next frame (frame with an FTC value "N+2") is "M+2". That is, the status of this section is "increment" and an element 148 is registered in the LTC change point table 124 as shown in FIG. 16B, for example. In the case of the element 148 shown in FIG. 16B, the value of the item "frame number" is "N", the value of the item "LTC" is "M", and the item "status" is "increment".

In such a case, if the clip ends at a frame with a frame number N+2 and the acquisition control section 111 does not acquire the next frame of the frame with the frame number N+2, the determination processing section 112 determines that the clip has ended and creates an element 149 of the LTC change point table 124 shown in FIG. 16B using the frame with the frame number N+2, which is the last frame stored in the data storage section 114, as the end point. In the case of the element 149 shown in FIG. 16B, the value of the item "frame number" is "N+2", the value of the item "LTC" is "M+2", and the item "status" is "end".

As described above, the determination processing section 112 which has registered the end point in the LTC change point table proceeds to step S184.

In addition, the determination processing section 112 which has ended step S150 in FIG. 9 by performing the processing in FIGS. 9 and 10 as described above proceeds to step S182 in FIG. 11. In step S182, the determination processing section 112 controls the registration processing section 117 to check the free space of the memory 38 and determines whether or not two or more elements can be further registered in the LTC change point table 124. When it is determined that the free space is sufficient and two or more elements can be further registered in the LTC change point table 124, the determination processing section 112 returns the processing to step S141 in FIG. 9 to repeat the processing from step S141 for the next frame.

In addition, when it is determined that the free space of the memory 38 is not sufficient and only one element can be added to the LTC change point table 124 in step S182 in FIG. 11, the determination processing section 112 proceeds to step S183 to add the status information (in this case, "over") to the LTC data and the FTC data acquired through the acquisition control section 111 at this time. Then, the determination processing section 112 supplies the LTC data, the FTC data, and the status information to the registration processing section 117 as elements of the LTC change point table. The registration processing section 117 supplies the elements of the LTC change point table to the memory 38 as the over point (change point whose status is "over") and registers them in the LTC change point table 124.

Figures 17A, 17B:
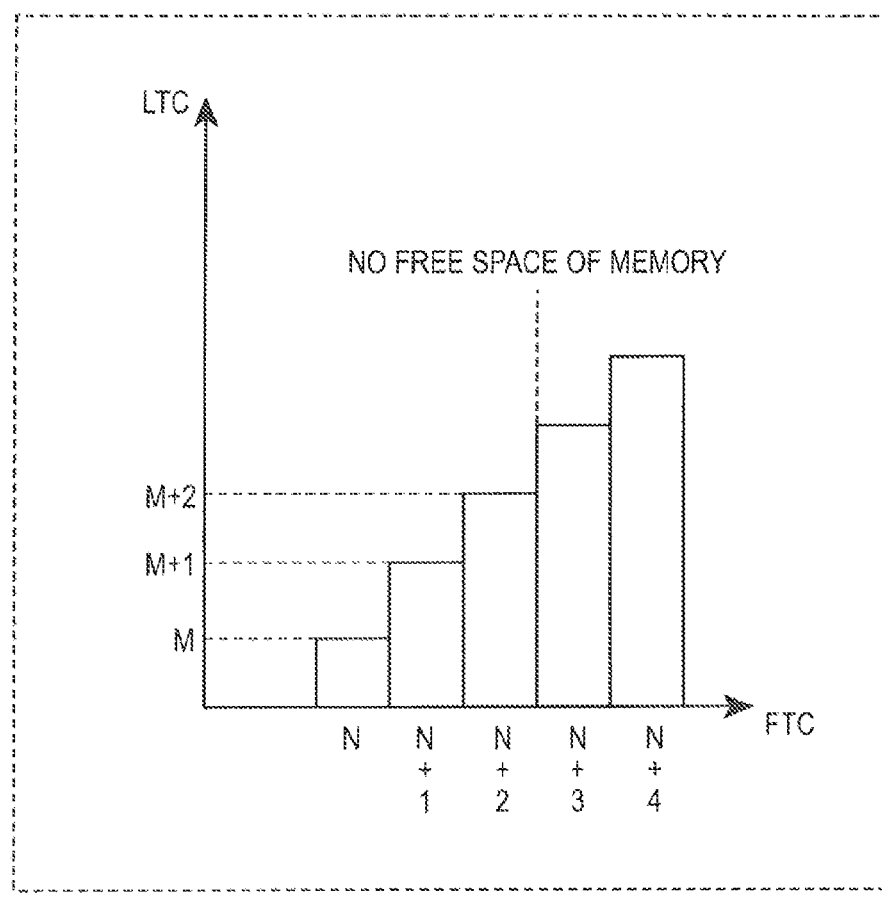
FIGS. 17A and 17B are views for explaining still another example of creating elements of the LTC change point table.

FIG. 17A is a view showing an example of the relationship between the FTC and the LTC at the over point. In FIG. 17A, the horizontal axis indicates the FTC of a frame and the vertical axis indicates the LTC of a frame. In FIG. 17A, for example, the value of the LTC of a frame with an FTC value "N" (frame with a frame number N) is "M", the value of the LTC of the next frame (frame with an FTC value "N+1") is "M+1", the value of the LTC of the next frame (frame with an FTC value "N+2") is "M+2", the value of the LTC of the next frame (frame with an FTC value "N+3") is "M+3", and the value of the LTC of the next frame (frame with an FTC value "N+4") is "M+4". That is, the status of this section is "increment" and an element 150 is registered in the LTC change point table 124 as shown in FIG. 17B, for example. In the case of the element 150 shown in FIG. 17B, the value of the item "frame number" is "N", the value of the item "LTC" is "M", and the item "status" is "increment".

In such a case, if it is determined that only one element can be added to the LTC change point table 124 when the LTC data and the FTC data of the frame with the frame number N+2 are acquired, the determination processing section 112 creates an element 151 of the LTC change point table 124 shown in FIG. 17B using the frame with the frame number N+2, which is the last frame acquired through the acquisition control section 111 at this time, as the over point. In the case of the element 151 shown in FIG. 17B, the value of the item "frame number" is "N+2", the value of the item "LTC" is "M+2", and the item "status" is "over".

As described above, the determination processing section 112 which has registered the over point in the LTC change point table proceeds to step S184.

In step S184, the LTC data processing section 71 performs end processing to end the LTC change point table creation processing. In addition, this LTC change point table creation processing is executed whenever a clip is input to the data converter 39.

The LTC change point table 124a created as described above and stored in the memory 38 is read as non-real-time metadata and is recorded on the optical disc 31 in the processing of step S11 in FIG. 5.

By creating the LTC change point table 124*a*, which has the change point as its element, from the LTC included in the real-time metadata and recording the LTC change point table 124*a* as the non-real-time metadata as described above, the user can perform reproduction control processing more easily using the disk recording and reproducing apparatus 30 shown in FIG. 1.

Moreover, in the present embodiment, the data recorded on the optical disc 31 as described above is managed in a unit of file with a directory structure by the file system, such as a UDF (Universal Disk Format), for example. In addition, the file system which manages a file in the optical disc 31 is not limited to the UDF. For example, any file system may be used as long as it is a file system which can be handled by the disk recording and reproducing apparatus 30 in FIG. 1, such as ISO 9660 (International Organization for Standardization 9660). In addition, when a magnetic disk, such as a hard disk, is used instead of the optical disc 31, FAT (File Allocation Tables), NTFS (New Technology File System), HFS (Hierarchical File System), UFS (Unix (registered trademark) (R) File System), and the like may be used as the file system. In addition, it is also possible to use a dedicated file system.

FIG. 18 is a view showing a description example of the LTC change point table 124*a* included in a non-real-time metadata file described in XML. In the present embodiment, the non-real-time metadata file is described in the XML format in order to have the versatility. On the other hand, the real-time metadata file is a file based on a BIM (Binary format for MPEG-7 data) format obtained by compiling an XML-format file in order to reduce the reproduction processing time or the load necessary for reproduction processing. Moreover, in FIG. 18, a number at the head of each line is added for convenience of description, and the number is not a part of XML description.

Description of <LtcChangeTable tcFps="30"> of the first line in FIG. 18 is a start tag indicating the start of description of an LTC change point table, and description of tcFps="30" indicates that the time code in the LTC change point table is described by 30 frames per second.

Each element indicating the change point of the LTC is shown in second to twelfth lines. In addition, description of frameCount=" " in the second to twelfth lines indicates a frame number, that is, the value of the FTC, description of value=" " indicates the value of the LTC of the frame, and description of status=" " indicates the status of the frame.

For example, description of <LtcChange frameCount="0" value="55300201" status="increment"/> in the second line indicates that the change point is a frame with a frame number "0", the LTC is "55300201", and the status of a section started from this frame is "increment". Explanation regarding description of the third to twelfth lines will be omitted since the configuration is basically the same as that of the second line although the values are different.

</LtcChangeTable> in the thirteen line is an end tag indicating the end of description of the LTC change point table 124*a*.

For example, when a user designates a displayed frame using the LTC, the disk recording and reproducing apparatus 30 shown in FIG. 1 reads the LTC change point table described as shown in FIG. 18 from a non-real-time metadata file, and searches for the designated frame on the basis of this description and displays it. In this way, the disk recording and reproducing apparatus 30 can search for the target frame more easily than searching for the target LTC (frame) from the LTC group described in the real-time metadata matched with each frame.

Figure 19:
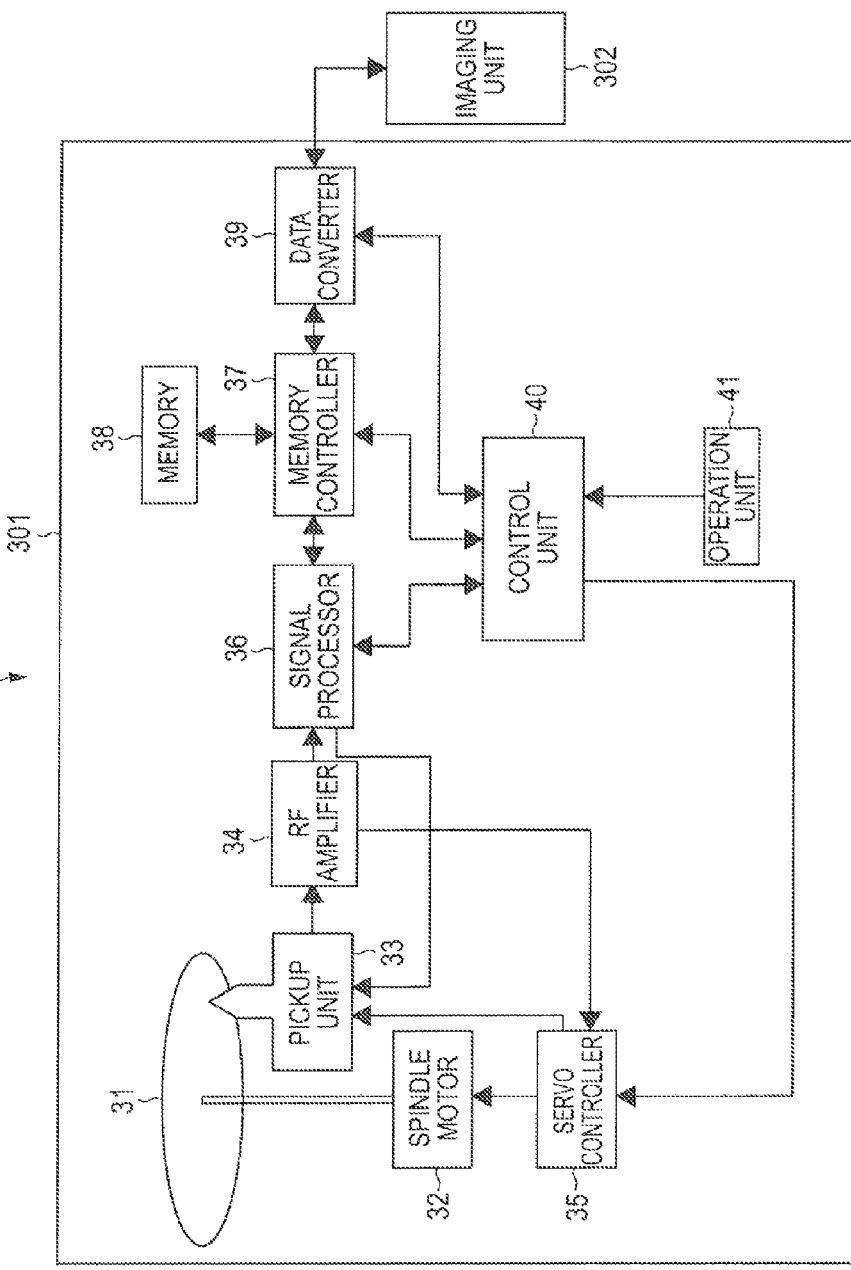
FIG. 19 is a block diagram showing an example of the configuration of a camcorder according to an embodiment of the present disclosure.

In addition, the disk recording and reproducing apparatus 30 shown in FIG. 1 may be a disk recording unit 301 of a camcorder 300 including an imaging unit 302 as shown in FIG. 19, for example. In this case, the imaging unit 302 is connected to the disk recording unit 301 instead of the signal input/output device 51, and essence data including image data captured by a camera of the imaging unit 302 and audio data collected by a microphone of the imaging unit 302 is input to the input disk recording unit 301. The disk recording unit 301 has the same configuration as the disk recording and reproducing apparatus 30, and operates in the same manner as the disk recording and reproducing apparatus 30 to record essence data supplied from the imaging unit 302 or metadata added to the essence data on the optical disc 31.

Figure 20:
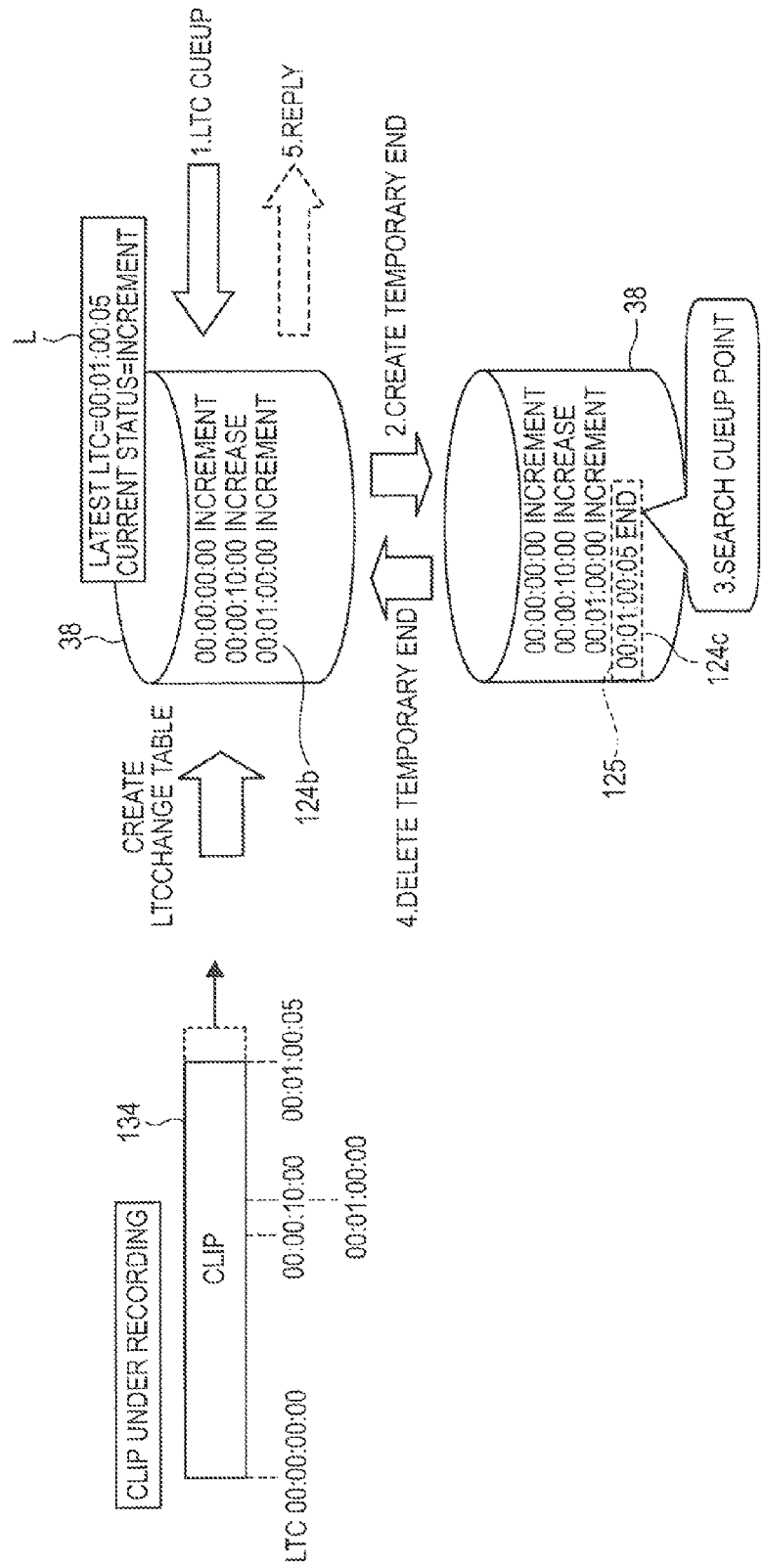
FIG. 20 is a view for explaining LTC change point table creation processing performed by the LTC data processing section shown in FIG. 4.
Figure 21:
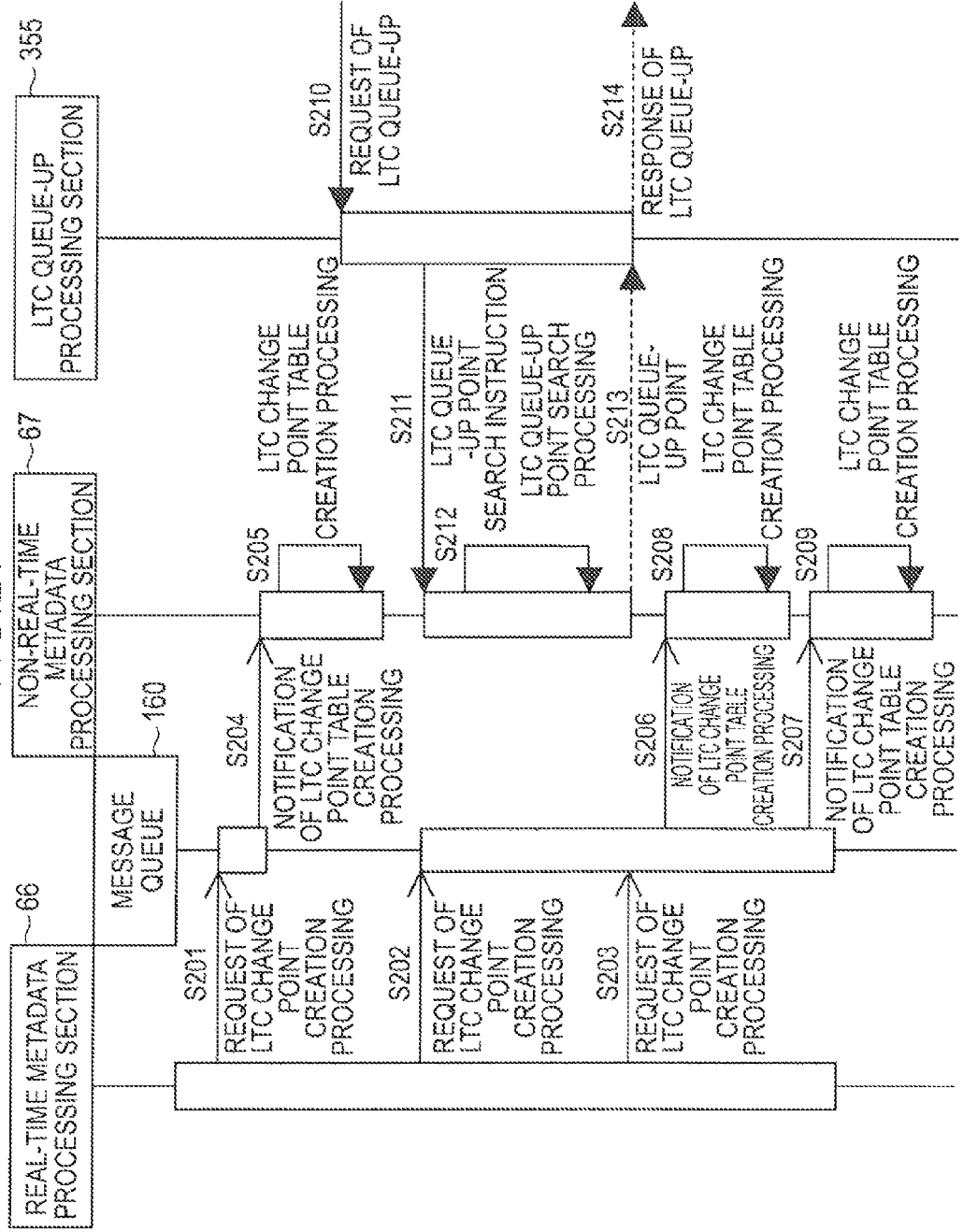
FIG. 21 is a sequence diagram showing an example of the LTC change point table creation processing shown in FIG. 20.

Next, processing of creating the LTC change point table 124 (124*c*) when there is a request for queue-up processing while the clip 134 is being recorded, that is, there is a frame reproduction instruction as shown in FIG. 20 will be described. FIG. 21 is a sequence diagram showing an example of processing of creating an LTC change point table 124*b* (124*c*) in the above case.

As shown in FIG. 21, an LTC change point creation processing request is output from the real-time metadata processing section 66 (hereinafter, described as an RT section 66) at the predetermined timing (steps S201 to S203). In the present embodiment, the LTC is output to the non-real-time metadata processing section 67 (hereinafter, described as an NRT section 67) for each frame group having a predetermined number of frames among a plurality of frames, and an LTC change point creation processing request is output for each frame group. The number of frames included in a frame group may be specified by a frame number, such as 30 frames, or may be specified by the reproduction time of a predetermined length.

The change point creation processing request output from the RT section 66 are stored in a message queue 160. The stored change point creation processing request is read from the NRT section 67 as a notification of LTC change point creation processing (step S204). Then, the LTC change point creation processing described in FIGS. 9 to 11 is executed for the frame group designated by the notification of change point creation (step S205). When the LTC change point table 124*a* is created for the entire clip 134 described in FIG. 8, a notification of LTC preparation processing for each frame group is sequentially read from the message queue 160 (steps S206 and S207). Then, the LTC change point creation processing is executed for each frame group (steps S208 and S209).

When the LTC change point table is created for one frame group in step S205, LTC data, FTC data, and status information of the last frame of the frame group are stored as shown in FIG. 20 (reference numeral L). When the LTC change table creation processing is executed for the next frame group (step S208), processing of creating the LTC change table 124*a* is performed for the entire clip using the above-described stored data.

Here, as shown in FIG. 21, it is assumed that the LTC queue-up request is output to a queue-up processing section 355 during the LTC change point table creation processing (step S210). Then, a queue-up point search instruction as a frame reproduction instruction is output from the queue-up processing section 355 to the NRT section 67 (step S211). The queue-up point search instruction is an instruction to reproduce a frame using the LTC data as first position information.

In the present embodiment, the queue-up point search instruction is output to the NRT section 67 at the predetermined timing by the queue-up processing section 355 which has received an LTC queue-up request. However, the NRT section 67 invalidates the queue-up point search instruction while the LTC change point table 124b is being created for one frame group and written in the memory 38. Then, after the processing of creating the LTC change point table 124b for one frame group is completed, the queue-up point search instruction is validated.

Such data processing can be realized by using a message queue (not shown), for example. For example, the queue-up point search instruction from the queue-up processing section 355 is stored in the message queue. The NRT section 67 reads a point search instruction from the message queue after the processing of creating the LTC change point table 124b for one frame group is completed. By realizing the data processing between the RT section 66 and the NRT section 67 and the data processing between the NRT section 67 and the queue-up processing section 355 using the message queue as described above, a content data reproduction system with good operability can be easily formed without complicating the system. However, the system may be built using other methods.

When the LTC change point table creation processing in step S205 is completed, the NRT section 67 executes preferentially processing of reading a queue-up point search instruction. Then, when a point search instruction is not output and accordingly it is not possible to read the instruction, the NRT section 67 reads a notification of LTC change point table creation processing from the message queue 160. That is, in the present embodiment, when the queue-up point search instruction which is an instruction to reproduce a frame is given, writing of the LTC change point table 124b into the memory 38 is restricted.

The NRT section 67 which has received the queue-up point search instruction executes LTC queue-up point search processing (step S212). The point search processing is a processing of specifying the FTC, which is the second position information, of a reproduction frame, which is a frame corresponding to the point search instruction, with reference to the LTC change point table 124c shown in FIG. 20 in response to the point search instruction. That is, the NRT section 67 functions as a specification section. The LTC queue-up point search processing will be described later.

The LTC change point table 124b written by the change point table creation processing in step S205 shown in FIG. 21 is so-called incomplete table information. That is, the LTC change point table 124b written by the change point table creation processing in step S205 shown in FIG. 21 is not table information after the completion of writing processing as the LTC change table 124a for the entire clip 134. The exclusive processing section 118 according to the present embodiment sets the information of the so-called incomplete change point table 124b as the LTC change point table 124c which can be referred to in the queue-up point search processing. This processing will also be described later.

The FTC data of the reproduction frame specified by the point search processing in step S212 is returned to the queue-up processing section as the LTC queue-up point (step S213). Then, the FTC data is output from the queue-up processing section as information responding to the queue-up request in step S210 (step S214).

In steps S206 and S207, a notification of change point table creation processing is read by the NRT section 67, and the LTC change point table creation processing is resumed. Switching from the point search processing to the LTC change point table creation processing will also be described later.

An example of a specific method of using the above LTC change point table 124 will be described.

Figure 22:
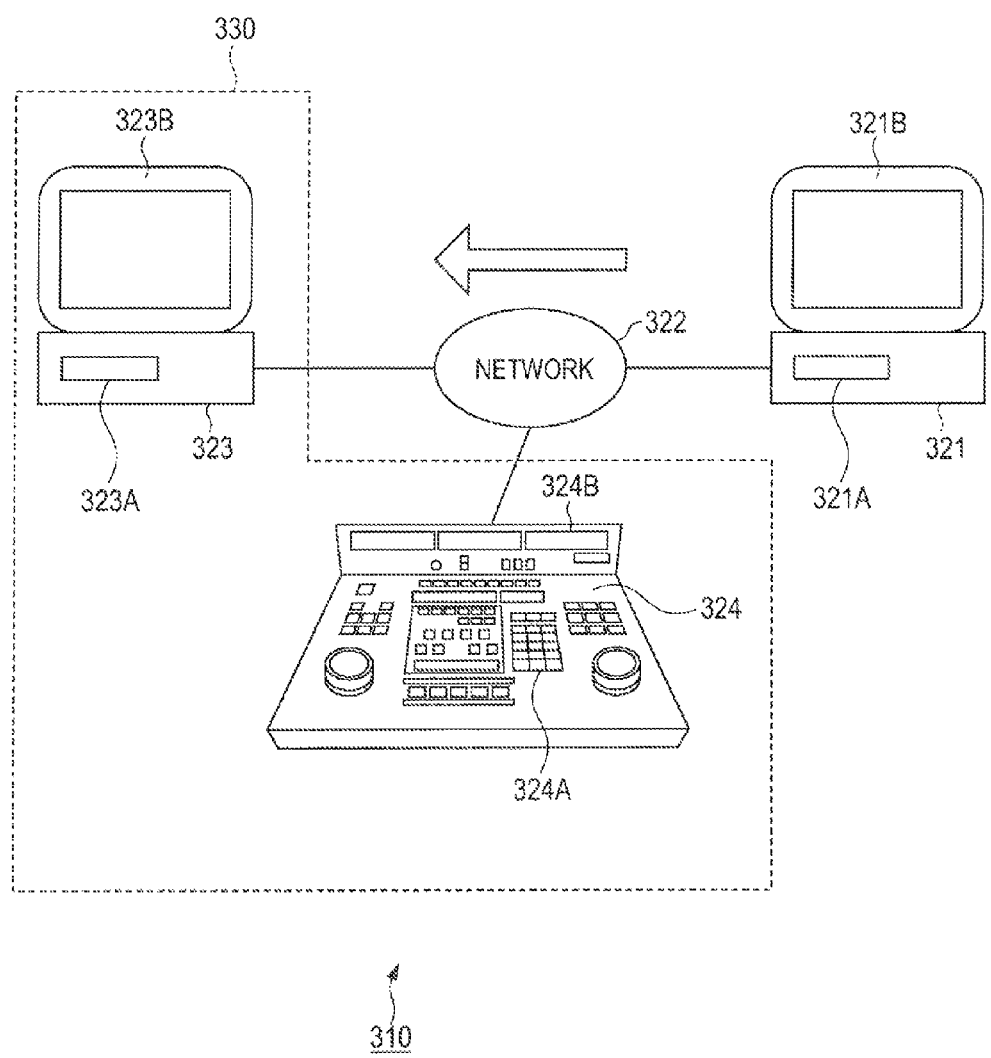
FIG. 22 is a view showing an example of the configuration of an editing system according to an embodiment of the present disclosure.

FIG. 22 is a view showing an example of an editing system which edits the essence data recorded on the optical disc 31 and records the editing result on the other optical disc 31.

In FIG. 22, an editing system 310 includes two disk recording and reproducing apparatuses 321 and 323, which are connected to each other through a network 322, and an editing control device 324 which controls editing of essence data. The disk recording and reproducing apparatuses 323 and the editing control device 324 connected to each other through the network 322 function as an information processing apparatus 330 according to the present embodiment. However, an apparatus, such as a computer in which the disk recording and reproducing apparatus 323 and the editing control device 324 described below are integrally formed, may be used as the information processing apparatus according to the embodiment of the present disclosure.

The disk recording and reproducing apparatus 321 includes a drive 321A corresponding to the optical disc 31. In addition, the disk recording and reproducing apparatus 321 reproduces the essence data or the like recorded on the optical disc 31 placed in the drive 321A and supplies it to the disk recording and reproducing apparatus 323 through the network 322.

The network 322 is a network represented by the Internet, Ethernet (registered trademark (R)), or the like. The disk recording and reproducing apparatus 321, the disk recording and reproducing apparatus 323, and the editing control device 324 are connected to the network 322, so that various kinds of data are transmitted between these apparatuses.

The disk recording and reproducing apparatus 323 has a drive 323A and a monitor 323B, and is controlled by the editing control device 324 connected through the network 322. Under control of the editing control device 324, the disk recording and reproducing apparatus 323 records the essence data or the like, which is supplied through the network 322, on the optical disc 31 placed in the drive 323A or displays an image corresponding to the recorded image data on the monitor 323B.

The editing control device 324 controls the disk recording and reproducing apparatus 323 through the network 322 so that the essence data supplied to the disk recording and reproducing apparatus 323 is recorded on the optical disc 31. In addition, the editing control device 324 executes editing processing on the essence data. In addition, the editing control device 324 includes an LTC input key 324A, which is a ten key operated when a user designates an LTC, and a display unit 324B for checking an input LTC, which displays the input LTC, as user interfaces.

In addition, the disk recording and reproducing apparatus 323 has basically the same configuration as the disk recording and reproducing apparatus 30 shown in FIG. 1 and performs the same operation. However, the disk recording and reproducing apparatus 323 has a communication unit instead of the signal input/output device 51 shown in FIG. 1 and perform communication with other apparatuses through the network in order to transmit and received various kinds of data, such as the essence data.

Figure 23:
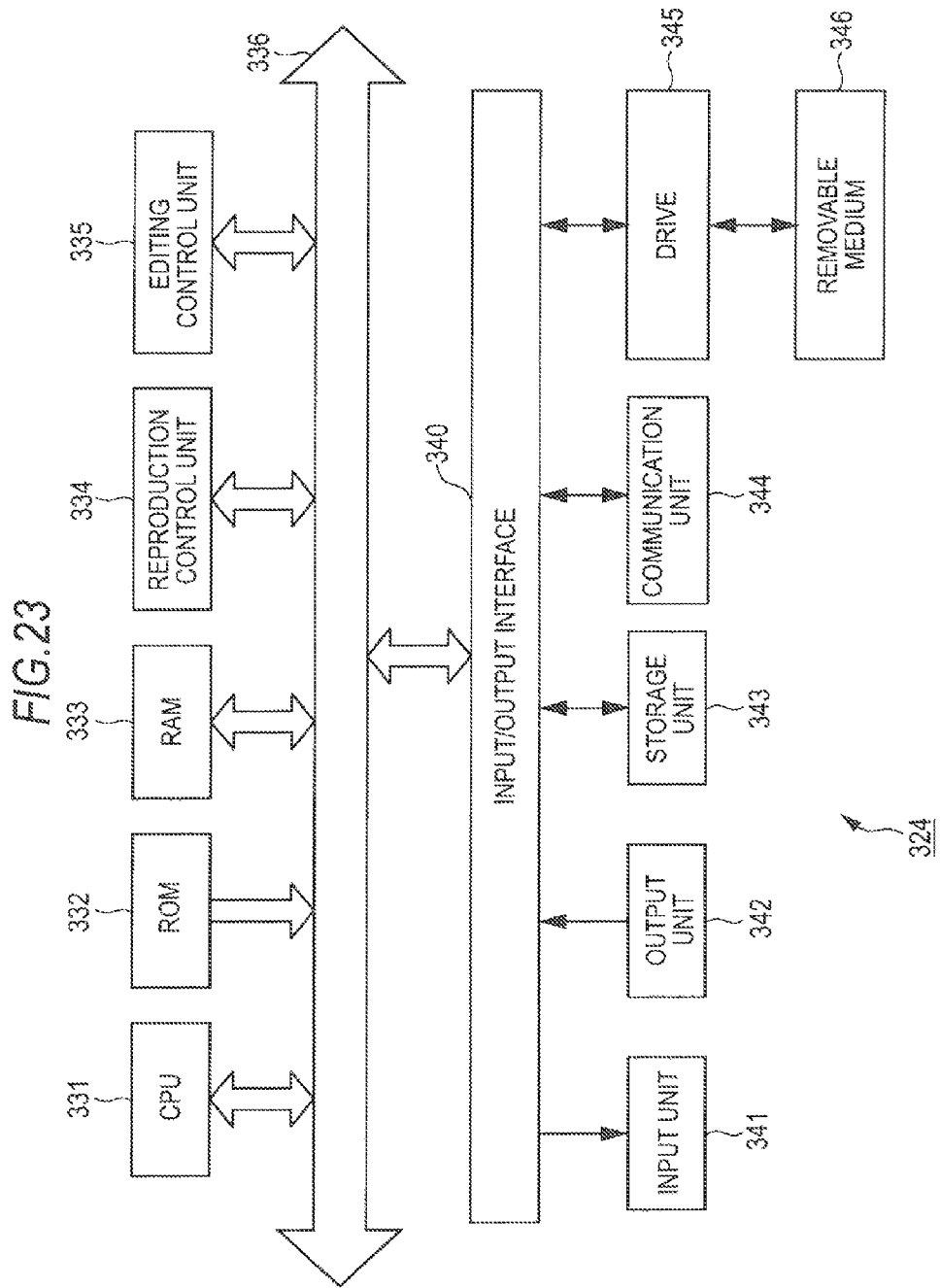
FIG. 23 is a schematic view showing an example of the internal configuration of an editing control device shown in FIG. 22.

FIG. 23 is a schematic view showing an example of the internal configuration of the editing control device 324 shown in FIG. 22.

In FIG. 23, a CPU (Central Processing Unit) 331 of the editing control device 324 executes various kinds of processing according to a program stored in a ROM (Read Only Memory) 332. Data, a program, and the like necessary when the CPU 333 executes various kinds of processing are appropriately stored in a RAM (Random Access Memory) 331.

A reproduction control unit 334 performs processing of controlling reproduction of the disk recording and reproducing apparatus 323 through a communication unit 344. For example, the reproduction control unit 334 controls the disk recording and reproducing apparatus 323 to reproduce a clip, such as the essence data, recorded on the optical disc 31 placed in the drive 323A or to display a frame image corresponding to the LTC designated by the user on the monitor 323B.

An editing control unit 335 controls essence data editing processing by controlling the disk recording and reproducing apparatus 323 through the communication unit 344. For example, the editing control unit 335 controls the disk recording and reproducing apparatus 323 through the network 322 to execute reproduction (normal reproduction, fast forward reproduction, rewind reproduction, pause, stop, and the like) of a clip recorded on the optical disc 31, and displays an image corresponding to the reproduced clip on the monitor 323B and also records the image on another recording medium (not shown) as editing data.

The CPU 331, the ROM 332, the RAM 333, the reproduction control unit 334, and the editing control unit 335 are connected to each other through a bus 336.

In addition, an input/output interface 340 is connected to the bus 336. An input unit 341 including a ten key for LTC input, buttons for input of various instructions, or the like is connected to the input/output interface 340, and a signal input to the input unit 341 is output to the CPU 331. In addition, an output unit 342 including the display unit 324B or the like is also connected to the input/output interface 340.

In addition, a storage unit 343 including a magnetic drive such as a hard disk, an EEPROM (Electronically Erasable and Programmable Read Only Memory), or the like and the communication unit 344, which performs data communication with the disk recording and reproducing apparatus 321 or the disk recording and reproducing apparatus 323 through the network 322, are also connected to the input/output interface 340. Removable media 346, such as recording media including a magnetic disk, an optical disc, a magneto-optical disc, and a semiconductor memory, are appropriately placed in the drive 345. The drive 345 controls reading of a program or data recorded on the removable media 346 placed in the drive 345.

Figure 24:
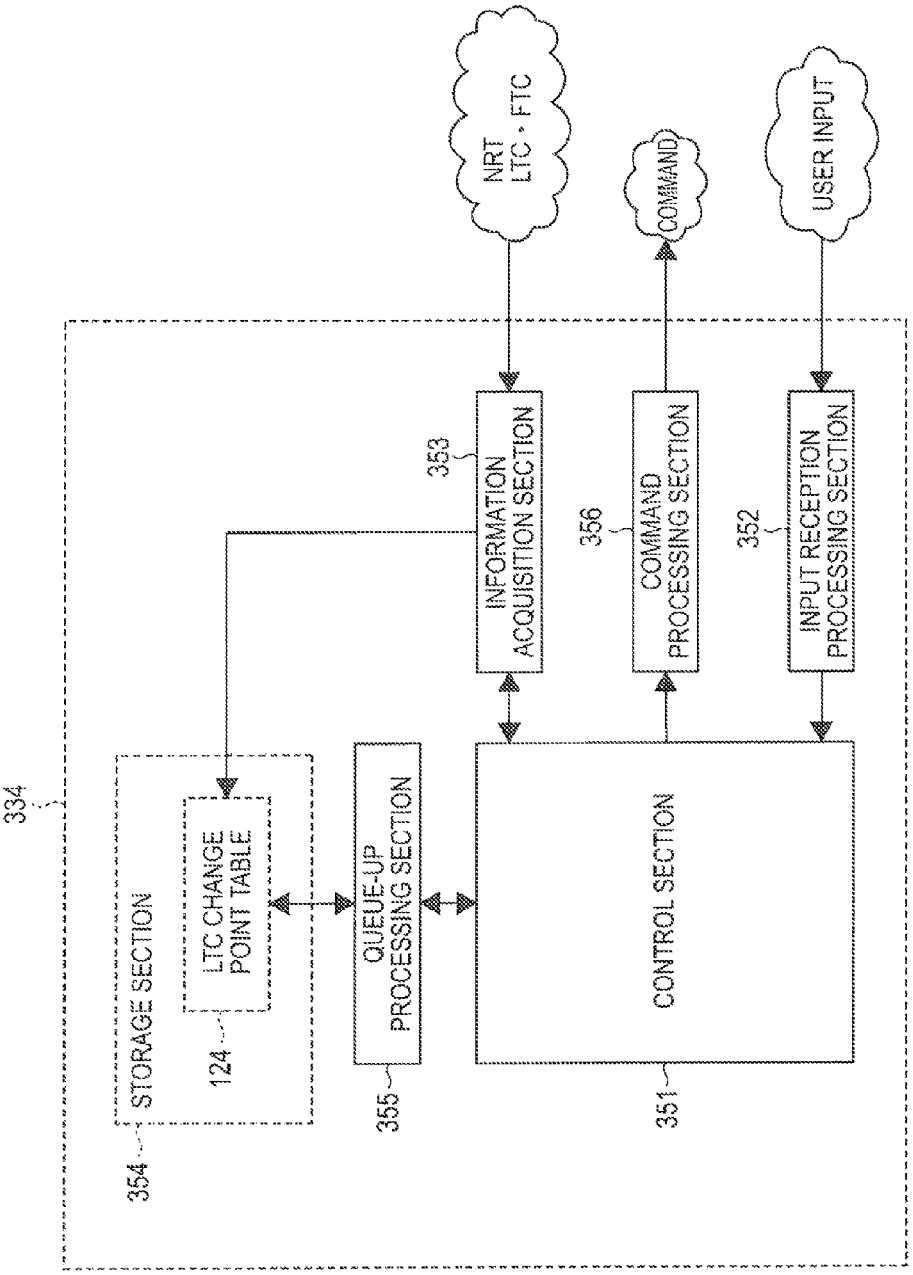
FIG. 24 is a schematic view showing an example of the configuration of a reproduction control unit shown in FIG. 23.

FIG. 24 is a schematic view showing an example of the configuration of the reproduction control unit 334 in FIG. 23. In FIG. 24, the reproduction control unit 334 includes: a control section 351 which performs overall control of the reproduction control unit 334; an input reception processing section 352 which receives a user input that is input through the input unit 341; an information acquisition section 353 which acquires the non-real-time metadata (NRT), such as the LTC or the FTC acquired through the communication unit 344; a storage section 354 which stores the non-real-time metadata acquired by the information acquisition section 353; a queue-up processing section 355 which controls queue-up processing of designating a frame image displayed on a monitor using the LTC; and a command processing section 356 which outputs various kinds of command information supplied from the control section 351.

The control section 351 includes a ROM or a RAM (not shown) therein, and controls the operation of each section of the reproduction control unit 334 by executing various kinds of programs. The input reception processing section 352 controls the reception of a user input, which is input through the input unit 341, and supplies the received user input to the control section 351.

The information acquisition section 353 is controlled by the control section 351. For example, when the non-real-time metadata (NRT) supplied through the communication unit 344 is acquired, the information acquisition section 353 supplies the acquired non-real-time metadata to the storage section 354 so that the non-real-time metadata is stored in the storage section 354.

The storage section 354 is formed by a storage medium, such as a hard disk or a semiconductor memory, and stores the non-real-time metadata supplied from the information acquisition section 353. That is, the storage section 354 stores the LTC change point table 124 included in the non-real-time metadata. The LTC change point table 124 referred to herein is an LTC change point table created by the disk recording and reproducing apparatus 323. That is, the LTC change point table 124 includes the change point table 124a for all recorded clips and the change point table 124c that can be referred to during the recording of a clip, which are shown in FIG. 20.

The queue-up processing section 355 performs processing regarding a queue-up for designating the frame number of a frame image that the user displays on a monitor using the LTC, among processings regarding the reproduction of a clip. For example, when the LTC designated by the user is supplied from the control section 351, the queue-up processing section 355 accesses the storage section 354, specifies a frame corresponding to the designated LTC with reference to the LTC change table 124 stored in the storage section 354, and supplies the information regarding the FTC (frame number) of the frame to the control section 351.

The command processing section 356 supplies the command information supplied from the control section 351 to the disk recording regenerative-apparatus 323 or the like through the communication unit 344.

Next, editing processing of the editing system 310 in FIG. 22 will be described.

In the editing system 310 shown in FIG. 22, the user operates the input unit 341 of the editing control device 324 to record the clip supplied from the disk recording and reproducing apparatus 321 on the optical disc 31 placed in the drive 323A of the disk recording and reproducing apparatus 323.

The editing control unit 335 of the editing control device 324 controls the disk recording and reproducing apparatus 323 on the basis of the user input in order to record the data (essence data and metadata) of the clip supplied to the disk recording and reproducing apparatus 323.

In this case, the increase or decrease pattern of the LTC of each frame of a clip changes according to transmission control performed in the disk recording and reproducing apparatus 321. When recording the supplied data of the clip on the optical disc 31, the disk recording and reproducing apparatus 323 executes processing of creating the LTC change point table 124 described in FIG. 21 on the basis of the LTC data of the real-time metadata. Then, the disk recording and reproducing apparatus 323 records the created LTC change point table 124 on the optical disc 31 as the non-real-time metadata. In addition, the LTC change point table 124 recorded as the non-real-time metadata is the LTC change point table 124a for the entire recorded clip. Since the change point table 124c which can be referred to for the clip under recording is temporary, the change point table 124c is not recorded on the optical disc 31. Therefore, in the present embodiment, the change point table 124c which can be referred to for the clip under recording is not read as the non-real-time metadata. The change point table 124c for the clip under recording is written into the memory 38 and is also appropriately output to the editing control device 324.

In addition, the user operates the editing control device 324 and controls the disk recording and reproducing apparatus 323 to reproduce the clip recorded as described above and display the image on the monitor 323B. In this case, the user can operate the ten LTC input key 324A of the editing control device 324 and select a frame displayed on the monitor 323B using the LTC.

Next, the operation of the reproduction control unit 334 of the editing control device 324 will be described.

When the LTC change point table 124 is acquired from the outside, the information acquisition section 353 of the reproduction control unit 334 supplies the acquired LTC change point table 124 to the storage section 354 under control of the control section 351, so that the acquired LTC change point table 124 is stored in the storage section 354.

In addition, when a user input instructing the queue-up is received from the outside, the input reception processing section 352 supplies the user input (queue-up instruction) to the queue-up processing section 355 through the control section 351. After the queue-up instruction is acquired, the queue-up processing section 355 refers to the LTC change point table 124 stored in the storage section 354 in order to specify the frame number (FTC) of the frame corresponding to the LTC (LTC which designates a frame to be displayed) included in the instruction. Then, the queue-up processing section 355 specifies the frame number of a frame (frame to be displayed, that is, a frame of the queue-up destination) corresponding to the LTC on the basis of the LTC change point table 124 and supplies the information to the control section 351. The control section 351 supplies the command information, which includes a command for displaying the frame (queuing up to the frame) on the basis of the information (information regarding the FTC of the frame of the queue-up destination), to the disk recording and reproducing apparatus 323 through the command processing section 356.

That is, in the editing system 310 described herein, the LTC queue-up point search processing (step S212) shown in FIG. 21 is executed by the reproduction control unit 334 of the editing control device 324. However, the LTC queue-up point search processing may also be executed by the disk recording and reproducing apparatus 323 which receives the queue-up point search instruction from the editing control device 324 as described above.

The command information supplied as described above is supplied to the disk recording and reproducing apparatus 323 through the network 322. The disk recording and reproducing apparatus 323 performs queue-up processing on the basis of the command information to display a frame image of the designated frame on the monitor 323B. For example, the LTC of the frame, such as "01:15:32:08", may be displayed on the monitor 323B in addition to the image data.

Next, queue-up control processing for controlling queue-up processing in which a user instructs a displayed frame using the LTC will be described with reference to the flow chart in FIGS. 25 to 27. FIGS. 28 to 33 are views for explaining the steps shown in FIGS. 25 to 27.

When the queue-up control processing starts, it is determined first whether or not an LTC change point table is being created (step S231). For example, the above determination may be performed on the basis of whether or not the LTC change point table 124a has been acquired as non-real-time metadata and is stored in the storage section 354. In addition, information regarding the recording of a clip by the disk recording and reproducing apparatus 323 or information regarding LTC change point table creation processing may also be acquired by the information acquisition section 353, for example.

In the present embodiment, when it is determined that the creation of the LTC change table has not been completed (Yes in step S231), a frame reproduction instruction is output from the queue-up processing section 355 to the NRT section 67 of the disk recording and reproducing apparatus 323. Then, a virtual end point 125 (refer to FIG. 20) as writing completion information of the LTC change point table 124c is registered by the NRT section 67 (step S232).

In the present embodiment, LTC data and FTC data of the last frame of a frame group which are stored are registered as the information of the virtual end point 125. In addition, status information of "end" is registered as the information of the virtual end point 125. Accordingly, the LTC change table 124b for a clip under recording is written as the LTC change table 124c which can be referred to.

In addition, other information may be used as the writing completion information registered in order to make it possible to refer to the incomplete LTC change table 124b. For example, data of the last element registered as the LTC change point table 124b may be virtually set as an end point of termination.

After the virtual end point 125 is registered by the NRT section, a virtual end point generation flag indicating that the processing has been executed is set (step S233). In addition, the LTC change point table 124c which can be referred to is stored in the storage section 354 of the editing control device 324.

When it is determined that the creation of the LTC change table has been completed (No) in step S231, the LTC change table 124a is read as non-real-time metadata and is then stored in the storage section 354.

Then, queue-up processing is executed on the basis of the LTC change point table 124c, which can be referred to for the clip under recording, or the LTC change point table 124a read as the non-real-time metadata.

Figure 25:
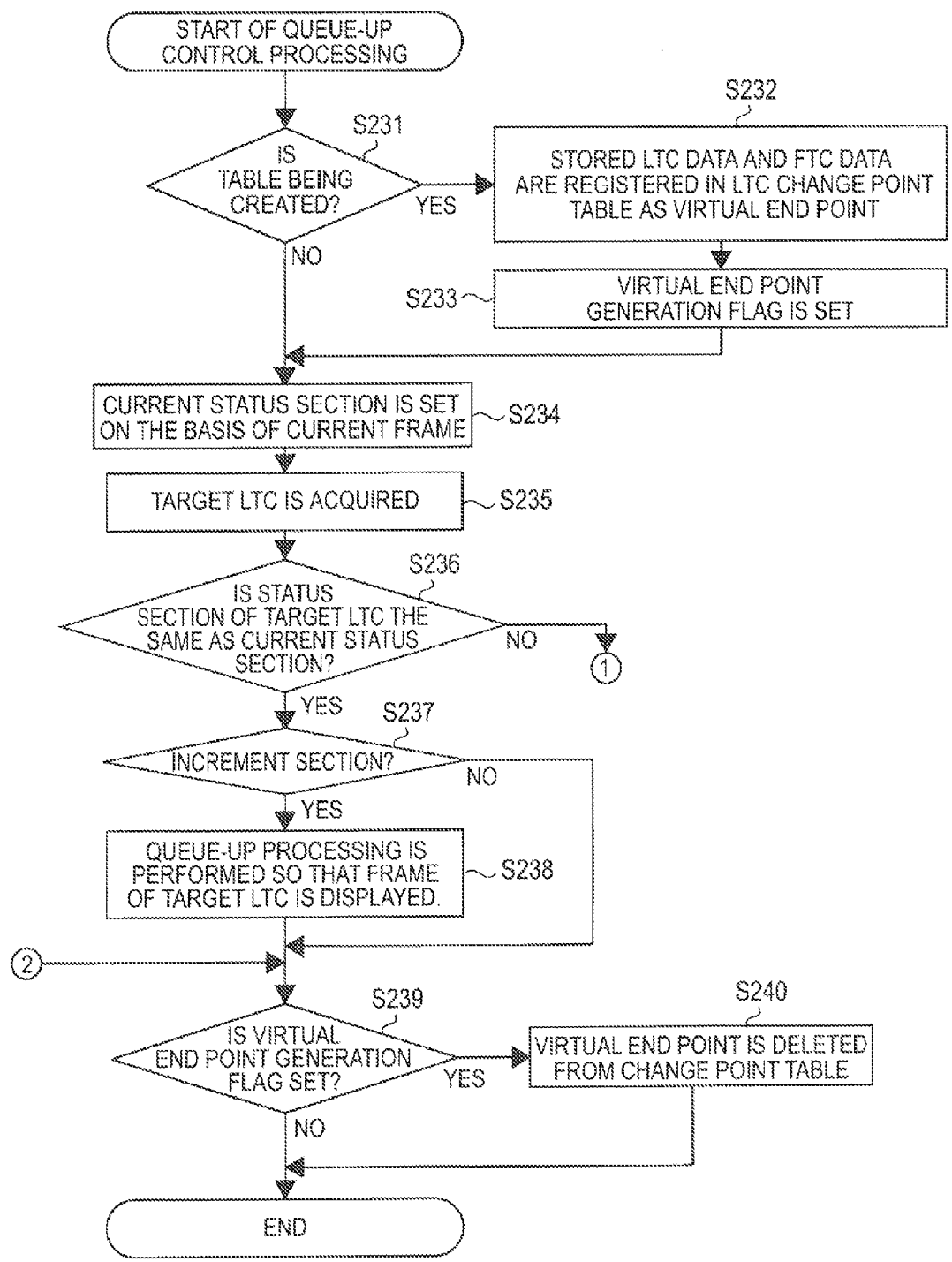
FIG. 25 is a flow chart illustrating queue-up control processing.

The queue-up processing section 355 is controlled by the control section 351 and sets a current status section on the basis of the currently displayed frame with reference to the LTC change point table 124, which is stored in the storage section 354, in step S234 in FIG. 25. That is, the queue-up processing section 355 calculates in which status section in the LTC change point table 124 the FTC (or the LTC) of the frame displayed currently in the disk recording and reproducing apparatus 323, which is supplied from the control section 351, is located and sets the status section of the position as a current status section.

After the queue-up processing section 355 sets the current status section, the process proceeds to step S235. In step S235, the queue-up processing section 355 acquires the LTC of a frame of the queue-up destination, that is, the target LTC by the control section 351. Then, the process proceeds to step S236. In step S236, the queue-up processing section 355 determines whether or not the status section of the target LTC is the same as the current status section on the basis of the target LTC acquired in step S235 with reference to the LTC change point table 124. When it is determined that the status section of the target LTC is the same as the current status section, the process proceeds to step S237.

In step S237, the queue-up processing section 355 determines whether or not the status section (that is, the current status section) of the target LTC is an increment section on the basis of the LTC change point table 124. When it is determined that the status section of the target LTC is an increment section, the process proceeds to step S238.

In step S238, the queue-up processing section 355 performs queue-up command processing so that the frame of the target LTC is displayed. As a result, the queue-up command information is supplied to the disk recording and reproducing apparatus 323 through the control section 351 and the command processing section 356 and the frame of the target LTC is displayed. That is, when the current status section and the status section of the target LTC are the same increment sections, the queue-up processing section 355 calculates the FTC of the frame corresponding to the target LTC on the basis of the LTC change point table 124 and supplies the FTC to the control section 351. The control section 351 creates queue-up command information using the FTC of the queue-up destination and supplies the queue-up command information to the command processing section 356. The command processing section 356 supplies the acquired queue-up command information to the disk recording and reproducing apparatus 323 through the communication unit 344 and displays the frame designated by the FTC as a frame of the queue-up destination.

Figure 30:
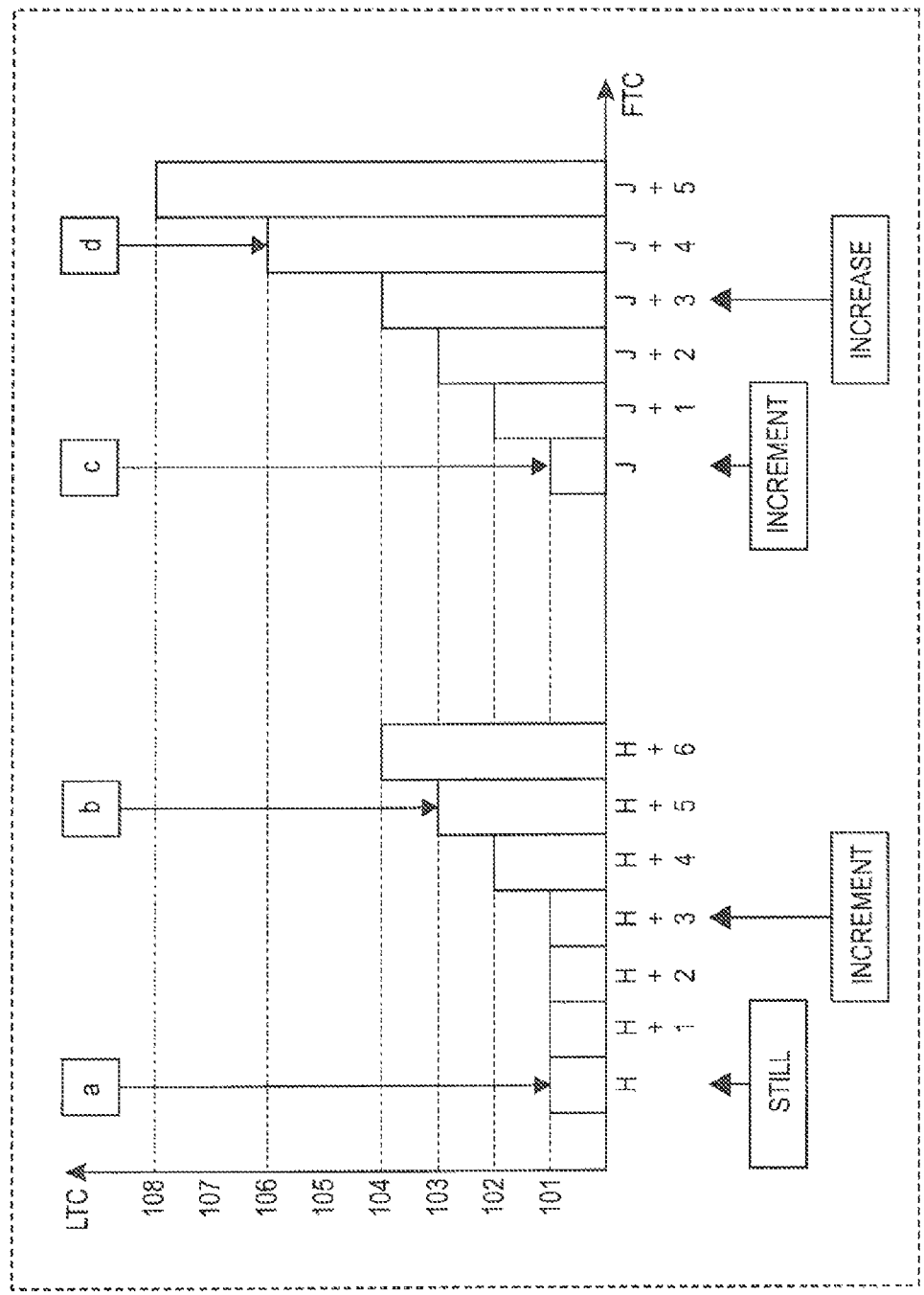
FIG. 30 is a view illustrating still another example of queue-up processing.

FIG. 30 is a view showing an example of the relationship between the LTC and the FTC, and the horizontal axis indicates the FTC and the vertical axis indicates the LTC. A frame with a frame number "H" through a frame with a frame number "H+3" have LTC values of "101" to "104", respectively, and this status section is an increment section. For example, when performing queue-up from a frame a with the LTC of "101" (frame with a frame number "H") to a frame b with the LTC of "103" (frame with a frame number "H+2") in this increment section, the queue-up processing section 355 performs the processing of step S238 to calculate the FTC of the frame b, that is, the frame number "H+2". As a result, a frame image of the frame b is displayed on the monitor 323B.

After the processing of step S238 ends, the process proceeds to step S239 to determine whether or not the virtual end point generation flag is set. That is, it is determined whether the LTC change point table 124 used for queue-up processing is the LTC change point table 124*c*, which can be referred to for the clip under recording, or the LTC change point table 124*a* for the entire clip.

When it is determined that virtual endpoint generation flag is set (Yes), the virtual end point 125 is deleted from the LTC change point table. Then, processing of creating the LTC change point table 124*a* for the entire clip is resumed (steps S206 and S207 in FIG. 21).

Moreover, when the queue-up point search processing is executed by the NRT section 67 as shown in FIG. 21, the processing of deleting the virtual end point 125 may also be executed when the queue-up point is returned (step S213). On the other hand, when the queue-up point search processing is executed by the queue-up processing section 355, the virtual end point 125 may be deleted when the LTC change point table 124*c* which can be temporarily used is output to the editing control device 324. Anyway, the processing of creating the LTC change point table 124*a* for the entire clip is smoothly resumed when the virtual endpoint 125 is appropriately deleted on the basis of the virtual end point generation flag. In addition, since it is possible to create the LTC change point table 124*c* used temporarily without copying the LTC change point table 124, the storage space can be saved.

After the processing of step S239 ends, the queue-up processing section 355 ends the queue-up control processing.

In addition, when it is determined that the status section (that is, the current status section) of the target LTC is not an increment section in step S237, a frame corresponding to the target LTC is not necessarily present. Accordingly, the queue-up processing section 355 ends the queue-up control processing so that queue-up processing is not performed.

Figure 28:
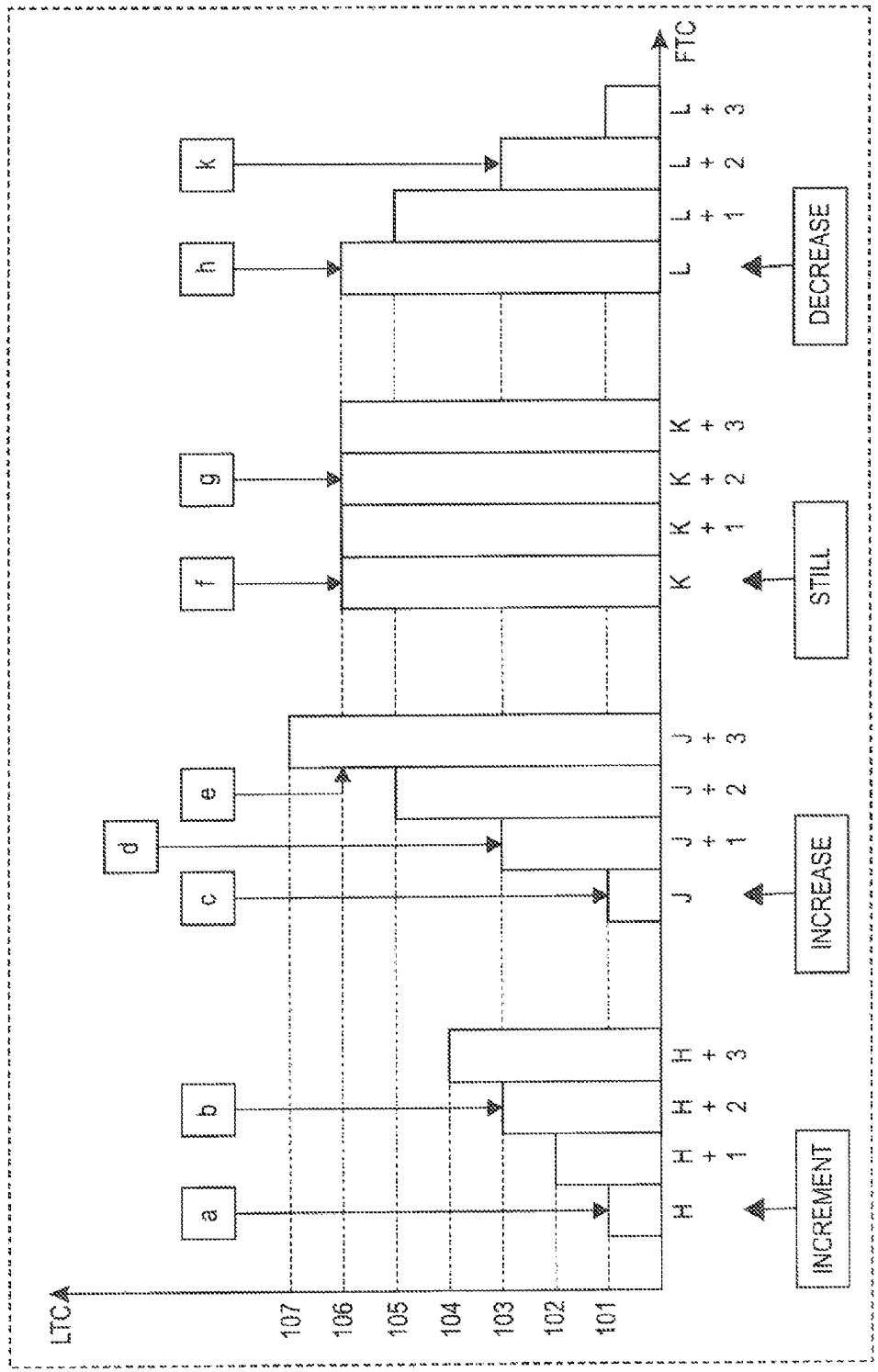
FIG. 28 is a view illustrating an example of queue-up processing.

In FIG. 28, a frame with a frame number "J" through a frame with a frame number "J+3" have LTC values of "101", "103", "105", and "107", respectively. That is, the LTC value increases by 2, and this status section is an increase section. For example, when performing queue-up from a frame c with the LTC value of "101" (frame with a frame number "J") to a frame d with the LTC value of "103" (frame with a frame number "J+1") in this increase section, the queue-up is possible since the frame d (frame with a frame number "J+1") is present. However, for example, when "106" is designated as the LTC value of the queue-up destination, that is, when there is an instruction to perform queue-up from the frame c to a frame with the LTC value of "106", it is not possible for the queue-up processing section 355 to perform the queue-up since the frame e is not present. Thus, when a frame designated as the queue-up destination is present in the increase section, each frame should be directly checked in order to determine whether or not the frame is present. This may lead to an increase in the processing load. Therefore, in such a case, the queue-up processing section 355 ends the queue-up control processing without performing the processing of step S238.

In addition, in FIG. 28, a frame with a frame number "K" through a frame with a frame number "K+3" all have an LTC value of "106". That is, since the LTC values of the frame with a frame number "K" through the frame with a frame number "K+3" are fixed, this status section is a still section. For example, in this still section, all frames have the same LTC value of "106". For example, the LTC value does not change in a frame f (frame with a frame number "K") and a frame g (frame with a frame number "K+2"). Accordingly, it is not possible to identify these frames using the LTC. Thus, when a frame designated as the queue-up destination is present in the still section, it is not clear which frame has been designated. In such a case, the queue-up processing section 355 ends the queue-up control processing without performing the processing of step S238.

Moreover, in FIG. 28, a frame with a frame number "L" through a frame with a frame number "L+3" have LTC values of "106", "105", "103", and "101", respectively. That is, the LTC value decreases by 1 or more, and this status section is a decrease section. For example, when performing queue-up processing in such a decrease section, each frame should be directly checked in order to determine whether or not the frame designated as the queue-up destination is present. This may lead to an increase in the processing load. Therefore, in such a case, the queue-up processing section 355 ends the queue-up control processing without performing the processing of step S235.

Thus, when queue-up is designated in a status section other than the increment section, the queue-up processing section 355 ends the queue-up control processing without the queue-up.

Figure 26:
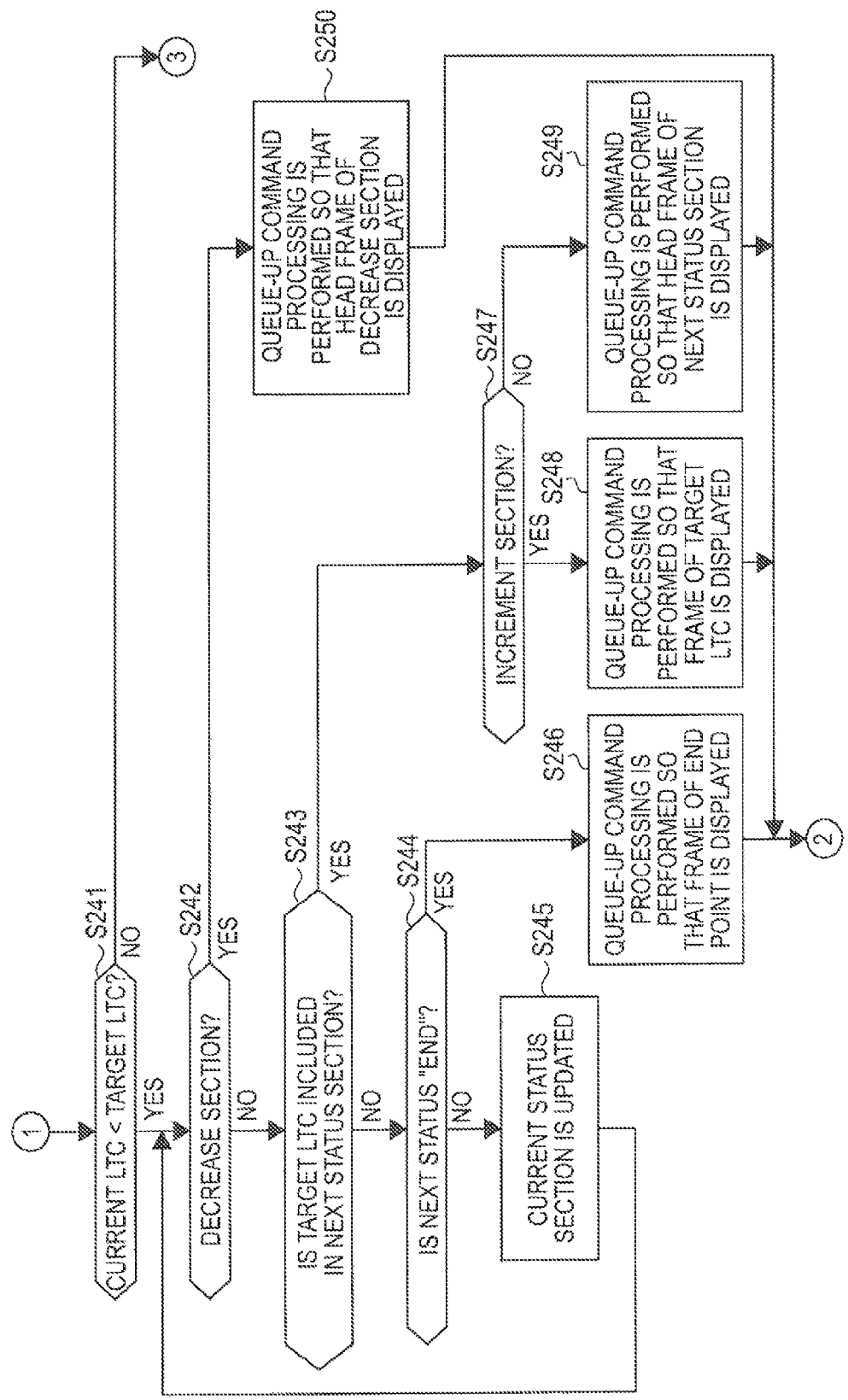
FIG. 26 is a flow chart following FIG. 25 which illustrates the queue-up control processing.

On the other hand, when the queue-up processing section 355 determines that the status section of the target LTC is not the same as the current status section in step S236, the process proceeds to step S241 in FIG. 26. In step S241 in FIG. 26, the queue-up processing section 355 determines whether or not the value of the target LTC is larger than the value of the LTC (current LTC) of the frame displayed currently. When it is determined that the value of the target LTC is larger than the value of the current LTC, that is, when it is determined that the target frame is later in time than the current frame, the process proceeds to step S242.

Basically, when the value of the target LTC is larger than the value of the current LTC, the queue-up processing section 355 searches for the queue-up destination from frames (frames with the large FTC) after the current frame. On the other hand, when the value of the target LTC is smaller than the value of the current LTC, the queue-up processing section 355 searches for the queue-up destination from frames (frames with the small FTC) before the current frame.

In step S242, the queue-up processing section 355 determines whether or not the next status section of the current status section is a decrease section with reference to the LTC change point table 124. When it is determined that the next status section is not a decrease section, the queue-up processing section 355 proceeds to step S243. In step S243, the queue-up processing section 355 determines whether or not the frame of the target LTC is included in the next status section of the current status section on the basis of the LTC change point table 124.

When it is determined that the frame of the target LTC is not included in the next status section of the current status section, the queue-up processing section 355 proceeds to step S244. In step S244, the queue-up processing section 355 determines whether or not the next status (that is, the status of the change point appearing next in the LTC change point table) of the current status section is "end" on the basis of the LTC change point table 124. When it is determined that the change point appearing next is not an end point in the LTC change point table 124 and accordingly the next status is not "end", the process proceeds to step S245.

In step S245, the queue-up processing section 355 updates a setting of the current status section to the next status section and returns the processing to step S242 to repeat the processing from step S242. That is, the queue-up processing section 355 searches for the frame of the queue-up destination in the same direction as the time direction in data for each status section.

Moreover, when it is determined that the next status is "end" in step S244, the queue-up processing section 355 proceeds to step S246. In step S246, the queue-up processing section 355 performs queue-up command processing so that a frame registered as the end point in the LTC change point table 124 is displayed. That is, the queue-up processing section 355 supplies the FTC of the frame of the endpoint to the control section 351 as the FTC of the queue-up destination. The control section 351 creates queue-up command information using the FTC of the queue-up destination and supplies the queue-up command information to the command processing section 356. The command processing section 356 supplies the acquired queue-up command information to the disk recording and reproducing apparatus 323 through the communication unit 344 and displays the frame designated by the FTC as a frame of the queue-up destination.

Figure 29:
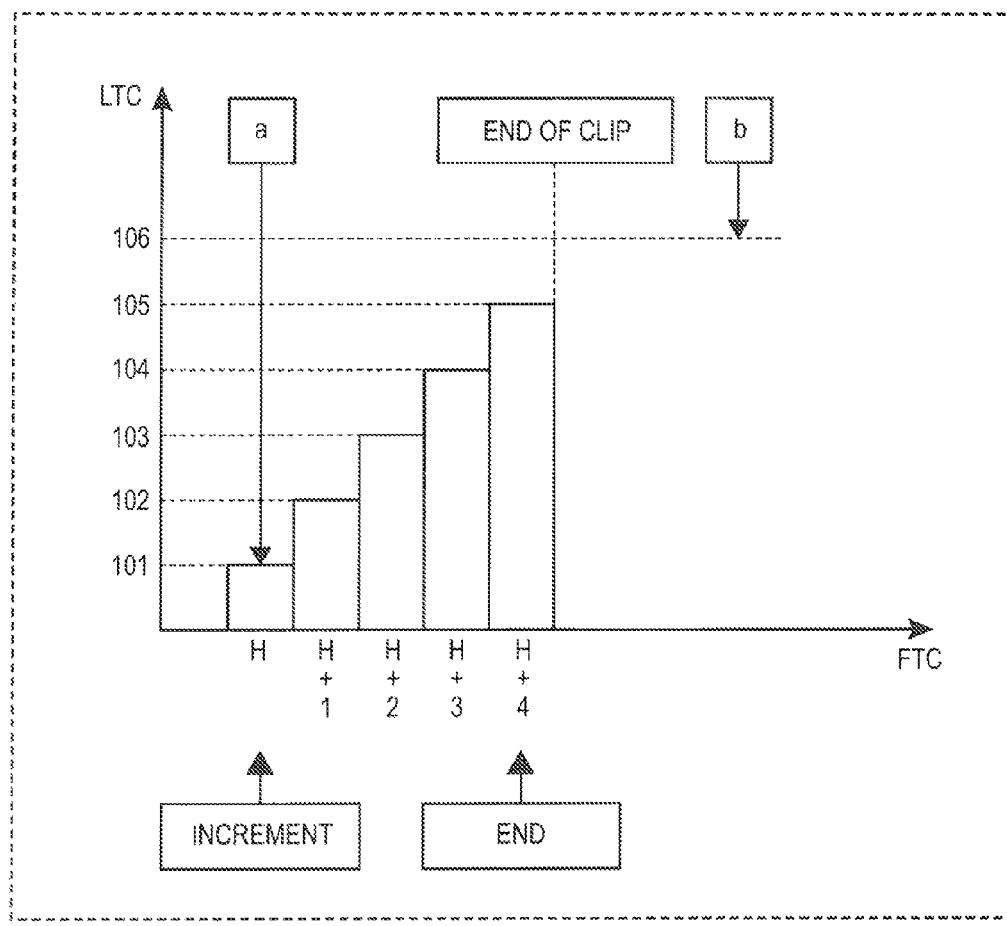
FIG. 29 is a view illustrating another example of queue-up processing.

FIG. 29 is a view showing an example of the relationship between the LTC and the FTC, and the horizontal axis indicates the FTC and the vertical axis indicates the LTC. A frame with a frame number "H" through a frame with a frame number "H+4" have LTC values of "101" to "105", respectively, and this status section is an increment section. In addition, this clip ends at the frame with a frame number "H+4", and the frame with a frame number "H+4" is set as the end point. For example, when there is an instruction of queue-up from a frame a with the LTC of "102" (frame with a frame number "H+1") to a frame b with the LTC of "106", the frame b is a frame after the end of the clip from the determination using the LTC. Accordingly, the frame b is not present. In practice, the frame b may be present in frames before the frame a. However, in order to check whether or not the frame b is present in frames before the frame a, the queue-up processing section 355 should check each frame directly. This may lead to an increase in the processing load. Therefore, the queue-up processing section 355 performs the processing of step S246 to calculate the FTC of the frame of the end point, that is, the frame number "H+4". As a result, an image of the frame with the frame number "H+4" is displayed on the monitor 323B.

After the processing of step S246 ends, the queue-up processing section 355 ends the queue-up control processing.

In addition, when it is determined that the frame of the target LTC is included in the next status section of the current status section in step S243, the queue-up processing section 355 proceeds to step S247. In step S247, the queue-up processing section 355 determines whether or not the next status section is an increment section. When it is determined that the next status section is an increment section, the queue-up processing section 355 proceeds to step S248. In step S248, the queue-up processing section 355 performs queue-up command processing in order to display the frame of the target LTC. That is, when the next status section is an increment section, the queue-up processing section 355 calculates the FTC of the frame corresponding to the target LTC in the status section on the basis of the LTC change point table 124 and supplies the FTC to the control section 351 as the FTC of the queue-up destination. The control section 351 creates queue-up command information using the FTC of the queue-up destination and supplies the queue-up command information to the command processing section 356. The command processing section 356 supplies the acquired queue-up command information to the disk recording and reproducing apparatus 323 through the communication unit 344 and displays the frame designated by the FTC as a frame of the queue-up destination.

FIG. 30 is a view showing an example of the relationship between the LTC and the FTC, and the horizontal axis indicates the FTC and the vertical axis indicates the LTC. A frame with a frame number "H" through a frame with a frame number "H+3" all have an LTC value of "101", and this status section is a still section. In addition, the frame with a frame number "H+3" through the frame with a frame number "H+6" have LTC values of "101" to "104", respectively, and this status section is an increment section. For example, when there is an instruction of queue-up from a frame a (frame with a frame number "H") in this still section to a frame b with the LTC of "103" (frame with a frame number "H+5"), the queue-up processing section 355 can calculate the FTC by searching for the frame b for each status section. Accordingly, the queue-up processing section 355 performs the processing of step S248 to calculate the FTC of the frame b, that is, the frame number "H+5". As a result, a frame image of the frame b is displayed on the monitor 323B.

After the processing of step S248 ends, the queue-up processing section 355 ends the queue-up control processing.

In addition, when it is determined that the next status section of the current status section is not an increment section in step S247, a frame corresponding to the target LTC is not necessarily present. Accordingly, the queue-up processing section 355 proceeds to step S249. In step S249, the queue-up processing section 355 performs queue-up command processing so that the head frame of the next status section where the frame of the target LTC is present is displayed. That is, when the status section of the target LTC is an increase section, a still section, or the like present after the current status section, the queue-up processing section 355 calculates the FTC of the head frame of the status section on the basis of the LTC change point table 124 and supplies the FTC to the control section 351 as the FTC of the queue-up destination. The control section 351 creates queue-up command information using the FTC of the queue-up destination and supplies the queue-up command information to the command processing section 356. The command processing section 356 supplies the acquired queue-up command information to the disk recording and reproducing apparatus 323 through the communication unit 344 and displays the frame designated by the FTC as a frame of the queue-up destination.

In FIG. 30, a frame with a frame number "J" through a frame with a frame number "J+3" have LTC values of "101" to "104", respectively, and this status section is an increment section. In addition, a frame with a frame number "J+3" through a frame with a frame number "J+5" have LTC values of "104", "106", and "108", respectively. That is, the LTC value increases by 2, and this status section is an increase section. For example, when there is an instruction of queue-up from a frame c (frame with a frame number "J") in this increment section to a frame d with the LTC of "106" (frame with a frame number "J+4"), it is not possible for the queue-up processing section 355 to check whether or not the frame d is present as described above since the frame d is present in the increase section. Accordingly, in such a case, the queue-up processing section 355 executes the processing of step S249 to perform control to queue up to the head frame (frame with a frame number "J+3") of the status section where the frame d is present.

After the processing of step S249 ends, the queue-up processing section 355 ends the queue-up control processing.

In addition, when it is determined that the next status section of the current status section is a decrease section in step S242, the queue-up processing section 355 proceeds to step S250. In step S250, the queue-up processing section 355 performs queue-up command processing so that the head frame of the decrease section where the frame of the target LTC is present is displayed. That is, when the status section of the target LTC is a decrease section or the like present after the current status section, the queue-up processing section 355 calculates the FTC of the head frame of the decrease section on the basis of the LTC change point table 124 and supplies the FTC to the control section 351 as the FTC of the queue-up destination. The control section 351 creates queue-up command information using the FTC of the queue-up destination and supplies the queue-up command information to the command processing section 356. The command processing section 356 supplies the acquired queue-up command information to the disk recording and reproducing apparatus 323 through the communication unit 344 and displays the frame designated by the FTC as a frame of the queue-up destination.

Figure 31:
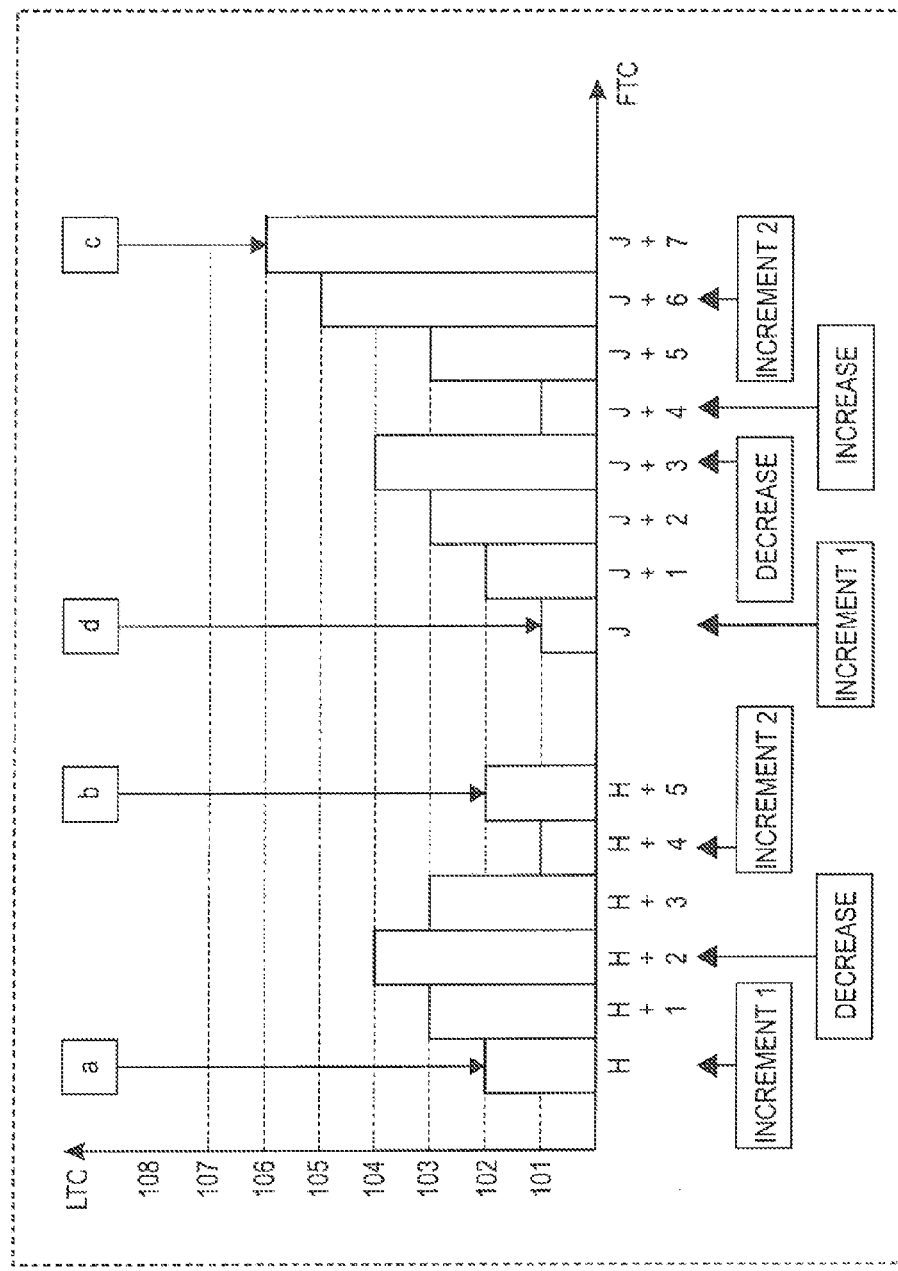
FIG. 31 is a view illustrating still another example of queue-up processing.

FIG. 31 is a view showing an example of the relationship between the LTC and the FTC, and the horizontal axis indicates the FTC and the vertical axis indicates the LTC. A frame with a frame number "H" through a frame with a frame number "H+2" have LTC values of "102" to "104", respectively, and this status section is an increment section (increment 1). In addition, the frame with a frame number "H+2" through the frame with a frame number "H+4" have LTC values of "104", "103", and "101", respectively, and this status section is a decrease section. In addition, the frame with a frame number "H+4" and the frame with a frame number "H+5" have LTC values of "101" and "102", respectively, and this status section is an increment section (increment 2). For example, when there is an instruction of queue-up from a frame a with the LTC of "101" (frame with a frame number "H") to a frame b with the LTC of "102" (frame with a frame number "H+5"), the queue-up processing section 355 searches for the frame b for each status section. However, if a decrease section is present in the middle, a plurality of frames with the same LTC, such as a frame with a frame number "H" and a frame with a frame number "H+4" may be present. For this reason, it is not clear whether or not it is possible to specify a frame of the designated LTC. Accordingly, in such a case, the queue-up processing section 355 executes the processing of step S250 to perform control to queue up to the head frame (frame with a frame number "H+2") of the decrease section.

After the processing of step S250 ends, the queue-up processing section 355 ends the queue-up control processing.

Figure 27:
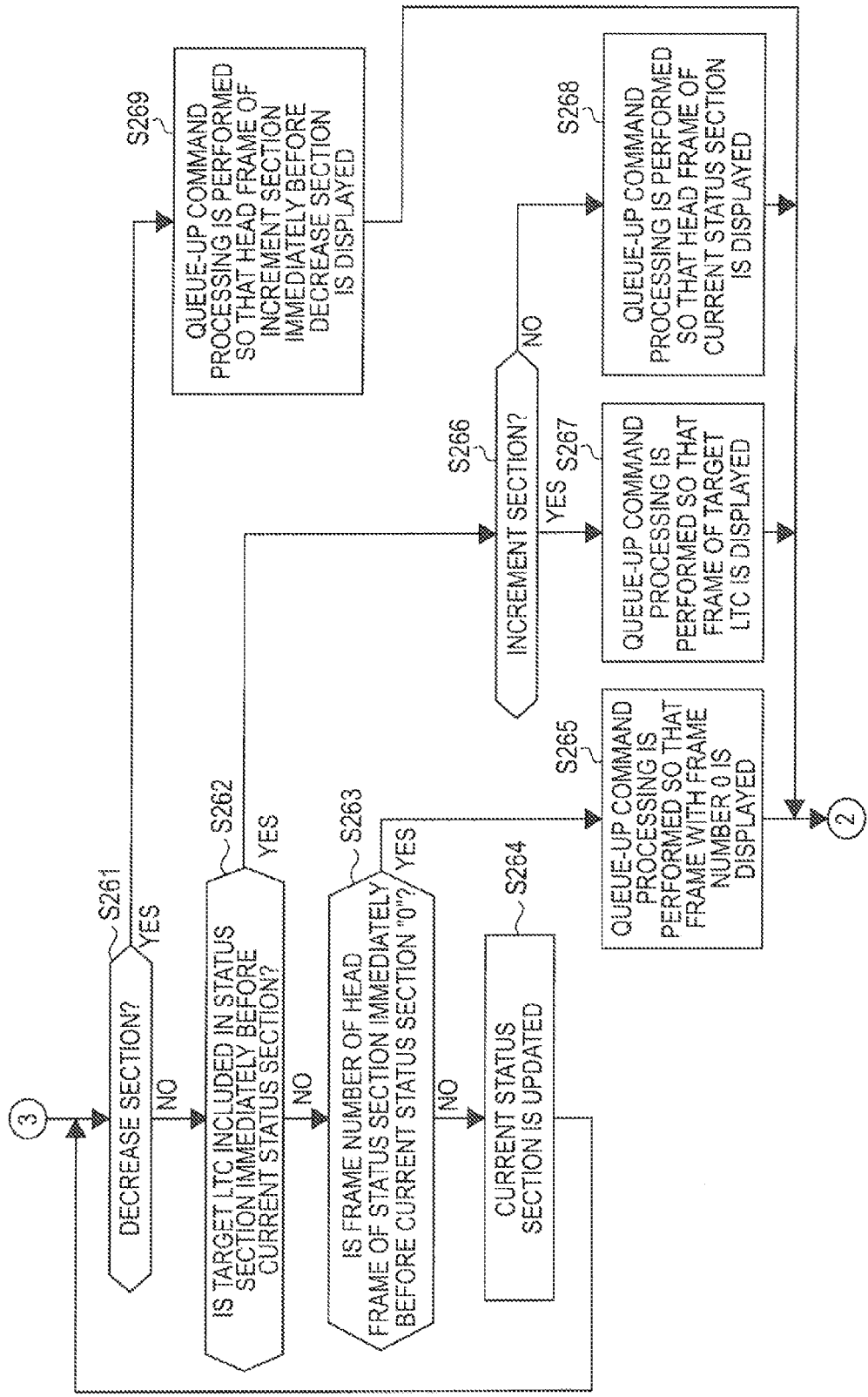
FIG. 27 is a flow chart following FIG. 26 which illustrates the queue-up control processing.

In addition, when it is determined that the value of the target LTC is smaller than the value of the LTC in step S241, that is, when it is determined that the target frame is earlier in time than the current frame, the queue-up processing section 355 proceeds to step S261 in FIG. 27.

In step S261 in FIG. 27, the queue-up processing section 355 determines whether or not a status section immediately before the current status section is a decrease section with reference to the LTC change point table 124. When it is determined that the status section immediately before the current status section is not a decrease section, the queue-up processing section 355 proceeds to step S262. In step S262, the queue-up processing section 355 determines whether or not the frame of the target LTC is included in the status section immediately before the current status section on the basis of the LTC change point table 124.

When it is determined that the frame of the target LTC is not included in the status section immediately before the current status section, the queue-up processing section 355 proceeds to step S263. In step S263, the queue-up processing section 355 determines whether or not the frame number (FTC) of the head frame of the status section immediately before the current status section is "0" on the basis of the LTC change point table 124. When it is determined that the frame number (FTC) of the head frame of the status section immediately before the current status section is not "0", the process proceeds to step S264.

In step S264, the queue-up processing section 355 updates a setting of the current status section to the status section immediately before the current status section and returns the processing to step S261 to repeat the processing from step S261. That is, the queue-up processing section 355 searches for the frame of the queue-up destination in the opposite direction to the time direction in data for each status section.

In addition, when it is determined that the frame number (FTC) of the head frame of the status section immediately before the current status section is "0" in step S263, the queue-up processing section 355 proceeds to step S265. In step S265, the queue-up processing section 355 performs queue-up command processing so that the frame with a frame number "0" is displayed. That is, the queue-up processing section 355 supplies the FTC (that is, "0") of the head frame of this clip to the control section 351 as the FTC of the queue-up destination. The control section 351 creates queue-up command information using the FTC of the queue-up destination and supplies the queue-up command information to the command processing section 356. The command processing section 356 supplies the acquired queue-up command information to the disk recording and reproducing apparatus 323 through the communication unit 344 and displays the frame designated by the FTC as a frame of the queue-up destination.

Figure 32:
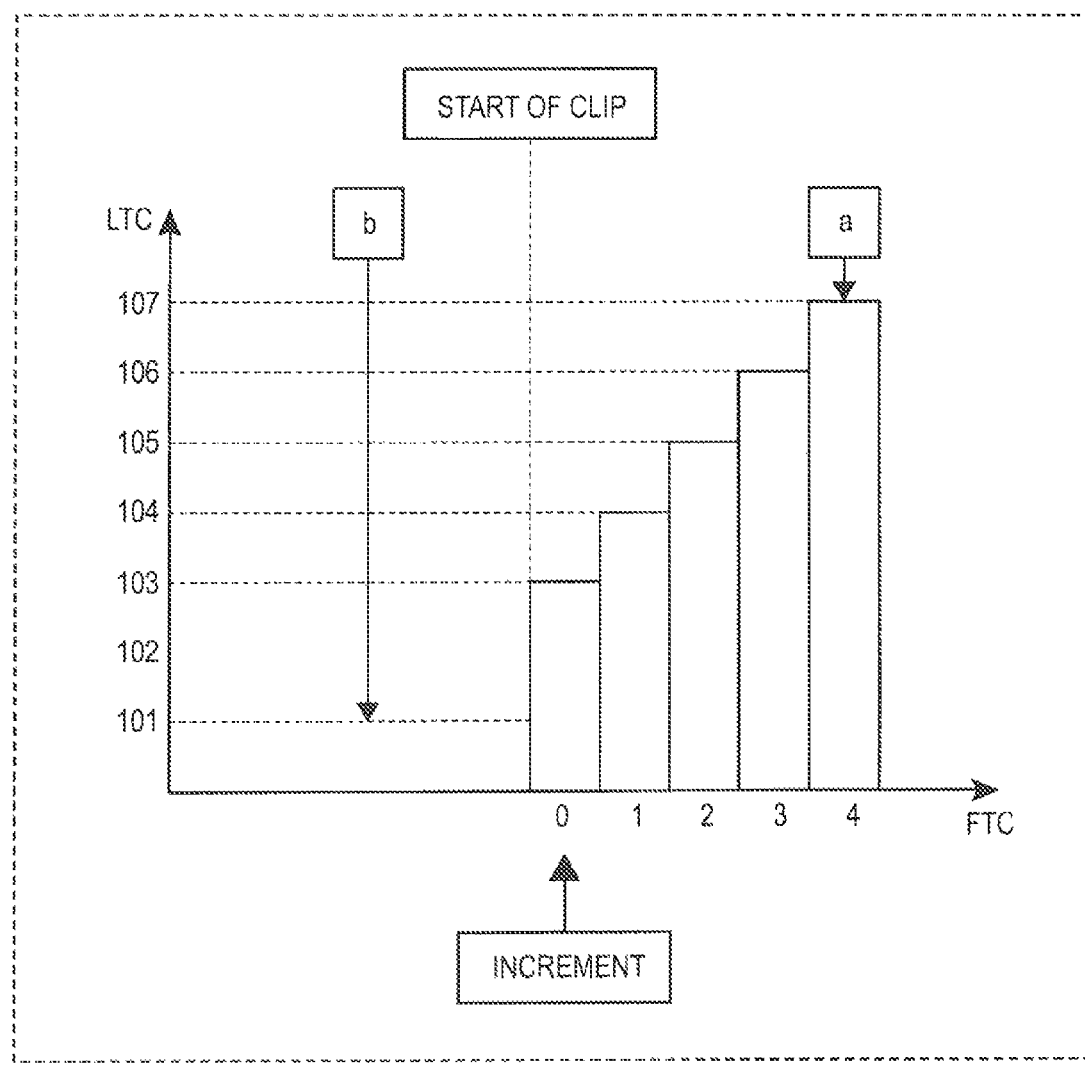
FIG. 32 is a view illustrating still another example of queue-up processing.

FIG. 32 is a view showing an example of the relationship between the LTC and the FTC, and the horizontal axis indicates the FTC and the vertical axis indicates the LTC. A frame with a frame number "0" through a frame with a frame number "4" have LTC values of "103" to "107", respectively, and this status section is an increment section. In addition, this clip starts at the frame with a frame number "0". For example, when there is an instruction of queue-up from a frame a with the LTC of "107" (frame with a frame number "H+4") to a frame b with the LTC of "101", the frame b is a frame before the start of the clip from the determination using the LTC. Accordingly, the frame b is not present. In practice, the frame b may be present in frames after the frame a. However, in order to check whether or not the frame b is present in frames after the frame a, the queue-up processing section 355 should check each frame directly. This may lead to an increase in the processing load. Therefore, the queue-up processing section 355 performs the processing of step S265 to calculate the FTC of the head frame of the clip, that is, the frame number "0". As a result, an image of the frame with the frame number "0" is displayed on the monitor 323B.

After the processing of step S265 ends, the queue-up processing section 355 ends the queue-up control processing.

In addition, when it is determined that the frame of the target LTC is included in the status section immediately before the current status section in step S262, the queue-up processing section 355 proceeds to step S266. In step S266, the queue-up processing section 355 determines whether or not the status section immediately before the current status section is an increment section. When it is determined that the status section immediately before the current status section is an increment section, the queue-up processing section 355 proceeds to step S267. In step S267, the queue-up processing section 355 performs queue-up command processing in order to display the frame of the target LTC. That is, when the status section immediately before the current status section is an increment section, the queue-up processing section 355 calculates the FTC of the frame corresponding to the target LTC in the status section on the basis of the LTC change point table 124 and supplies the FTC to the control section 351 as the FTC of the queue-up destination. The control section 351 creates queue-up command information using the FTC of the queue-up destination and supplies the queue-up command information to the command processing section 356. The command processing section 356 supplies the acquired queue-up command information to the disk recording and reproducing apparatus 323 through the communication unit 344 and displays the frame designated by the FTC as a frame of the queue-up destination.

For example, when there is an instruction of queue-up from a frame d with the LTC value of "106" (frame with a frame number "J+4") to a frame c with the LTC value of "101" (frame with a frame number "J") in FIG. 30, the queue-up processing section 355 can calculate the FTC by searching for the frame c for each status section. Accordingly, the queue-up processing section 355 performs the processing of step S267 to calculate the FTC of the frame c, that is, the frame number "J". As a result, a frame image of the frame c is displayed on the monitor 323B.

After the processing of step S267 ends, the queue-up processing section 355 ends the queue-up control processing.

In addition, when it is determined that the status section immediately before the current status section is not an increment section in step S266, a frame corresponding to the target LTC is not necessarily present. Accordingly, the queue-up processing section 355 proceeds to step S268. In step S268, the queue-up processing section 355 performs queue-up command processing so that the head frame of the current status section is displayed. That is, when the status section of the target LTC is an increase section, a still section, or the like present before the current status section, the queue-up processing section 355 calculates the FTC of the head frame of the status section immediately after the status section on the basis of the LTC change point table 124 and supplies the FTC to the control section 351 as the FTC of the queue-up destination. The control section 351 creates queue-up command information using the FTC of the queue-up destination and supplies the queue-up command information to the command processing section 356. The command processing section 356 supplies the acquired queue-up command information to the disk recording and reproducing apparatus 323 through the communication unit 344 and displays the frame designated by the FTC as a frame of the queue-up destination.

For example, when there is an instruction of queue-up from a frame b with the LTC value of "103" (frame with a frame number "H+5") to a frame a with the LTC value of "101" (frame with a frame number "H") in FIG. 30, it is not possible for the queue-up processing section 355 to specify the FTC of the frame a as described above since the frame a is present in the still section. Accordingly, in such a case, the queue-up processing section 355 executes the processing of step S268 to perform control to queue up to the head frame (frame with a frame number "H+3") of the current status section.

After the processing of step S268 ends, the queue-up processing section 355 ends the queue-up control processing.

In addition, when it is determined that the status section immediately before the current status section is a decrease section in step S261, the queue-up processing section 355 proceeds to step S269. In step S269, the queue-up processing section 355 performs queue-up command processing so that the head frame of the increment section immediately before, in the queue-up direction, the decrease section where the frame of the target LTC is present is displayed. That is, when the status section of the target LTC is a decrease section or the like present before the current status section, the queue-up processing section 355 calculates the FTC of the head frame of the increment section, which is present before the decrease section in the queue-up direction and is closest to the decrease section, on the basis of the LTC change point table 124 and supplies the FTC to the control section 351 as the FTC of the queue-up destination. The control section 351 creates queue-up command information using the FTC of the queue-up destination and supplies the queue-up command information to the command processing section 356. The command processing section 356 supplies the acquired queue-up command information to the disk recording and reproducing apparatus 323 through the communication unit 344 and displays the frame designated by the FTC as a frame of the queue-up destination.

In FIG. 31, a frame with a frame number "J" through a frame with a frame number "J+3" have LTC values of "101" to "104", respectively, and this status section is an increment section (increment 1). In addition, the frame with a frame number "J+3" and the frame with a frame number "J+4" have LTC values of "104" and "101", respectively, and this status section is a decrease section. In addition, the frame with a frame number "J+4" through the frame with a frame number "J+6" have LTC values of "101", "103", and "105", respectively, and this status section is an increase section. In addition, the frame with a frame number "J+6" and the frame with a frame number "J+7" have LTC values of "105" and "106", respectively, and this status section is an increment section (increment 2). For example, when there is an instruction of queue-up from a frame c with the LTC of "104" (frame with a frame number "J+7") to a frame d with the LTC of "101" (frame with a frame number "J"), the queue-up processing section 355 searches for the frame d for each status section. However, if a decrease section is present in the middle, a plurality of frames with the same LTC, such as a frame with a frame number "J" and a frame with a frame number "J+4" may be present. For this reason, it is not clear whether or not it is possible to specify a frame of the designated LTC. Accordingly, in such a case, the queue-up processing section 355 performs the processing of step S269 to perform control to queue up to the head frame (frame with a frame number "J+6") of the increment section (increment 2) immediately before the decrease section.

After the processing of step S269 ends, the queue-up processing section 355 ends the queue-up control processing.

The queue-up processing section 355 performs queue-up control processing by referring to the LTC change point table 124 as described above. Accordingly, a user can display easily a designated frame or a frame near the designated frame just by designating the LTC of the frame of the queue-up destination. Thus, the editing system 310 in FIG. 22 can make the user perform the reproduction control processing more easily.

Moreover, in the present embodiment, when there is an instruction of frame reproduction, writing of the LTC change point table into the memory by the NRT section is restricted and referring to the table information by the NRT section (queue-up processing section) becomes possible. Accordingly, for example, even if the image data is being acquired, FTC data of a reproduction frame is specified by referring to the table information described above. As a result, processing of reproducing the content data, such as image data, can be performed with good operability.

Moreover, in the above explanation, when a frame of the target LTC is present outside the increment section, queuing up to the frame is not performed. However, if the editing control device 324 has sufficient capability, detailed search may be further performed using the LTC of the real-time metadata in order to specify the designated frame.

In addition, the values of the LTC and the FTC used in the above explanation are examples, and the LTC and the FTC are not limited to having the values described above. Similarly, the sequence of status sections may also be set in a different order from the above order. In addition, types of status are not limited to the statuses described above, and any status may be set and the number of types may also be arbitrarily set. In addition, although the case has been described in which the actual queue-up destination may differ with the status of the designated queue-up destination, the location of the actual queue-up destination may be set as a location other than the locations described above.

Moreover, in the above, the case has been described in which the queue-up processing is performed using the LTC change point table having a change point, at which the LTC increase or decrease pattern changes, as its element. However, it is preferable to match the LTC and the FTC each other in a table used for queue-up processing, and the table used for queue-up processing may not be a table of the LTC change point.

In FIG. 22, an example of the editing system 310 configured to include the two disk recording and reproducing apparatuses 321 and 323 and the editing control device 324, which are connected to each other through the network 322, has been described. However, the editing system may have a configuration other than the configuration described above. For example, the number of disk recording and reproducing apparatuses or the number of editing control devices may be 1 or may be 2 or more. In addition, the disk recording and reproducing apparatus 321 or 323 may be configured to have two drives so that reproduction and recording of a clip are performed by these drives. Moreover, another apparatus, such as a camcorder 300, may be included in the editing system 310. In addition, the editing system 310 may also be configured as a reproduction control system including a disk recording and reproducing apparatus in which the optical disc 31, on which a clip edited in advance is recorded, is placed in a drive and an editing control device.

In addition, the disk recording and reproducing apparatus 321 or 323 described above and the editing control device 324 may be configured as one apparatus, and some of their functions may be realized by another apparatus.

In addition, the present disclosure can also be applied to an information processing apparatus configured to have functions other than the functions described above. Therefore, the disk recording and reproducing apparatuses 30, 321, and 323, the camcorder 300, and the editing control device 324 may be configured to have functions other than the functions described above.

The series of processing described above may be executed by hardware or may be executed by software as described above. In the case of executing the series of processing using software, a program included in the software is installed in a computer provided in dedicated hardware or installed in a general-purpose personal computer, which can execute various functions when various programs are installed, from a recording medium.

For example, this recording medium may be provided, separately from the computer, as recording media such as the removable media 346 including a magnetic disk (including a flexible disk), an optical disc (including a CD-ROM (Compact Disc-Read Only Memory and a DVD (Digital Versatile Disc)), a magneto-optical disc (including a MD (Mini-Disc; registered trademark)), and package media including a semiconductor memory which are distributed to supply a program to a user and in which the program is recorded. Alternatively, the recording medium may be provided as, for example, the ROM 332 in which the program is recorded or a hard disk included in the storage unit 343, which is supplied to the user in a state assembled in advance in the computer.

In addition, in this specification, steps describing a program recorded in a recording medium include not only processing performed in a time-sequential manner according to the described order but also processing performed in parallel or separately even if not necessarily performed in the time-sequential manner.

In addition, in this specification, the system indicates the entire apparatus formed by a plurality of devices.

In addition, the present disclosure may have the following configurations.

(1) An information processing apparatus includes: an acquisition section which acquires image data with a plurality of frames; a table storage section in which table information having, as an element, a correspondence relationship between first position information and second position information at a change point that is a frame at which a change pattern type of a value of the first position information changes is written, the first position information being absolute position information that each of the plurality of frames has and the second position information being relative position information when a head frame of the image data is set as a reference; a writing section which writes the table information when the image data is acquired by the acquisition section; a specification section which specifies the second position information of a reproduction frame, which is a frame corresponding to a frame reproduction instruction using the first position information, with reference to the table information in response to the frame reproduction instruction; a reproduction section which reproduces the reproduction frame corresponding to the second position information specified by the specification section; and an exclusive processing section which enables the specification section to refer to the table information while restricting writing of the table information into the table storage section by the writing section when there is an instruction to reproduce the frame.

(2) In the information processing apparatus described in (1), the writing section writes the table information for each frame group having a predetermined number of frames of the plurality of frames, and the exclusive processing section invalidates the frame reproduction instruction while the table information is being written for one frame group.

(3) In the information processing apparatus described in (1) or (2), the exclusive processing section writes information, which indicates that writing of the table information has been completed, in the table storage section in order to enable the specification section to refer to the table information.

(4) In the information processing apparatus described in (3), the exclusive processing section deletes the writing completion information and also releases restrictions on the writing of the table information into the table storage section by the writing section after the second position information of the reproduction frame is specified.

(5) In the information processing apparatus described in any one of (1) to (4), the first position information is a time code indicating the absolute position of the frame using an actual time or time information with a predetermined time as a reference.

(6) In the information processing apparatus described in any one of (1) to (5), the second position information is a time code indicating the relative position of the frame using a frame number indicating the number of frames from the head frame of the image data.

(7) In the information processing apparatus described in any one of (1) to (6), each element of the table information includes status information indicating the change pattern type of the value of the first position information in frames after the change point.

(8) In the information processing apparatus described in (7), the specification section determines whether or not the first position information of the reproduction instruction is present in the table information for each status section, which includes a group of a plurality of consecutive frames with the same status information and is classified by the change point, and specifies the second position information of the reproduction frame on the basis of a result of the determination.

(9) In the information processing apparatus described in (8), the specification section performs the determination for the consecutive status sections in order in an increase direction of the second position information when the value of the first position information of the reproduction instruction is larger than the value of the first position information of a frame reproduced currently and performs the determination for the consecutive status sections in order in a decrease direction of the second position information when the value of the first position information of the reproduction instruction is smaller than the value of the first position information of the frame reproduced currently.

(10) In the information processing apparatus described in (7), the change pattern includes "increment" in which the value of the first position information increases by 1 whenever a value of the second position information increases by 1, "increase" in which the value of the first position information increases by 2 or more whenever the value of the second position information increases by 1, "still" in which the value of the first position information does not change even if the value of the second position information increases by 1, and "decrease" in which the value of the first position information decreases by 1 or more whenever the value of the second position information increases by 1.

(11) In the information processing apparatus described in (10), only when the change pattern of the status section, which includes a group of a plurality of consecutive frames with the same status information and in which the value of the first position information of the reproduction instruction is present, is the "increment", the specification section sets the reproduction frame as a frame indicated by the first position information of the reproduction instruction to specify the second position information of the reproduction frame.

(12) An information processing method includes: acquiring image data with a plurality of frames by means of an acquisition section; by means of a writing section, writing table information having as its element the correspondence relationship between first position information and second position information at a change point, which is a frame at which a change pattern type of a value of the first position information changes, in a table storage section when the image data is acquired by the acquisition section, the first position information being absolute position information that each of the plurality of frames has and the second position information being relative position information when a head frame of the image data is set as a reference; by means of a specification section, specifying the second position information of a reproduction frame, which is a frame corresponding to a frame reproduction instruction using the first position information, with reference to the table information in response to the frame reproduction instruction; by means of a reproduction section, reproducing the reproduction frame corresponding to the second position information specified by the specification section; and by means of an exclusive processing section, enabling the specification section to refer to the table information while restricting writing of the table information into the table storage section by the writing section when there is an instruction to reproduce the frame.

(13) A program causes a computer to function as: an acquisition section which acquires image data with a plurality of frames; a table storage section in which table information having, as an element, a correspondence relationship between first position information and second position information at a change point that is a frame at which a change pattern type of a value of the first position information changes is written, the first position information being absolute position information that each of the plurality of frames has and the second position information being relative position information when a head frame of the image data is set as a reference; a writing section which writes the table information when the image data is acquired by the acquisition section; a specification section which specifies the second position information of a reproduction frame, which is a frame corresponding to a frame reproduction instruction using the first position information, with reference to the table information in response to the frame reproduction instruction; a reproduction section which reproduces the reproduction frame corresponding to the second position information specified by the specification section; and an exclusive processing section which enables the specification section to refer to the table information while restricting writing of the table information into the table storage section by the writing section when there is an instruction to reproduce the frame.

The present disclosure contains subject matter related to that disclosed in Japanese Priority Patent Application JP 2011-036420 filed in the Japan Patent Office on Feb. 22, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
an acquisition section which acquires image data with a plurality of frames;
a table storage section in which table information having, as an element, a correspondence relationship between first position information and second position information at a change point that is a frame at which a change pattern type of a value of the first position information changes is written, the first position information being absolute position information that each of the plurality of frames has and the second position information being relative position information when a head frame of the image data is set as a reference;
a writing section which writes the table information when the image data is acquired by the acquisition section; a specification section which specifies the second position information of a reproduction frame, which is a frame corresponding to a frame reproduction instruction using the first position information, with reference to the table information in response to the frame reproduction instruction;
a reproduction section which reproduces the reproduction frame corresponding to the second position information specified by the specification section;
and an exclusive processing section which enables the specification section to refer to the table information while restricting writing of the table information into the table storage section by the writing section when there is an instruction to reproduce the frame.

2. The information processing apparatus according to claim 1,
wherein the writing section writes the table information for each frame group having a predetermined number of frames of the plurality of frames, and
the exclusive processing section invalidates the frame reproduction instruction while the table information is being written for one frame group.

3. The information processing apparatus according to claim 1, wherein the exclusive processing section writes information, which indicates that writing of the table information has been completed, in the table storage section in order to enable the specification section to refer to the table information.

4. The information processing apparatus according to claim 3,
wherein the exclusive processing section deletes the writing completion information and also releases restrictions on the writing of the table information into the table storage section by the writing section after the second position information of the reproduction frame is specified.

5. The information processing apparatus according to claim 1,
wherein the first position information is a time code indicating the absolute position of the frame using an actual time or time information with a predetermined time as a reference.

6. The information processing apparatus according to claim 1,
wherein the second position information is a time code indicating the relative position of the frame using a frame number indicating the number of frames from the head frame of the image data.

7. The information processing apparatus according to claim 1,
wherein each element of the table information includes status information indicating the change pattern type of the value of the first position information in frames after the change point.

8. The information processing apparatus according to claim 7,
wherein the specification section determines whether or not the first position information of the reproduction instruction is present in the table information for each status section, which includes a group of a plurality of consecutive frames with the same status information and is classified by the change point, and specifies the second position information of the reproduction frame on the basis of a result of the determination.

9. The information processing apparatus according to claim 8,
wherein the specification section performs the determination for the consecutive status sections in order in an increase direction of the second position information when the value of the first position information of the reproduction instruction is larger than the value of the first position information of a frame reproduced currently and performs the determination for the consecutive status sections in order in a decrease direction of the second position information when the value of the first position information of the reproduction instruction is smaller than the value of the first position information of the frame reproduced currently.

10. The information processing apparatus according to claim 7,
wherein the change pattern includes "increment" in which the value of the first position information increases by 1 whenever a value of the second position information increases by 1, "increase" in which the value of the first position information increases by 2 or more whenever the value of the second position information increases by 1, "still" in which the value of the first position information does not change even if the value of the second position information increases by 1, and "decrease" in which the value of the first position information decreases by 1 or more whenever the value of the second position information increases by 1.

11. The information processing apparatus according to claim 10,
wherein only when the change pattern of the status section, which includes a group of a plurality of consecutive frames with the same status information and in which the value of the first position information of the reproduction instruction is present, is the "increment", the specification section sets the reproduction frame as a frame indicated by the first position information of the reproduction instruction to specify the second position information of the reproduction frame.

12. The information processing apparatus according to claim 1,
wherein the first position information and the second position information are utilized to specify position of each of the plurality of frames using predetermined time information.

13. The information processing apparatus according to claim 1,
wherein the first position information and the second position information correspond to a real-time metadata.

14. The information processing apparatus according to claim 1,
wherein non-real-time metadata comprises one or more of: the table information, a unique material identifier of each of the plurality of frames, or a global positioning system information of the information processing apparatus.

15. The information processing apparatus according to claim 1,
wherein the change pattern type of the value of the first position information is matched with the first position information and the second position information of the corresponding change point and registered in the table information.

16. An information processing method comprising:
acquiring image data with a plurality of frames by means of an acquisition section;
allowing a writing section to write table information having as an element a correspondence relationship between first position information and second position information at a change point, which is a frame at which a change pattern type of a value of the first position information changes, in a table storage section when the image data is acquired by the acquisition section, the first position information being absolute position information that each of the plurality of frames has and the second position information being relative position information when a head frame of the image data is set as a reference;
allowing a specification section to specify the second position information of a reproduction frame, which is a frame corresponding to a frame reproduction instruction using the first position information, with reference to the table information in response to the frame reproduction instruction;
allowing a reproduction section to reproduce the reproduction frame corresponding to the second position information specified by the specification section; and
allowing an exclusive processing section to enable the specification section to refer to the table information while restricting writing of the table information into the table storage section by the writing section when there is an instruction to reproduce the frame.

17. A non-transitory computer-readable storage medium having stored thereon, a computer program having at least one code section for processing information, the at least one code section being executable by a computer for causing the computer to perform steps comprising:
acquiring image data with a plurality of frames;
writinq table information when the image data is acquired, wherein the table information comprises, as an element, a correspondence relationship between first position information and second position information at a change point that is a frame at which a change pattern type of a value of the first position information changes is written, wherein the first position information is absolute position information that each of the plurality of frames has and the second position information is relative position information when a head frame of the image data is set as a reference;
specifying the second position information of a reproduction frame, wherein the reproduction frame is a frame corresponding to a frame reproduction instruction using the first position information, with reference to the table information in response to the frame reproduction instruction;
reproducing the reproduction frame corresponding to the second position information; and
referring to the table information while restricting writing of the table information when there is an instruction to reproduce the frame.

18. The non-transitory computer-readable storage medium according to claim 17,
comprising virtually setting a last element of the table information as a virtual end point, wherein the virtual end point is registered in the table information, wherein a virtual end point generation flag is designated to indicate the virtual end point.

19. The non-transitory computer-readable storage medium according to claim 18,
comprising deleting the virtual end point based the virtual end point generation flag, and resume generation of the table information for the image data.

20. The non-transitory computer-readable storage medium according to claim 17,
comprising writing the table information for a frame group having a predetermined number of frames of the plurality of frames, wherein the number of frames in the frame group is specified by a frame number, or by a reproduction time of a predetermined length, wherein the reproduction time is a time taken to reproduce the reproduction frame.

* * * * *